(12) United States Patent
Soma et al.

(10) Patent No.: US 7,788,271 B2
(45) Date of Patent: Aug. 31, 2010

(54) CONTENT DISTRIBUTION SERVER, CONTENT DISTRIBUTION METHOD, AND PROGRAM

(75) Inventors: Shunichi Soma, Chiba (JP); Munetake Ebihara, Kanagawa (JP); Hiroshi Kuno, Kanagawa (JP)

(73) Assignee: Sony Corporation, Tokyo (JP)

( * ) Notice: Subject to any disclaimer, the term of this patent is extended or adjusted under 35 U.S.C. 154(b) by 469 days.

(21) Appl. No.: 11/146,060

(22) Filed: Jun. 7, 2005

(65) Prior Publication Data

US 2005/0273399 A1 Dec. 8, 2005

(30) Foreign Application Priority Data

Jun. 8, 2004 (JP) .............................. 2004-170533

(51) Int. Cl.
*G06F 7/00* (2006.01)
*G06Q 20/00* (2006.01)
*H04L 9/32* (2006.01)

(52) U.S. Cl. ........................... 707/758; 705/75; 713/176
(58) Field of Classification Search ....................... None
See application file for complete search history.

(56) References Cited

U.S. PATENT DOCUMENTS

| | | | | | |
|---|---|---|---|---|---|
| 4,967,348 | A * | 10/1990 | Naito et al. | ................. | 707/200 |
| 5,873,097 | A * | 2/1999 | Harris et al. | ................. | 707/203 |
| 6,697,824 | B1 * | 2/2004 | Bowman-Amuah | ......... | 709/229 |
| 7,293,294 | B2 * | 11/2007 | Ukai et al. | .................... | 726/32 |
| 7,362,879 | B2 * | 4/2008 | Evans et al. | ................. | 382/100 |
| 2001/0029507 | A1 * | 10/2001 | Nojima | ....................... | 707/102 |
| 2002/0111934 | A1 * | 8/2002 | Narayan | ....................... | 707/1 |
| 2002/0164047 | A1 * | 11/2002 | Yuval | .......................... | 382/100 |
| 2002/0178376 | A1 * | 11/2002 | Miura et al. | ................ | 713/200 |
| 2002/0194501 | A1 * | 12/2002 | Wenocur et al. | ............ | 713/201 |
| 2003/0007640 | A1 * | 1/2003 | Harada et al. | ............... | 380/270 |
| 2003/0009591 | A1 * | 1/2003 | Hayball et al. | .............. | 709/245 |
| 2003/0028490 | A1 * | 2/2003 | Miura et al. | .................. | 705/59 |
| 2003/0046238 | A1 * | 3/2003 | Nonaka et al. | ................ | 705/51 |
| 2003/0056103 | A1 * | 3/2003 | Levy et al. | ................... | 713/176 |

(Continued)

FOREIGN PATENT DOCUMENTS

JP    A 1999-11-053313    2/1999

(Continued)

*Primary Examiner*—Neveen Abel Jalil
*Assistant Examiner*—Tarek Chbouki
(74) *Attorney, Agent, or Firm*—Finnegan, Henderson, Farabow, Garrett & Dunner, L.L.P.

(57) ABSTRACT

The present invention provides a content distribution server that allows the terminals owned by a same user to purchase content without repeating purchase processing once it has been executed only on one of these terminals. The content distribution server is made up of a content database storing the content identified by content ID in a plurality of files having different attributes and a user database storing the content IDs of the content purchased by the user identified by user ID. At the time of content purchase processing by a first terminal, this content distribution server registers the user ID of the first terminal in the user database. Subsequently, when a request for distribution comes from a second terminal, the content distribution server searches the user database of the second terminal for the content having an attribute available to the second terminal on the basis of the user ID of the second terminal without executing the purchase processing and distributes the retrieved content to the second terminal.

3 Claims, 37 Drawing Sheets

U.S. PATENT DOCUMENTS

| | | | |
|---|---|---|---|
| 2003/0155413 A1* | 8/2003 | Kovesdi et al. | 235/375 |
| 2003/0169718 A1* | 9/2003 | Hirata et al. | 370/338 |
| 2003/0236895 A1* | 12/2003 | Ohkubo et al. | 709/229 |
| 2003/0236912 A1* | 12/2003 | Klemets et al. | 709/236 |
| 2004/0003253 A1* | 1/2004 | Ogino et al. | 713/176 |
| 2004/0015703 A1* | 1/2004 | Madison et al. | 713/185 |
| 2004/0030643 A1* | 2/2004 | Madison et al. | 705/39 |
| 2004/0070602 A1* | 4/2004 | Kobuya et al. | 345/738 |
| 2004/0088549 A1* | 5/2004 | Ukai et al. | 713/175 |
| 2004/0093396 A1* | 5/2004 | Akune | 709/219 |
| 2004/0133847 A1* | 7/2004 | Iino et al. | 715/500 |
| 2004/0162787 A1* | 8/2004 | Madison et al. | 705/64 |
| 2004/0162846 A1* | 8/2004 | Nakahara et al. | 707/102 |
| 2004/0168197 A1* | 8/2004 | Koh et al. | 725/112 |
| 2005/0049886 A1* | 3/2005 | Grannan et al. | 705/1 |
| 2005/0165688 A1* | 7/2005 | Matsushima et al. | 705/52 |
| 2005/0234860 A1* | 10/2005 | Roever et al. | 707/1 |
| 2005/0251683 A1* | 11/2005 | Levy et al. | 713/176 |
| 2006/0174128 A1* | 8/2006 | Yuval | 713/176 |
| 2006/0218126 A1* | 9/2006 | De Ruijter et al. | 707/3 |
| 2007/0016790 A1* | 1/2007 | Brundage et al. | 713/176 |
| 2007/0083772 A1* | 4/2007 | Harada et al. | 713/193 |
| 2007/0204064 A1* | 8/2007 | Mail et al. | 709/246 |
| 2007/0282819 A1* | 12/2007 | Lynn et al. | 707/3 |
| 2008/0195871 A1* | 8/2008 | Peinado et al. | 713/189 |

FOREIGN PATENT DOCUMENTS

| | | |
|---|---|---|
| JP | A 2002-073561 | 3/2002 |
| JP | 2003-99037 | 4/2003 |

\* cited by examiner

FIG.11

| USER ID | CREDIT CARD NUMBER | GROUP ID | DEVICE ID | RECORDER ID |
|---|---|---|---|---|
| Yamada Taro | XXX-XXXX | GROUP ID-A | TERMINAL ID1 | RECORDER ID1 |
| | | | TERMINAL ID2 | RECORDER ID2 |
| | | | MEDIA ID1 | RECORDER ID3 |
| | | | MEDIA ID2 | — |
| Suzuki Jiro | YYY-YYYY | GROUP ID-B | TERMINAL ID10 | RECORDER ID10 |
| | | | MEDIA ID12 | — |
| | | | MEDIA ID13 | RECORDER ID11 |
| ......... | ......... | ......... | ......... | ......... |

2161  2162  2163  2164  2165

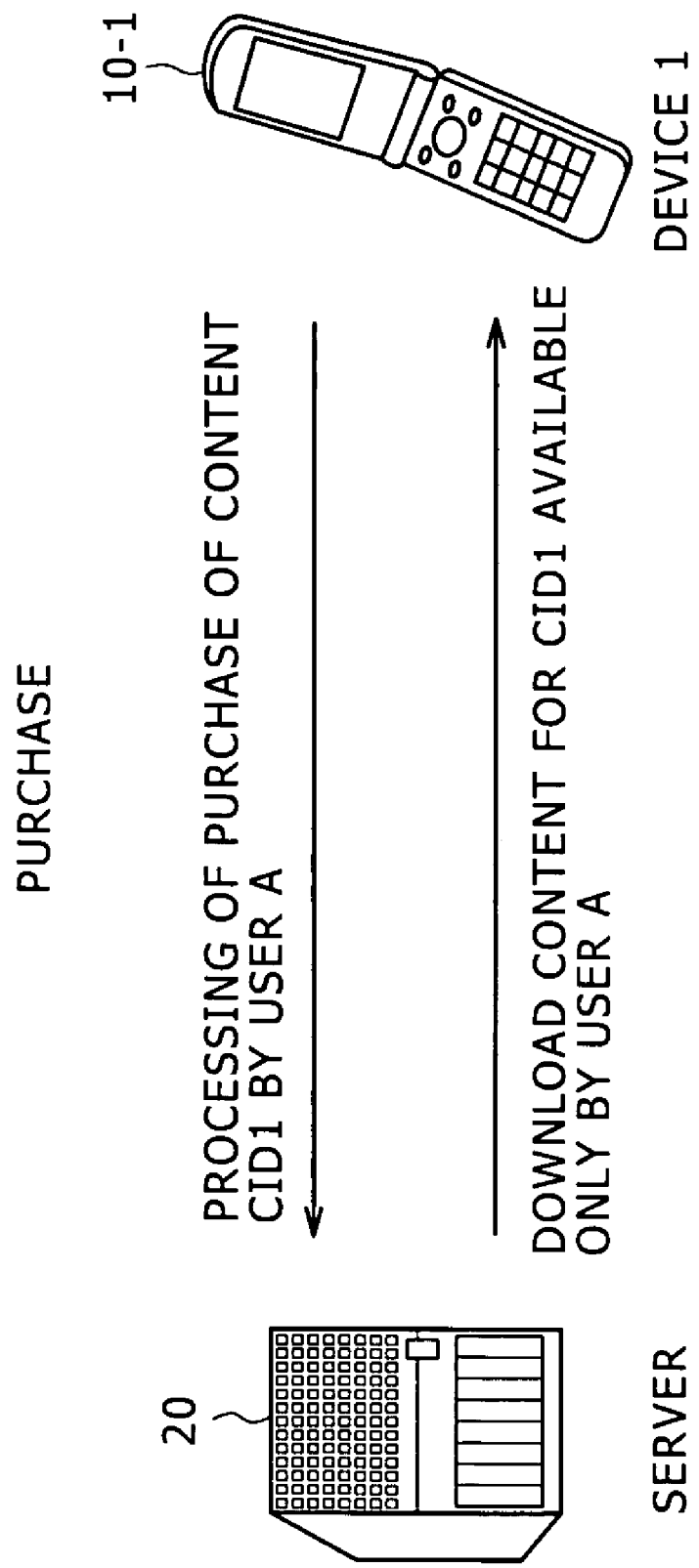

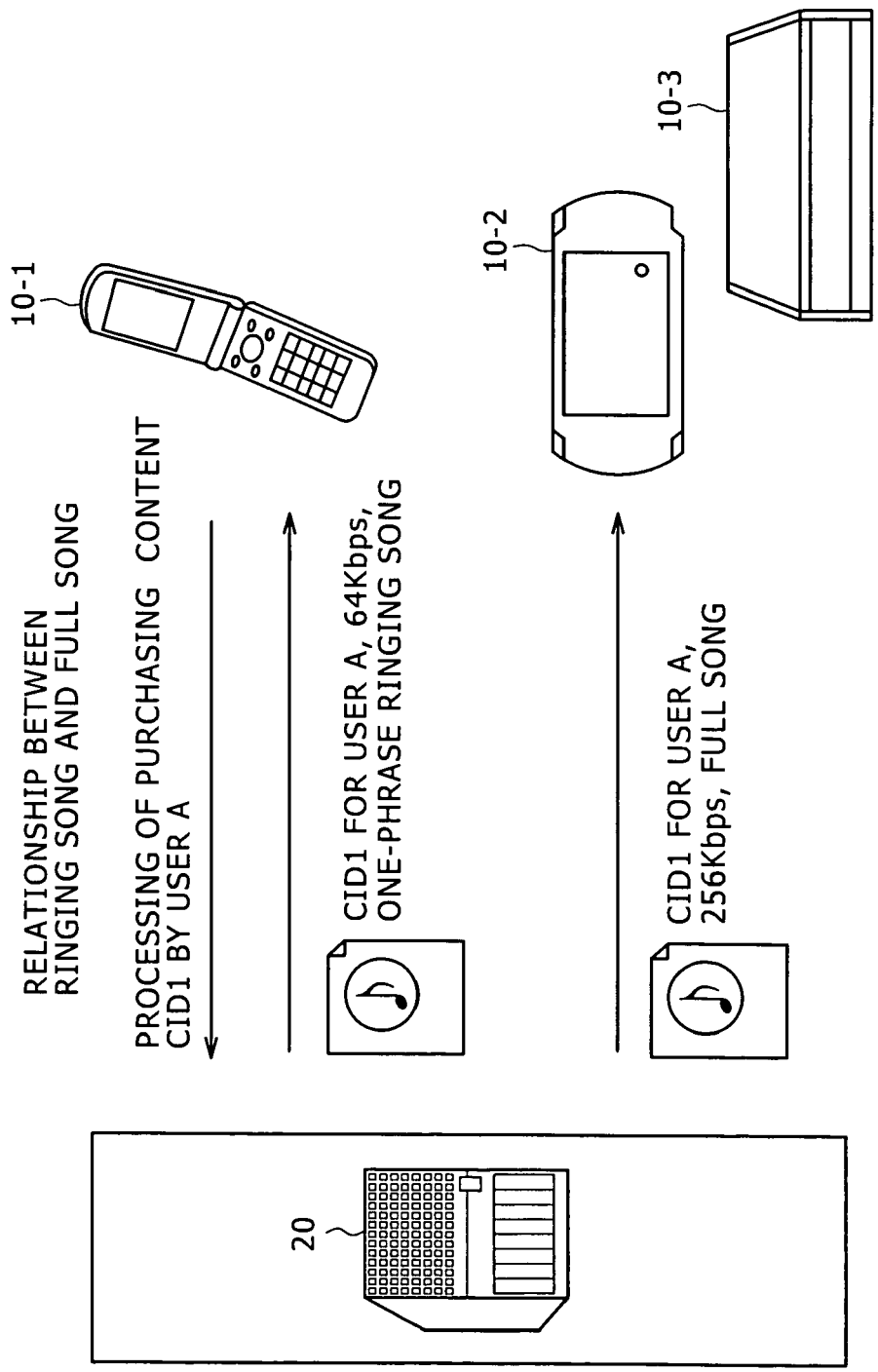

CONTENT DISTRIBUTION SERVER, CONTENT DISTRIBUTION METHOD, AND PROGRAM

BACKGROUND OF THE INVENTION

The present invention relates to a content distribution server, a content distribution method, and a program.

Unlike analog content in the past, digital content such as music for example may be copied multiple times without involving the degradation of quality. For this characteristic of digital content, the illegal distribution and exchange of content given no permission by copyright holders have been increasing supported by the recent popularization of the Internet and the recent increase in the processing speed and storage capacity of personal computers.

For the prevention of the above-mentioned illegal activities, copyright management systems based on DRM (Digital Rights Management) are becoming popular. Based on such copyright management systems, content distribution systems (EMD, Electronic Music Distribution, system, for example) have been realized in which, while protecting the copyright of content to be distributed, content is distributed from content distribution servers to users' terminals (namely, clients).

SUMMARY OF THE INVENTION

However, the above-mentioned related-art content distribution systems may require executing content purchase processing for each of user-owned terminals (namely, such various kinds of devices having content reproduction capabilities as PC, PDA, mobile phone, PHS, and game machine, for example).

In addition, with the related-art content distribution systems, the content held on the server side is limited in accordance with each of these terminals, so that it is difficult to purchase high quality content (namely, music content of high quality, for example) by use of the mobile phone.

It is therefore an object of the present invention to provide a novel and improved content distribution server, a content distribution method, and a program that allow each user to purchase terminal-dependent content with any of the terminals owned by the user once the user has purchased content with any one of these terminals without repeating content purchase processing.

According to an aspect of the present invention, there is provided a content distribution server for distributing content to a plurality of terminals owned by a user, including:

a content database for storing content identified by a content ID in a plurality of files having different attributes; and a user database for storing, for each user identified by a user ID, a content ID of content purchased by the user;

wherein, when a content purchase request comes from a first terminal owned by the user, the first terminal is authenticated on the basis of a user ID received from the first terminal and, if the user ID is found correct, a content ID of the content requested for purchase is stored in the user database by relating the content ID with the user ID, the content requested for purchase having an attribute available to the first terminal is acquired from the content database, and the content is provided to the first terminal by attaching information indicative of the user ID to the content; and when a content distribution request comes from a second terminal owned by the user, the second terminal is authenticated on the basis of a user ID received from the second terminal and, if the user ID is found correct, the user database is checked for a content ID corresponding to the user ID and, if the content ID corresponding to the user ID is found stored in the user database, the content requested for distribution having an attribute available to the second terminal is acquired from the content database, and the content is provided to the second terminal by attaching information indicative of the user ID to the content.

According to another aspect of the present invention, there is provided a content distribution method for distributing content to a plurality of terminals owned by a user, including the steps of, in a content distribution server having a content database for storing content identified by a content ID in a plurality of files having different attributes and a user database for storing, for each user identified by a user ID, a content ID of content purchased by the user:

when a content purchase request comes from a first terminal owned by the user, authenticating the first terminal on the basis of a user ID received from the first terminal and, storing, if the user ID is found correct, a content ID of the content requested for purchase in the user database by relating the content ID with the user ID, acquiring the content requested for purchase having an attribute available to the first terminal from the content database, and the content is provided to the first terminal by attaching information indicative of the user ID to the content; and when a content distribution request comes from a second terminal owned by the user, authenticating second terminal on the basis of a user ID received from the second terminal and, checking, if the user ID is found correct, the user database for a content ID corresponding to the user ID and, acquiring, if the content ID corresponding to the user ID is found stored in the user database, the content requested for distribution having an attribute available to the second terminal from the content database, and providing content to the second terminal by attaching information indicative of the user ID to the content.

According to still another aspect of the present invention, there is provided a program for making a computer function as a content distribution server having a content database for storing content identified by a content ID in a plurality of files having different attributes and a user database for storing, for each user identified by a user ID, a content ID of content purchased by the user, thereby distributing content to a plurality of terminals owned by a user, the program including the steps of:

when a content purchase request comes from a first terminal owned by the user, authenticating the first terminal on the basis of a user ID received from the first terminal and, storing, if the user ID is found correct, a content ID of the content requested for purchase in the user database by relating the content ID with the user ID, acquiring the content requested for purchase having an attribute available to the first terminal from the content database, and the content is provided to the first terminal by attaching information indicative of the user ID to the content; and when a content distribution request comes from a second terminal owned by the user, authenticating second terminal on the basis of a user ID received from the second terminal and, checking, if the user ID is found correct, the user database for a content ID corresponding to the user ID and, acquiring, if the content ID corresponding to the user ID is found stored in the user database, the content requested for distribution having an attribute available to the second terminal from the content database, and providing content to the second terminal by attaching information indicative of the user ID to the content.

The above and other objects, features and advantages of the present invention will become apparent from the following description and the appended claims, taken in conjunction with the accompanying drawings in which like parts or elements denoted by like reference symbols.

BRIEF DESCRIPTION OF THE DRAWINGS

FIG. 11 is a diagram illustrating a data structure of a group registration database associated with the first embodiment;

FIG. 38 is a schematic diagram illustrating another exemplary application of the content distribution system and the content distribution method associated with the second embodiment; and FIG. 39 is a schematic diagram illustrating still another exemplary application of the content distribution system and the content distribution method associated with the second embodiment.

DETAILED DESCRIPTION OF THE PREFERRED EMBODIMENTS

Figure 1:
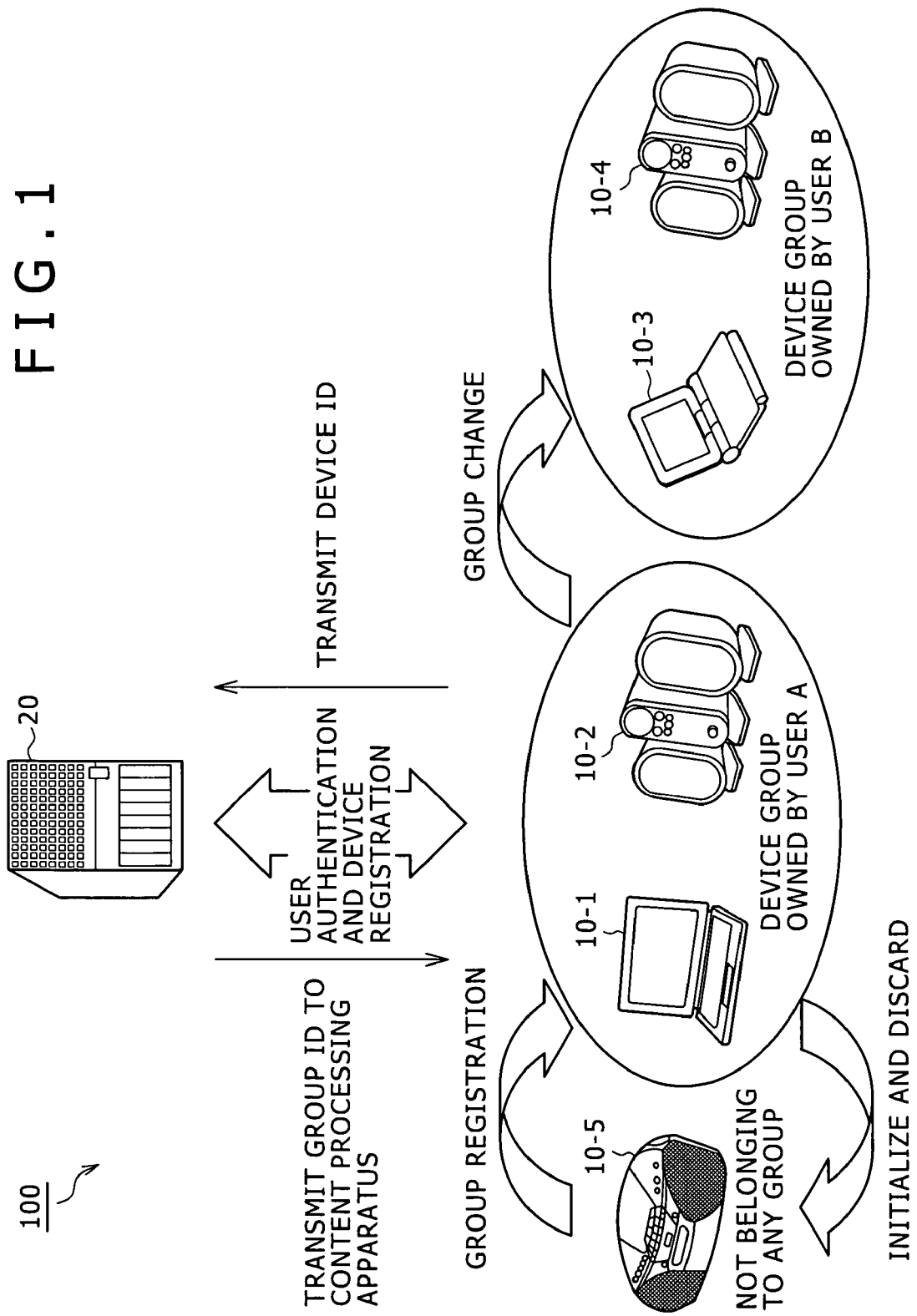
FIG. 1 is a schematic diagram illustrating an overview of group registration of a content sharing system practiced as a first embodiment of the invention.

The following describes in detail embodiments of the present invention with reference to accompanying drawings. It should be noted that, throughout the present specification and the accompanying drawings, components substantially having the same functional configuration are denoted by the same reference numeral for the purpose of brevity.

First Embodiment

The following describes a content sharing system associated with a first embodiment of the present invention.

1. Overview

First, the content sharing system associated with the first embodiment will be outlined.

The content sharing system associated with the first embodiment manages the sharing of content between a plurality of content processing apparatuses and is configured as a copyright management system for protecting the copyright of content. Namely, this content sharing system restricts the sharing of content between the content processing apparatuses owned by different users so as to surely prevent content from being used in an illegal manner such as the unauthorized mass distribution of content over the Internet, for example.

On the other hand, this content sharing system is also configured as a system that realizes a content sharing service for allowing a plurality of content processing apparatuses owned by a same user (including not only a single user but also a user group in a limited range of families, friends, or colleagues, for example) to some degree of freedom.

This content sharing system associated with the first embodiment is intended to enhance the convenience and the degree of freedom of the content sharing between a plurality of content processing apparatuses owned by a same user by permitting the sharing of content within a range of private use, while executing copyright management.

As described above, with the related-art copyright management systems based on the check-out/check-in method of SDMI, the illegal use of content is limited by managing the number of copies in unit of individual content. With these systems, copyright management processing must be executed every time content is copied between a plurality of content processing apparatuses, thereby presenting problems of the slow processing due to a complicated system configuration and the hampered convenience due to the low degree of freedom in content usage within the range of private use. In addition, with these systems, each user must use his system by always being aware of the content's copy source and the number of times of the copying. Further, with the above-mentioned related-art systems, the primary object of each copyright management system i.e. a capability of preventing content from being copied to devices owned by other persons has not been achieved.

In contrast, the content sharing system associated with the first embodiment executes copyright management processing such that the use of content is managed in unit of content providing source (to be more specific, in unit of content owner or content recorded device) and the reproduction of content data by a content processing apparatus on the content acquisition side (or the copy destination) is permitted or not permitted depending on the content providing source. Namely, the content sharing system associated with the first embodiment manages the content to be shared within the system on content data providing source basis and limits the reproduction of the content data in the content processing apparatus on the content acquisition side, thereby effecting content copyright management.

Further, with the content sharing system associated with the first embodiment, a plurality of content processing apparatuses are group-registered in unit of the user owning content processing apparatuses by use of a group management server; between the content processing apparatuses registered with a same user group, copied content data may be reproduced without restriction.

It should be noted that the content associated with the first embodiment includes audio content such as music, lectures, and radio programs, video content such as movies, television programs, video programs photographs, drawings, and graphics, electronic books (e-books), games, software, and so on. Content data is digital data indicative of the contents of the above-mentioned pieces of content, such as video data, audio data, electronic book data, electronic game data, and software data, for example. In what follows, the description will be made by use of audio content (MP3 content, for example), especially the music content ripped or self recorded by a recording device or the music content distributed from a distribution server, by way of example. However, the present invention is not limited to the above-mentioned examples.

The following describes an overview of the group registration in a content sharing system 100 associated with the first embodiment for executing the sharing and copyright management of the above-mentioned pieces of content, with reference to FIG. 1. It should be noted that FIG. 1 illustrates an overview of the group registration of the content sharing system 100 associated with the first embodiment.

As shown in FIG. 1, the content processing apparatuses 10-1 through 10-4 are divided into a device group (the content processing apparatus 10-1 and 10-2) owned by user A and a device group (the content processing apparatuses 10-3 and 10-4) owned by user B, for example. The grouping of the content processing apparatuses 10 is executed by group-registering the content processing apparatuses 10 on a user basis with a distribution and group management server 20 (hereafter sometimes referred to simply as a server 20), for example.

The following specifically describes this group registration processing. First, the user accesses the server 20 through his own content processing apparatus 10, executes user authentication processing, and transmits the device ID of this content processing apparatus 10 to the server 20. Next, the server 20 stores the device ID of the corresponding content processing apparatus 10 as related with the corresponding user, and group-registers the content processing apparatus 10 to the device group of the user. Further, the server 20 transmits a group ID corresponding to this user to this content processing apparatus 10 and the content processing apparatus 10 stores the received group ID into storage means thereof. Likewise, the other content processing apparatuses 10 are group-registered.

In this group registration, one unit of content processing apparatus 10 may be registered only in the device group of a single user; namely, one unit of content processing apparatus 10 cannot be registered in the device group of different users at the same time. That is, the group ID that can be owned by the content processing apparatus 10 is only one. Therefore, if the owner of the content processing apparatus 10-2 has been changed from user A to user B, the group registration of this content processing apparatus 10-2 must be changed.

If user A has newly purchased a content processing apparatus 10-5 for example, the content processing apparatus 10-5 has not been group yet, so that the content processing apparatus 10-5 may be group-registered with the device group of user A in the same manner as described above. On the other hand, the content processing apparatus 10-1 already in the device group of user A may be unregistered to put this apparatus out of group.

With the content sharing system 100 associated with the first embodiment, content may be shared without restriction between a plurality of content processing apparatuses 10 registered with the device group of the same user and having the same group ID. On the other hand, content cannot be shared between a plurality of content processing apparatuses 10 registered with the device groups of different users and having different group IDs.

Figure 2:
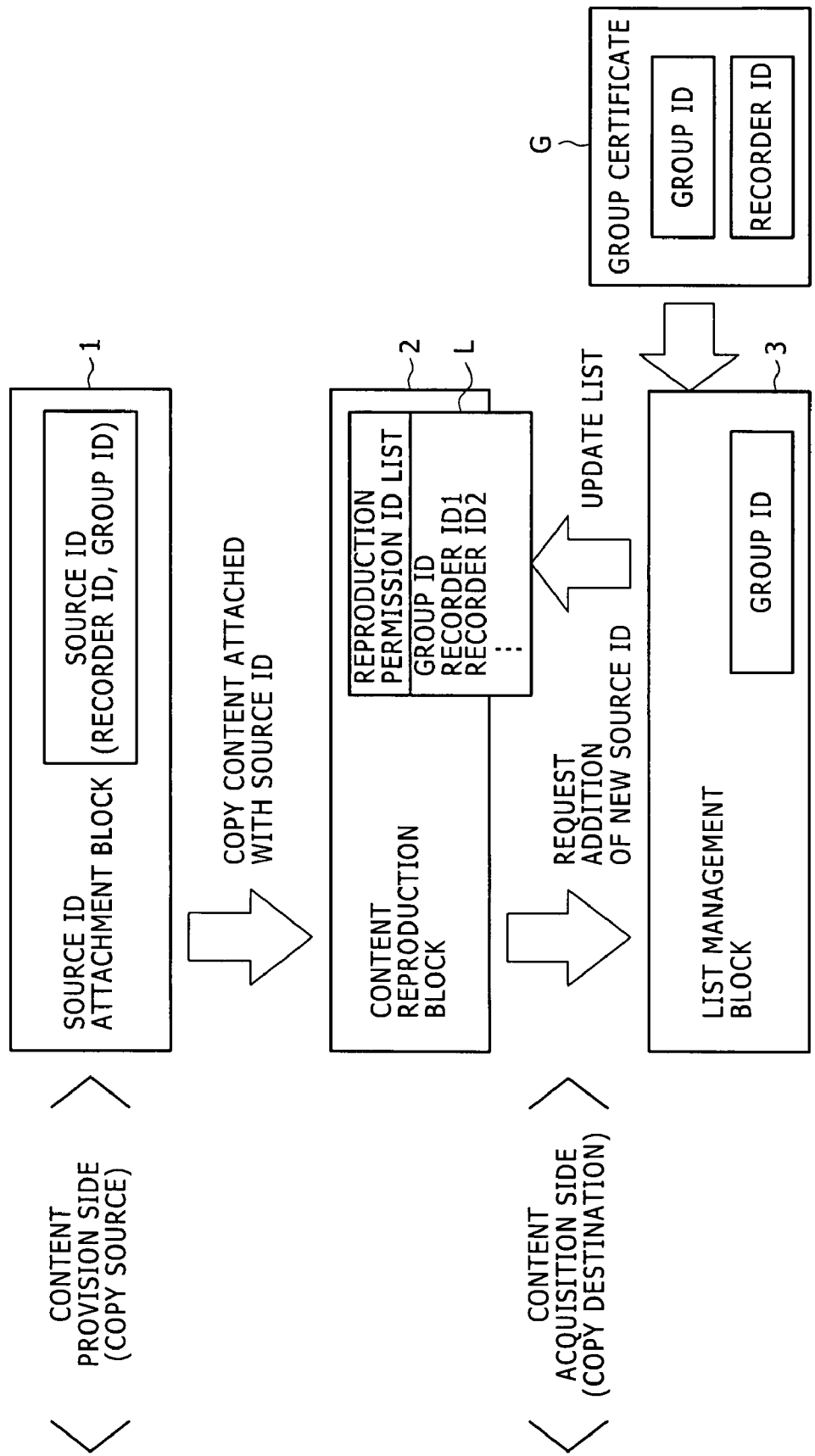
FIG. 2 is a block diagram illustrating main components of the above-mentioned content sharing system.

The following describes an outline of a content sharing management method with reference to FIG. 2. FIG. 2 is a block diagram of main components of the content sharing system 100 associated with the first embodiment.

As shown in FIG. 2, the content sharing system 100 associated with the first embodiment has main components of a source ID attachment block 1, a content reproduction block 2, and a list management block 3.

The source ID attachment block 1 is arranged along with a content data recorder and recording software in the content processing apparatus 10 having content recording capabilities and the server 20 having content distribution capabilities. The source ID attachment block 1 has a source ID that is uniquely assigned on a content data providing source basis and has a capability of attaching the above-mentioned source ID to content data when creating or distributing the content data.

"Providing source of content data" (hereafter referred to as a content providing source) herein denotes a device or a user from which the content data to be shared in the content sharing system 100 is outputted a personal user level. To be specific, the content providing source is (1) a user who acquired (or purchased, for example) content by the use of a content distribution service; (2) the content processing apparatus 10 that recorded content by means of ripping or self recording. The above-mentioned source ID is an identifier that is uniquely assigned to each of these content providing sources. This source ID allows the identification of a content providing source (namely, a source from which content is outputted).

In the first embodiment, the above-mentioned source ID includes a recorder ID and the above-mentioned group ID, for example.

The recorder ID is an identifier that is uniquely assigned to each content processing apparatus 10 (namely, a recording device) having a content data recording capability. This recorder ID is assigned by the content processing apparatus 10 that creates content data to the created content data, for example. "Created content data" denotes the content data created by the above-mentioned recording device by ripping, self recording, or editing. Therefore, the recorder ID allows the identification of the recording device by which created content data was created.

The group ID is an identifier that is uniquely assigned to each user owning the content processing apparatus 10. To be specific, the group ID is assigned to each user account of the content sharing service that is provided by the content sharing system 100 associated with the first embodiment. The group ID allows the identification of the device group to which the content processing apparatus 10 belongs and the owner thereof.

Further, in the first embodiment, the group ID is also used as the user ID that is assigned to each user account of the content distribution service (namely, an electronic music distribution service). The group ID is added to the distributed content data distributed from the server 20 to the content processing apparatus 10. Therefore, the group ID also allows the identification of the user who acquired (or purchased, for example) the distributed content data from a distribution server.

The content data attached with the above-mentioned source ID (recorder ID or the group ID) by the source ID attachment block 1 is copied from the content processing apparatus 10 on the content providing side to the content processing apparatus 10 on the content acquisition side. It should be noted that, at the copying of content data, the copy limitation processing based on a total copy count as with related-art copyright management systems is not executed. Therefore, content data may be copied without restriction between a plurality of content processing apparatuses 10.

The content reproduction block 2 is a content data reproducing device or a content data reproducing software program for PC arranged on the content processing apparatus on the side of acquiring and using content. The content reproduction block 2 has a reproduction permission ID list L that is a list of source IDs (or a list of source IDs indicative of sources from which sharable content is outputted) permitting the reproduction of content data on the content reproduction block 2. The reproduction permission ID list L is arranged for each content reproduction block 2. Therefore, for different content reproduction blocks 2, reproduction-permitted source IDs contained in the reproduction permission ID lists L for these content reproduction blocks 2 are also different. Each reproduction permission ID list may include a plurality of recorder IDs, but only one group ID.

In reproducing content data attached with the above-mentioned source ID, the content reproduction block 2 checks the above-mentioned reproduction permission ID list L to enable or disable the reproduction of the content data. Namely, if the source ID attached to the content data is included in the reproduction permission ID list L, the content reproduction block 2 is able to reproduce that content data; on the other hand, if the source ID attached to the content data is not included in the reproduction permission ID list L, the content reproduction block 2 is unable to reproduce that content data. Thus, the content reproduction block 2 restricts the reproduction of content data on a source ID basis, namely, in unit of content providing source.

In addition, the content reproduction block 2 may request the list management block 3 for adding a new source ID to the reproduction permission ID list L of the content reproduction block 2, for example. Namely, in order to reproduce content data attached with a new source ID not included in the reproduction permission ID list L of the content reproduction block 2, the content reproduction block 2 must add that new source ID to the reproduction permission ID list L. Therefore, the content reproduction block 2 must request the list management block 3 that permits the updating of the reproduction permission ID list L for the additional permission of that new source ID.

The list management block 3 is arranged on the content processing apparatus on the side of acquiring and using content. The list management block 3 updates the reproduction permission ID list L of the above-mentioned content reproduction block 2. The updating of reproduction permission ID list L herein denotes the addition or deletion of a source ID to or from the reproduction permission ID list L and the change of source IDs therein. By adding or deleting a source ID to or from the reproduction permission ID list L, the list management block 3 is able to permit or not permit the reproduction of the content data attached with that source ID in the content reproduction block 2.

The list management block 3 obtains a group certificate G that is shared information in which group ID and recorder ID are related with each other and updates the reproduction permission ID list L on the basis of this group certificate G. To be more specific, if the group ID included in the group certificate G is the same as the group ID included in the above-mentioned reproduction permission ID list L, then the list management block 3 adds the group ID included in the group certificate G to the reproduction permission ID list L. Consequently, the recorder ID of the content processing apparatus 10 (or recording device) registered in the device group of the same user may be included in the reproduction permission ID list L, thereby reproducing the content data obtained from that recording device.

As described above, with the content sharing system 100, the reproduction of content data is controlled by the source ID attachment block 1, the content reproduction block 2, and the list management block 3, thereby executing the sharing management of the content that is copied between the content processing apparatuses 10.

Figure 3:
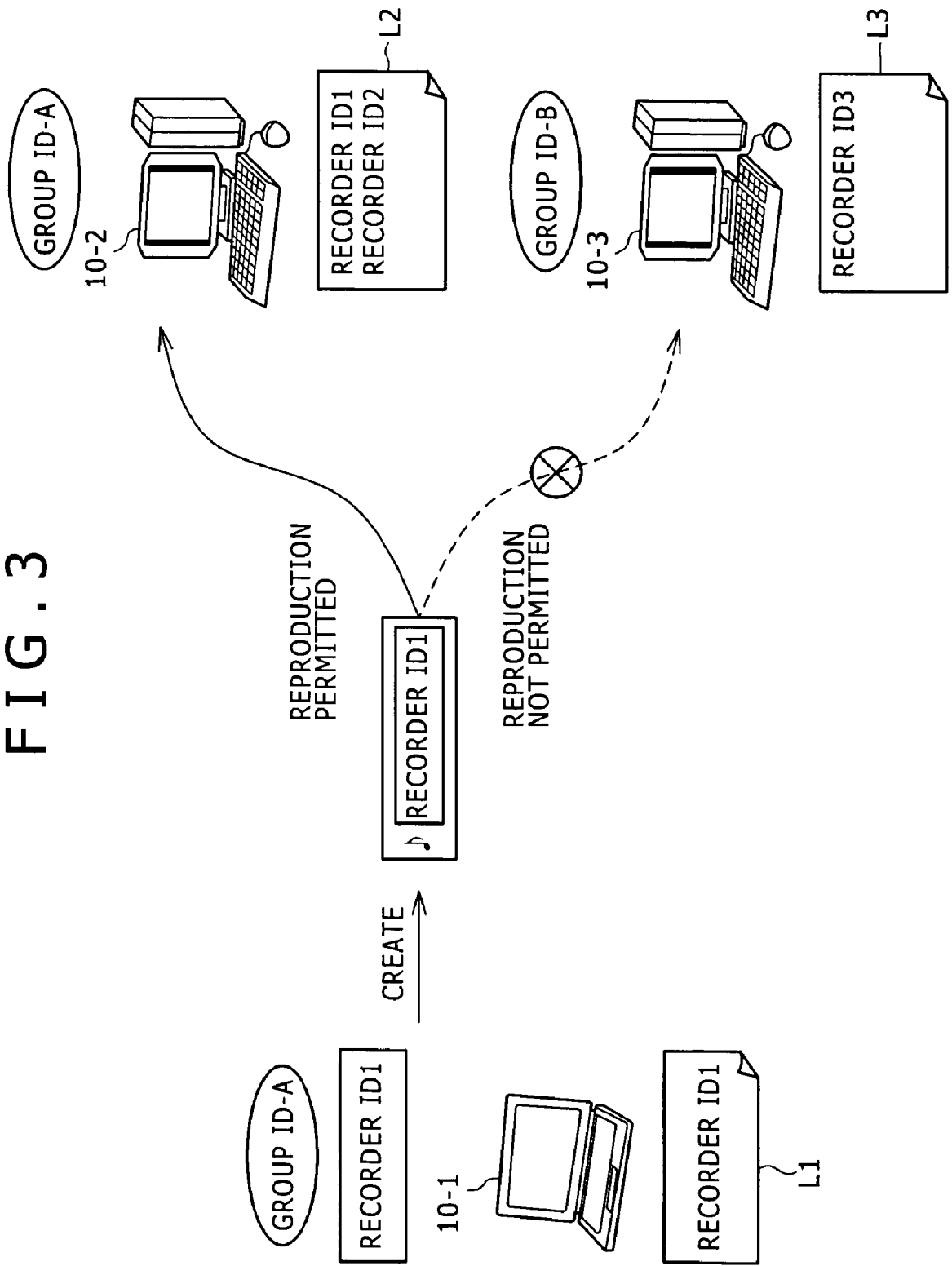
FIG. 3 is a schematic diagram illustrating a specific example in which content data is shared in the above-mentioned content sharing system.

The following describes a specific example of sharing content data in the content sharing system 100 having the source ID attachment block 1, the content reproduction block 2, and the list management block 3, with reference to FIG. 3. FIG. 3 shows a specific example of sharing content data in the content sharing system 100 associated with the first embodiment.

As shown in FIG. 3, the content processing apparatus 10-1 and the content processing apparatus 10-2 are owned by the same user A and have the same group ID-A as a result of the above-mentioned group registration processing. On the other hand, the content processing apparatus 10-3 is owned by user B and has group ID-B as a result of the above-mentioned group registration processing.

In the group registration status as mentioned above, the content processing apparatus 10-2 may add recorder ID1 of the content processing apparatus 10-1 belonging to the same device group to reproduction permission ID list L2 of the content processing apparatus 10-2. On the other hand, the content processing apparatus 10-3 cannot add recorder ID1 of the content processing apparatus 10-1 belonging to a different device group to reproduction permission ID list L3 of the content processing apparatus 10-2.

Having generated created content data C1 by ripping for example, the content processing apparatus 10-1 attaches recorder ID1 thereof to this created content data C1. If an attempt is made to share between the content processing apparatuses 10-1 through 10-3, the content processing apparatus 10-2 is able to reproduce this content data C1 because recorder ID1 is included in reproduction permission ID list L2 of the content processing apparatus 10-2. On the other hand, the content processing apparatus 10-3 is unable to reproduce this content data C1 because recorder ID1 is not included in the reproduction permission ID list L3 of the content processing apparatus 10-3.

Thus, if recorder ID is stored in reproduction permission ID list L, the created content data C1 attached with the recorder ID concerned may be copied for reproduction. Namely, the sharing of created content data C1 between the content processing apparatuses 10-1 through 10-3 is controlled on a recording device basis (or in unit of recorder ID). Therefore, group-registering a plurality of content processing apparatuses 10 that are owned by the user and adding recorder ID to reproduction permission ID list L between these content processing apparatuses (device sharing registration) in advance allow the user to share content data without restriction between these content processing apparatuses.

Thus, the content sharing system 100 associated with the first embodiment has been outlined. The following describes in detail the specific configurations of the content sharing system 100 and the components thereof.

2. System Configuration

Figure 4:
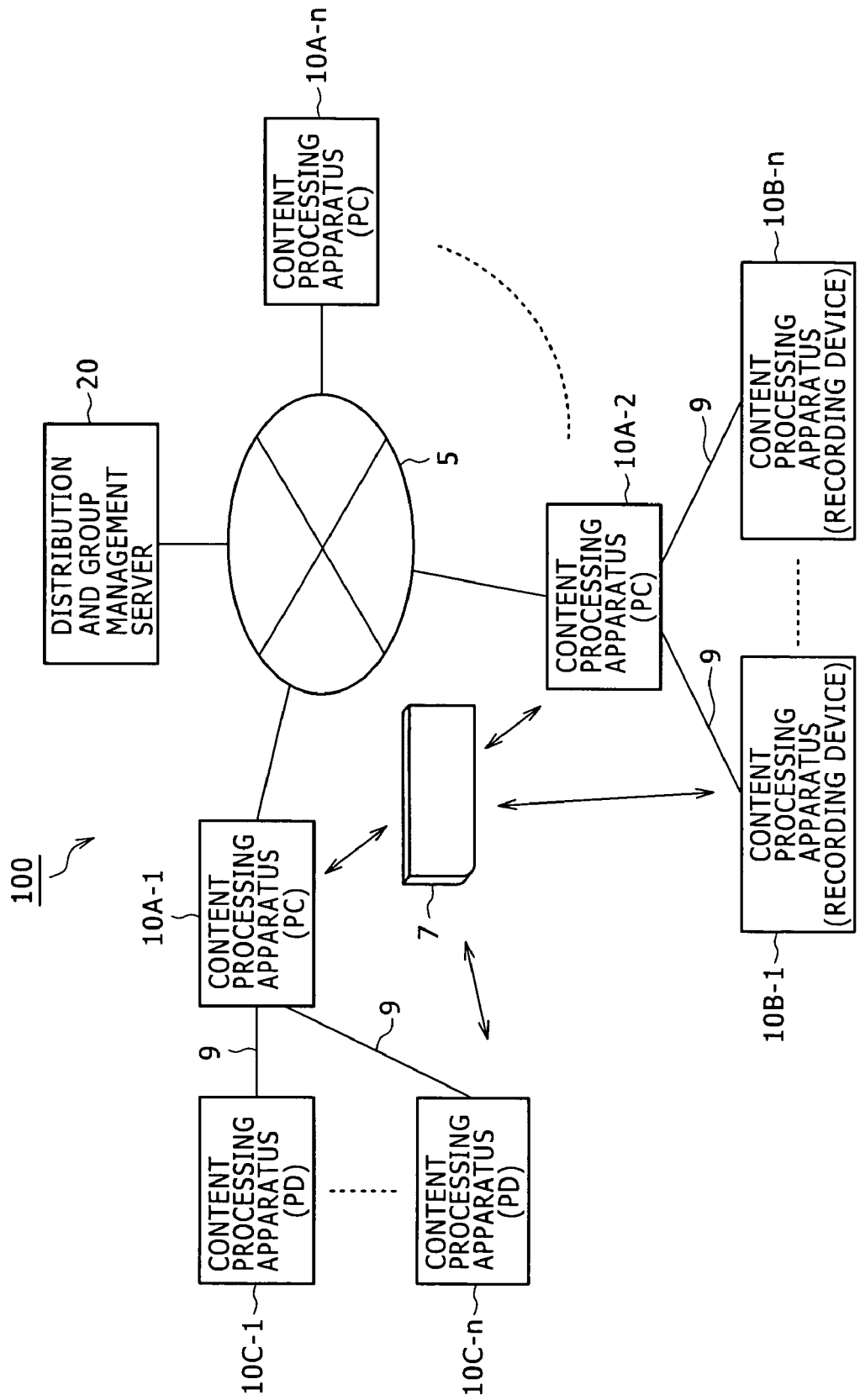
FIG. 4 is a block diagram approximately illustrating an overall configuration of the above-mentioned content sharing system.

The following describes an overall configuration of the content sharing system 100 associated with the first embodiment with reference to FIG. 4. FIG. 4 is a block diagram approximately illustrating an overall configuration of the content sharing system 100.

As shown in FIG. 4, the content sharing system 100 associated with the first embodiment is made up of a plurality of content processing apparatuses 10A-1, 2, . . . , n, 10B-1, . . . , n, 10C-1, . . . , n (hereafter sometimes generically referred to as the content processing apparatus 10), the distribution and group management server 20, a network 5 and a local line 9 for interconnecting these apparatuses, and a recording medium 7.

The content processing apparatus 10 is configured as a content reproduction apparatus and/or a content recording apparatus associated with the first embodiment. This content processing apparatus 10 is one of various recording/reproducing apparatuses, recording-only apparatuses, or reproduction-only apparatuses that is capable of recording/reproducing content data such as video or audio to/from the recording medium 7 or an incorporated storage unit. To be more specific, the content processing apparatus 10 may be a computer such as personal computer (PC) (whether notebook type or desktop type), a PDA (Personal Digital Assistant), a portable video player/recorder, a portable audio player/recorder such as MP3 player or IC player/recorder, an imaging device such as digital camera or video recorder, a home game machine, VTR, CD, MD or DVD recorder/player, a radio set, a mobile phone, a PHS, or a home information appliance, for example.

The content processing apparatus 10 is classified into the content processing apparatus 10A that is a recording/reproducing apparatus capable of installing the software for the above-mentioned content sharing service, the content processing apparatus 10B that is a recording/reproducing apparatus (the reproduction capability is not always required) incapable of installing the software for the above-mentioned content sharing service, and the content processing apparatus 10C that is a reproduction-only apparatus. To be more specific, the content processing apparatus 10A corresponds to a computer such as PC, for example. The content processing apparatus 10B corresponds to a recording device such as DVD recorder, for example. The content processing apparatus 10C corresponds to a reproduction-only portable device (PD). It should be noted that the content processing apparatus 10B and the content processing apparatus 10C may be connected to the content processing apparatus 10A via the local line 9. The local line 9 may be made up of a wired cable such as USB (Universal Serial Bus) cable or SCSI (Small Computer System Interface) cable or may be configured in a wireless manner.

Of these content processing apparatuses 10, the content processing apparatuses 10A and 10B having a recording capability are capable of newly creating content and recording the created content by means of self recording and ripping, for example. It should be noted that "self recording" denotes the recording of audio/video data picked up/imaged by a sound pickup device/an imaging device of the content processing apparatus 10 or audio/video data received by a communication unit of the content processing apparatus 10 as audio/video data. "Ripping" denotes a sequence of processing operations for extracting of digital content data (audio data/video data, for example) from a recording media such as music CD, video DVD, or CD-ROM for software, converting the extracted content data in a file format that may be processed by a computer, and recording the converted content data.

The content processing apparatus 10A is also capable of recording distributed content data received from the distribution and group management server 20 to recording means such as a storage unit or the recording medium 7.

In addition, the content processing apparatus 10 is capable of transferring the above-mentioned created content data and distributed content data with other content processing apparatuses 10 via the network 5 and the local line 9 or passing these pieces of content data by means of the recording medium 7.

Further, the content processing apparatus 10 is capable of reproducing the created content data created by itself and the distributed content data received by itself. Moreover, the content processing apparatus 10 is capable of reproducing the created content data or the distributed content data obtained from other content processing apparatuses 10 if these pieces of content data are permitted for reproduction.

It should be noted that the content processing apparatus 10 associated with the first embodiment has components corresponding to the above-mentioned source ID attachment block 1, content reproduction block 2, and list management block 3 and has a content data copyright management capability, of which details will be described later.

The distribution and group management server 20 is configured as a group management server associated with the first embodiment and also as a distribution server for providing content distribution services such as EMD (Electronic Music Distribution). This distribution and group management server 20 is based on a computer having a server capability, for example.

The distribution and group management server 20 is capable of executing user authentication as a function of the above-mentioned group management server and group-registering the content processing apparatuses 10 in unit of users having the content processing apparatuses 10. Also, as a function of the above-mentioned distribution server, the distribution and group management server 20 is capable of distributing content data to the content processing apparatus 10 owned by the user of content distribution services via the network 5. If this content data is music content data, this data may be compressed by a data compression algorithm such as MP3 (MPEG Audio Layer-3) for example before being distributed. It should be noted that the distribution and group management server 20 has a component corresponding to the above-mentioned source ID attachment block 1 for example, of which details will be described later.

As described above, the distribution and group management server 20 is, but not exclusively, an integration of a group management server and a distribution server. Alternatively, the group management server and the distribution server may be arranged as separate servers.

The network 5 is a communication line network for interconnecting a plurality of content processing apparatuses 10 and the distribution and group management server 20 in a bidirectionally communicable manner. The network 5 is based on public line networks such as the Internet, telephone line network, and satellite communication line network or leased line networks such as WAN, LAN, IP-VPN. The network 5 may be either wired or wireless.

In addition, the network 5 includes a private network. The private network herein denotes a network for interconnecting a plurality of content processing apparatuses 10 for sharing content data within a range of private use as viewed from the point of copyright management. A specific example of this private network includes a network for interconnecting a plurality of content processing apparatuses 10 used by the same user, a home network for interconnecting a plurality of content processing apparatuses 10 used in the same home, and a LAN for interconnecting a plurality of content processing apparatuses 10 used within a small-scale, limited group (a company, friends, etc.), for example.

The recording medium 7 is a removable medium capable of storing various kinds of data such as content data and group certificates G. The recording medium 7 is based on any one of various kinds of optical disks 3 such as DVD-R, DVD-RW, DVD-RAM, CD-R, CD-RW, and magneto-optical disk, magnetic disks such as flexible disk and hard disk, and various kinds of semiconductor memories. It should be noted that this recording medium 7 may be a recording medium having a copyright management capability for restricting the copying and reproducing of content data by use of an encryption key.

This recording medium 7 functions as a content data providing and acquiring medium between a plurality of content processing apparatuses 10. For example, the recording medium 7 written with content data by the content processing apparatus 10-1 may be loaded on the content processing apparatus 10-2 to read the content data from the recording medium 7, thereby providing the content data from the content processing apparatus 10-1 to the content processing apparatus 10-2. In addition, the content processing apparatus 10-1 is capable of providing/acquiring content data by means of the recording medium 7 with the content processing apparatus 10C that is incapable of connecting to the network 5. Further, the recording medium 7 functions as a group certificate G providing/acquiring medium between the distribution and group management server 20 and a plurality of content processing apparatuses 10.

The content sharing system 100 having the above-mentioned configuration allows the sharing of same content by providing and acquiring (namely, copying) content data between a plurality of content processing apparatuses 10. Further, the content sharing system 100 enables or disables, on a source ID basis, the reproduction of content data shared between a plurality of content processing apparatuses 10 by means of the above-mentioned source ID attachment block 1, content reproduction block 2, and list management block 3. Consequently, copyright management may be efficiently executed and content may be copied for reproduction relatively freely within a range of private use.

3. Content Processing Apparatus

Figure 5:
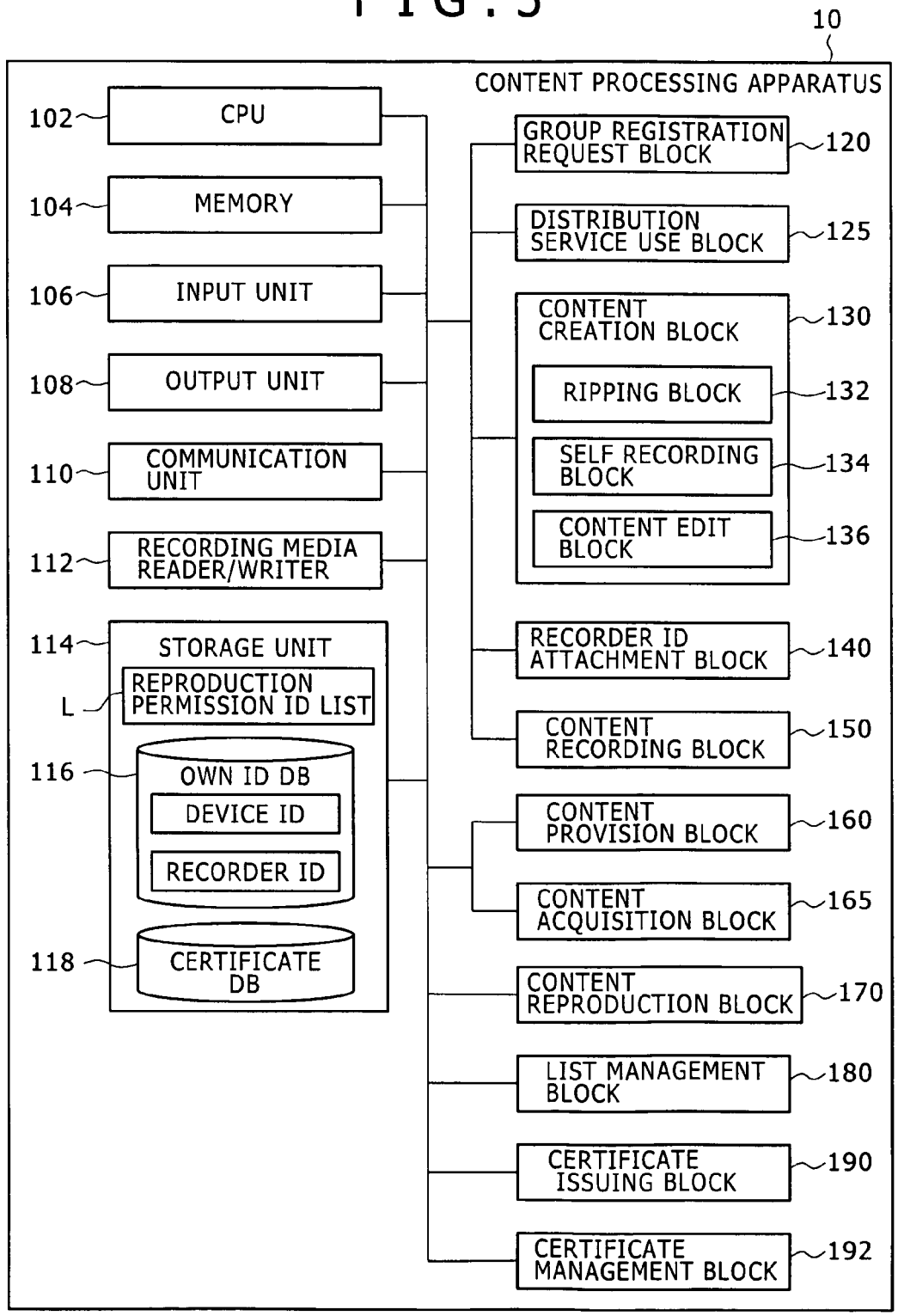
FIG. 5 is a block diagram approximately illustrating a configuration of a content processing apparatus associated with the above-mentioned first embodiment.

The following describes in detail the configuration of the content processing apparatus 10 associated with the first embodiment with reference to FIG. 5. FIG. 5 is a block diagram approximately illustrating the configuration of the content processing apparatus 10. It should be noted that, in FIG. 5, a configuration of the content processing apparatus 10A based on the above-mentioned PC for example is illustrated.

As shown in FIG. 5, the content processing apparatus 10 has a CPU 102, a memory 104, an input unit 106, an output unit 108, a communication unit 110, a recording media reader/writer 112, a storage unit 114, a group registration request block 120, a distribution service use block 125, a content creation block 130, a recorder ID attachment block 140, a content recording block 150, a content provision block 160, a content acquisition block 165, a content reproduction block 170, a list management block 180, a certificate issuing block 190, and a certificate management block 192.

The CPU 102, functioning as a computation processing unit and a control unit, controls the processing of each component of the content processing apparatus 10. The memory 104, based on a RAM, a ROM, or a cache memory, for example, temporarily stores various kinds of data necessary for the processing by the CPU 102 and operation programs of the CPU 102.

The input unit 106 is made up of operation means such as a mouse, a keyboard, a touch panel, buttons, switches, and levers for example and an input control circuit for generating input signals and outputting them to the CPU 102. Operating the input unit 106, the user of the content processing apparatus 10 enters various data into the content processing apparatus 10 and gives instructions for processing operations.

The output unit 108 is made up of display devices such as a CRT display device, a liquid crystal display (LCD), and lamps and an audio output device such as a speaker, for example. The output unit 108 is capable of outputting content data reproduced by the content reproduction block 170 to be described later. To be more specific, the display device displays GUI screens for reproduced video data, electronic books, games, and various software programs. On the other hand, the audio output device is capable of sounding reproduced audio data. It should be noted that, if the content processing apparatus 10 is configured as a content recording only apparatus, this output unit 108 may not always be arranged. If the content data to be handled by the content processing apparatus 10 is only audio data, the display device need not be arranged. If the content data is only video data, the audio output device need not be arranged.

The communication unit 110 is a communication interface based on a communication line, a communication circuit, and a communication device, for example. The communication unit 110 supports the transfer of various kinds of data such as content data, reproduction permission ID list L, group certificate G, and control signals with other content processing apparatuses 10, distribution and group management server 20, and other external equipment via the network 5 or the local line 9, for example.

The recording media reader/writer 112 records/reproduces various kinds of data such as content data, reproduction permission ID list L, and group certificate G to/from the recording medium 7, for example. If the recording medium 7 is an optical disk for example, the recording media reader/writer 112 is made up of a disk drive such as an optical disk drive for example; if the recording medium 7 is a semiconductor memory, the recording media reader/writer 112 is made up of a semiconductor memory reader/writer, for example. It should be noted that the recording media reader/writer 112 may be either incorporated in the content processing apparatus 10 or arranged external thereto.

The storage unit 114 is a data storage unit based on a hard disk drive or a flash memory for example, storing various kinds of data such as programs and content data.

The storage unit 114, configured as storage means associated with the first embodiment, stores the group ID (the first group ID) transmitted from the distribution and group management server 20 to the content processing apparatus 10. In addition, the storage unit 114 stores reproduction permission ID list L corresponding to the content reproduction block 170 of the content processing apparatus 10 itself. This reproduction permission ID list L is stored in an encrypted form or in a signatured form so as to prevent the data falsification by the user, for example.

In the first embodiment, the group ID transmitted from the distribution and group management server 20 to the content processing apparatus 10 is stored as included in this reproduction permission ID list L. This is because the group ID is used as the source ID for distributed content data, thereby controlling the reproduction of the distributed content data on the basis of the group ID. It should be noted that the group ID may not always be stored in reproduction permission ID list L; namely, the group ID may be stored in another storage area of the storage unit 114, the own ID database 116 for self ID for example, or the memory 104 or the recording medium 7. This reproduction permission ID list L may also be stored in the memory 104 or the recording medium 7 rather than in the storage unit 114.

Further, the storage unit 114 stores an own ID database 116 including the device ID and recorder ID corresponding to the content processing apparatus 10 itself. The device ID is an identifier that is uniquely assigned to each of all the content processing apparatuses 10 at least having content recording or reproducing capabilities. By this device ID, each content processing apparatus 10 may be uniquely identified. This device ID includes a terminal ID and media ID, for example. The terminal ID is a device ID that is uniquely assigned to the content processing apparatus 10A configured by an information processing apparatus such as a PC, for example. The media ID is an identifier that is uniquely assigned to a storage medium of each of the content processing apparatuses 10B and 10C configured by a recording device or a PD, for example.

The recorder ID is an identifier that is uniquely assigned to the content processing apparatus 10 having a recording capability as described above and not assigned to the reproduction-only content processing apparatus 10. Therefore, the own ID database 116 of the reproduction-only content processing apparatus 10 stores no recorder ID.

The above-mentioned device ID and recorder ID are securely stored in the own ID database 116 in the encrypted form before the shipment of the content processing apparatus 10 from factory, for example. This prevents the user of the content processing apparatus 10 from falsifying the device ID and the recorder ID.

In addition, the storage unit 114 stores a certificate database 118. The certificate database 118 stores group certificate G issued by a certificate issuing block 190 to be described later and group certificate G obtained from another content processing apparatus 10 or the distribution and group management server 20. Further, the certificate database 118 may store the dates of issue and acquisition of group certificate G.

The group registration request block 120 requests the distribution and group management server 20 for group registration of the content processing apparatus 10. In this group registration request processing, the group registration request block 120 transmits group registration request information (group registration request notification, user ID, credit card number, and device ID, for example) to the distribution and group management server 20. Also, in response to the group registration of the content processing apparatus 10, the group registration request block 120 receives the group ID from the distribution and group management server 20. Further, the group registration request block outputs the received group ID and group registration notification to the list management block 180, for example.

The group registration request block 120 may also request the distribution and group management server 20 for group-unregistration of the content processing apparatus 10. As with the registration processing, the group registration request block 120 transmits group unregistration request information (group unregistration request notification, user ID, credit card number, and device ID, for example) to the distribution and group management server 20. When unregistration has been completed, the group registration request block 120 notifies the list management block 180 thereof.

The distribution service use block 125 receives distributed content data from the distribution and group management server 20 via the network 5 and the communication unit 110. Namely, when the user of the content processing apparatus 10 purchases for example content data by use of content distribution services, the distribution service use block 125 downloads the content data from the distribution and group management server 20. The distributed content data thus received is attached with the group ID corresponding to the content processing apparatus 10 itself by the distribution and group management server 20. The distribution service use block 125 records the received distributed content data to the storage unit 114 or the recording medium 7, for example.

The distribution service use block 125 is capable of transferring such various kinds of information necessary for the user to use content distribution services as user authentication information (user ID, password, and so on), charging information, and content distribution request information for example with the distribution and group management server 20 and supporting the input/output of these kinds of information. The distribution service use block 125 is configured by installing, on the content processing apparatus 10, the content distribution service software corresponding to each content distribution service to be used. It should be noted that the distribution service use block 125 may be arranged in plural for a plurality of content distribution services to be used by the user.

The content creation block 130 is capable of newly creating content data. The content creation block 130 has a ripping block 132, a self recoding block 134, and a content edit block 136, for example.

The ripping block 132 is capable of ripping the data from recording media such as music CD and video DVD for example. To be more specific, the ripping block 132 controls the recording media reader/writer 112 in accordance with user inputs to take a file such as music/video data out of the above-mentioned recording media, converts the obtained music/video data into a file format (MP3 for example) that can be processed by the content processing apparatus 10, and creates content data, for example. The data to be ripped includes those recorded to CDs and self-recorded data. The ripping block 132 is configured by installing ripping software on the content processing apparatus 10, for example.

The self recoding block 134 is capable of newly creating content data by self audio/video recording. The self recoding block 134 has a sound pickup device such as microphone, an image device such as camera, an audio/video recording device, and a recording control block for controlling these devices, for example. The self recoding block 134 thus configured generates audio data or video data for example by picking up sound or imaging a subject around the content processing apparatus 10 on the base of user inputs for example and executes predetermined data processing on the created data, thereby newly creating content data. In addition, the self recoding block 134 is capable of converting audio/video data such as television program or radio program received by the communication unit 110 for example into a recordable format, thereby newly creating content data.

By editing (manipulating, combining, linking, or the like) one or more pieces of content data, the content edit block 136 is capable of generating user-unique new content data. Further, on the basis of user inputs, the content edit block 136 is capable of creating new video data by executing draw processing, newly creating audio data by executing music composition processing, creating new electronic book data by executing document creation processing, and creating new software made up of program lists, for example. The content edit block 136 is configured by installing the software for content edit/creation on the content processing apparatus 10, for example.

The content data (namely, the created content data) created by the content creation block 130 described above is outputted to the recorder ID attachment block 140.

The recorder ID attachment block 140 is a component corresponding to the source ID attachment block 1 shown in FIG. 2. The recorder ID attachment block 140 attaches a recorder ID to the created content data created by the above-mentioned content creation block 130, for example. To be more specific, the recorder ID attachment block 140 reads the recorder ID from the self ID database in the storage unit 114 and attaches this recorder ID to the created content data, for example.

The recorder ID is attached when the creation of content data has been completed by the content creation block 130, for example. Instantly attaching the source ID to content data allows the sure embedding of the source ID for the content data requiring copyright management before this content data is distributed in the system. It should be noted that the source ID attachment timing is not limited to that described above; for example, the source ID may also be attached when created content data is reproduced for the first time, created content data is copied, or created content data is provided to another content processing apparatus 10.

Figure 6:
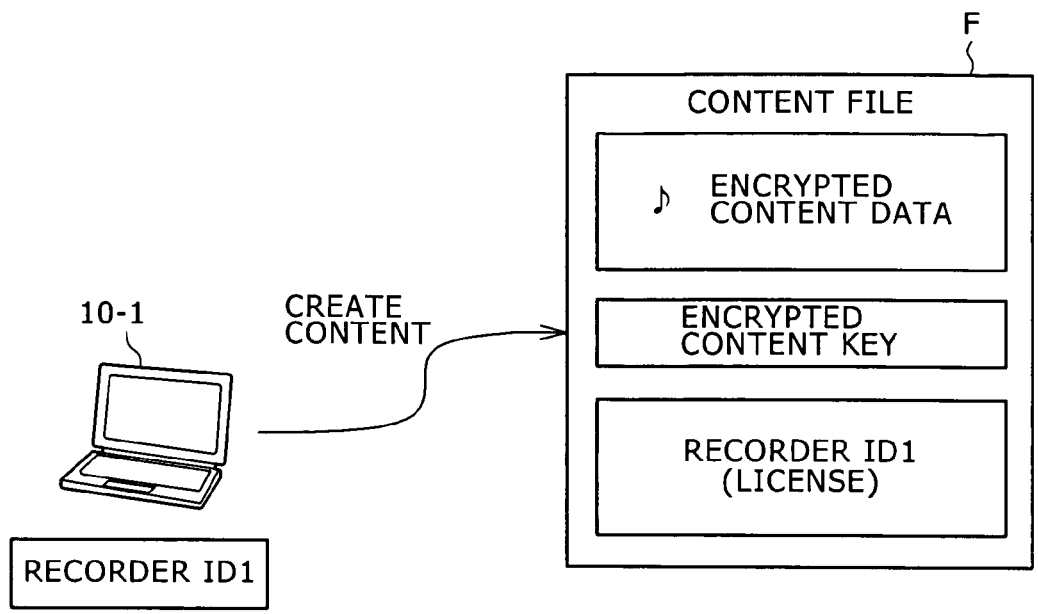
FIG. 6 is a schematic diagram illustrating a configuration of content data attached with a recorder ID associated with the first embodiment.

The following describes a method of attaching a recorder ID by the recorder ID attachment block 140 with reference to FIG. 6. As shown in FIG. 6, the recorder ID attachment block 140 of the content processing apparatus 10-1 attached with recorder ID1 is capable of creating content file F of created content data attached with recorder ID1 by use of an encryption technique, for example.

This content file F includes content data encrypted with a content encryption key, a content encryption key encrypted by a system common key that may be handled only by the content sharing system 100, and a license which contains recorder ID1. The license is encrypted to detect any falsification attempt. By creating content file F described above, the recorder ID attachment block 140 is capable of securely embed the recorder ID into the content data. Also, the content processing apparatus 10 holds common secret information so as to allow the decryption of the encrypted content key and the checking of the license for falsification, for example. Therefore, if the content data attached with the recorder ID is shared in the content sharing system 100, the falsification of the recorder ID attached to the content data may be suitably prevented.

In another source ID attachment method, the recorder ID attachment block 140 may use a digital watermark technology to attach a source ID to content data. Namely, video data or audio data that is content data is distorted in some manner, thereby allowing only the digital watermark detector to extract the source ID from the content data. Consequently, if content data is transferred as analog data between a plurality of content processing apparatuses 10, this approach allows to maintain the source ID in the content data. This in turn allows the execution of the copyright management of content in a stricter manner.

As described above, the recorder ID attachment block 140 outputs the created content data attached with the recorder ID corresponding to the recorder ID attachment block 140 to the content recording block 150.

Thus, the recorder ID attachment block 140 has been described. It should be noted that, in the first embodiment, each content processing apparatus 10 having a content data recording capability has the recorder ID attachment block 140 of its own, thereby attaching a recorder ID corresponding to that content processing apparatus 10 to created content data. However, the first embodiment is not limited to this configuration. For example, a server apparatus such as a home network server is arranged in a private network in which a plurality of content processing apparatuses 10 are interconnected and this server apparatus may execute recorder ID attachment processing for and on behalf of all the interconnected content processing apparatuses 10 in the private network.

The content recording block 150 controls the storage unit 114 or the recording media reader/writer 112 for example to record the created content data attached with a recorder ID by the above-mentioned recorder ID attachment block 140 to the storage unit 114 or the recording medium 7. Also, the content recording block 150 is capable of recording the distributed content data received by the above-mentioned distribution service use block 125 and the content data acquired externally by the content acquisition block 165 in the same manner as above.

The content provision block 160 is capable of providing content data attached with a source ID (for example, created content data attached with a recorder ID or distributed content data attached with a group ID) to external content processing apparatuses 10. The content acquisition block 165 is capable of acquiring content data attached with a source ID from external content processing apparatuses 10. The content provision block 160 and the content acquisition block 165 may execute these content data provision and acquisition processing operations by the transmission/reception processing via the network 5 or the local line 9 or via the recording medium 7.

In the case of providing/acquiring content data via the network 5, the content provision block 160 controls the communication unit 110 to function as a content transmission control block for transmitting the content data via the network 5 or the local line 9 and the content acquisition block 165 controls the communication unit 110 to function as a content reception control block for receiving the content data via the network 5 or the local line 9, for example.

On the other hand, in the case of providing/acquiring content data via the recording medium 7, the content provision block 160 controls the recording media reader/writer 112 to function as a content write control block for writing the content data to the recording medium and the content acquisition block 165 controls the recording media reader/writer 112 to function as a content read control block for reading the content data from the recording medium, for example.

The content reproduction block 170 is a component corresponding to the content reproduction block 2 shown in FIG. 2. The content reproduction block 170 is made up of a reproduction unit for reproducing content or content reproduction software installed on the content processing apparatus 10, thereby reproducing various kinds of content data. The content data reproduced by the content reproduction block 170 is outputted from the above-mentioned output unit 108.

The content reproduction block 170 holds reproduction permission ID list L corresponding thereto in the storage unit 114 for example. When reproducing the content data attached with the above-mentioned source ID, the content reproduction block 170 controls the reproduction of the content data depending on whether that source ID is included in reproduction permission ID list L. The details of the content reproduction block 170 will be described later.

It should be noted that two or more content reproduction blocks 170 may be arranged for each content processing apparatus 10. For example, two or more content reproduction blocks 170 may be arranged in one content processing apparatus 10 by installing two or more content reproduction software programs, arranging two or more reproduction units, or installing and arranging both the content reproduction software and units, for example.

In this case, the above-mentioned reproduction permission ID list L may be provided for each of the plurality of content reproduction blocks 170. Consequently, two or more content reproduction blocks 170 may control the reproduction of the content data attached with source ID in accordance with reproduction permission ID list L owned by each content reproduction block 170. It is also practicable for one content processing apparatus 10 to hold only one reproduction permission ID list L, which is shared between a plurality of content reproduction blocks 170. Consequently, in the same content processing apparatus 10, the control of reproduction of content data attached with source ID may be integrated without regard to the content reproduction block 170 that executes reproduction processing.

The list management block 180 is a component corresponding to the list management block 3 shown in FIG. 2. For example, the list management block 180 has a capability of updating reproduction permission ID list L stored in the storage unit 114. The details of the list management block 180 will be described later.

The certificate issuing block 190 has a capability of issuing group certificate G for certifying a device group to which the content processing apparatus 10 itself belongs, for example. The certificate issuing block 190 is configured by certificate issuing software installed on the content processing apparatus 10, for example. The certificate issuing block 190 is provided for the content processing apparatus 10A having a content recording capability and may not be provided for the content processing apparatuses 10B and 10C such as the above-mentioned PC, for example.

Figure 7:
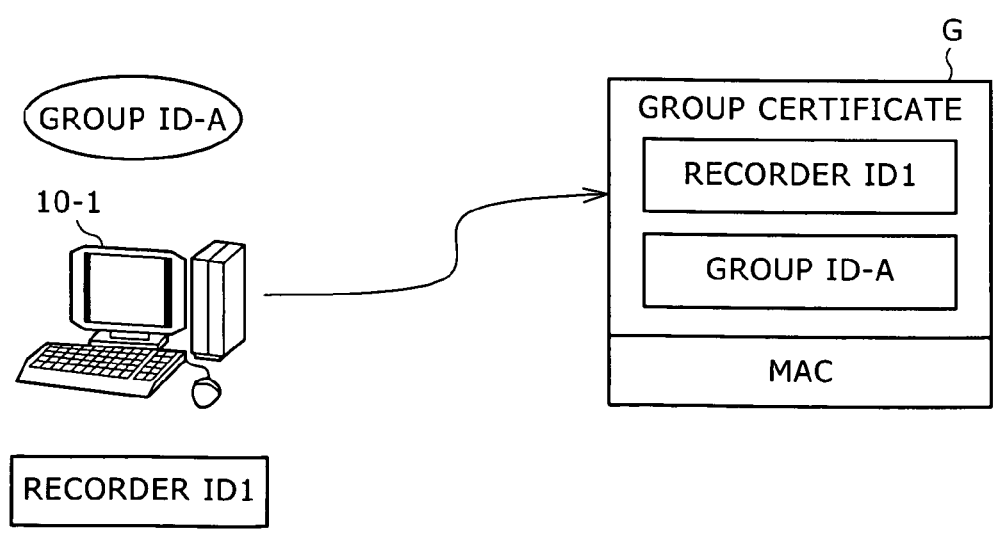
FIG. 7 is a schematic diagram approximately illustrating a configuration of a group certificate associated with the first embodiment.

As shown in FIG. 7, the certificate issuing block 190 issues group certificate G in the state wherein the content processing apparatus 10-1 holds group-registered group ID-A as described above. This group certificate G includes group ID-A corresponding to the user of the content processing apparatus 10-1 and recorder ID1 corresponding thereto. This group certificate G allows certification that the content processing apparatus 10-1 corresponding to recorder ID1 belongs to the device group of the user identified by group ID-A. Also, group certificate G is attached with a digital signature for falsification detection, MAC (Message Authentication Code) for example. This configuration allows the prevention of falsification of group certificate G.

In issuing group certificate G described above, the certificate issuing block 190 reads the recorder ID and group ID corresponding to the content processing apparatus 10 itself from the storage unit 114, encrypts these recorder ID and group ID by digital signatures, and generates and issues group certificate G.

After group registration of the content processing apparatus 10, the certificate issuing block 190 is capable of issuing a group ID any time, for example. For example, in accordance with an input made by the user of the content processing apparatus 10 or in response to a certificate issue request from a certificate issue request block 194 of another content processing apparatus 10, the certificate issuing block 190 may issue group certificate G corresponding to the own content processing apparatus 10, for example. After group registration of the content processing apparatus 10 itself (namely, immediately after the reception of a group ID from the distribution and group management server 20), the content processing apparatus 10 issues group certificate G and transmits it to the distribution and group management server 20. Consequently, the distribution and group management server 20 is able to acquire the recorder ID of that content processing apparatus 10.

Further, the certificate issuing block 190 may be configured so as to issue, in proxy, group certificate G of another content processing apparatus 10B (a recording device) connected with the network 5 or the local line 9. In addition, within a group of a plurality of content processing apparatuses 10 interconnected by a private network, only the content processing apparatus 10 configured as a server apparatus may have the certificate issuing block 190 to issue group certificate G.

Moreover, the certificate issuing block 190 may add valid period information to group certificate G to be issued. Consequently, the content processing apparatus 10 that has acquired that group certificate G may add the recorder ID included in that group certificate G to reproduction permission ID list L only within a valid period represented by valid period information included in that group certificate G. Therefore, only within the valid period set to group certificate G, the content processing apparatus 10 is able to control the reproduction of content data.

Further, the certificate issuing block 190 is capable of distribute (or provide) group certificate G issued as described above to another content processing apparatus 10 or the distribution and group management server 20. The route of the distribution of group certificate G may be set in any manner; for example, in issuing group certificate G to another content processing apparatus 10, group certificate G may be distributed via the distribution and group management server 20. Consequently, the distribution and group management server 20 may execute the unified management of the group certificates G issued within the content sharing system 100. Therefore, the acquisition of group certificate G becomes practicable without interconnecting content processing apparatuses 10 and most recent group certificate G may always be acquired from the distribution and group management server 20.

Also, the method of distributing group certificate G may be set any manner. For example, group certificate G may be directly transmitted via the network 5 or the local line 9, by attaching to electronic mail, or by pasting on a home page. Group certificate G may also be provided to the content processing apparatus 10 via the recording medium 7. Further, group certificate G may be distributed via the recording medium 7 recorded with content data or transmitted by attaching to (or embedding in) content data or distributed via the recording medium 7. Consequently, the record ID attached to this created content data and the group ID of the content data creating device may be distributed at the same time along with the created content data, for example. Therefore, if the content processing apparatus 10 on the acquisition side is a content processing apparatus 10 belonging to the same group, the content data may be immediately reproduced.

Group certificate G thus distributed is shared-registered, or added to reproduction permission ID list L of recorder IDs in another content processing apparatus 10. Consequently, another content processing apparatus 10 that has received group certificate G from a content processing apparatus 10 belonging to the same device group may get the recorder ID guaranteed to have the same group ID (namely, belonging to the same device group), thereby adding the acquired recorder ID to reproduction permission ID list L.

As described above, in the first embodiment, issuing group certificate associated with group ID and recorder ID allows the sharing of the recorder IDs between the content processing apparatuses 10 in the same device group.

The certificate management block 192 stores group certificate G issued by the above-mentioned certificate issuing block 190 and group certificate G acquired from another content processing apparatus 10 or the distribution and group management server 20 into the above-mentioned certificate database 118 and manages these stored group certificates. Thus, by storing group certificates G, the certificate issuing block 190 may read past group certificates G from the certificate database 118 to distribute them to other content processing apparatuses 10. In addition, if the content processing apparatus 10 has been group-unregistered, the certificate management block 192 deletes all group certificates G associated with the group ID of the unregistered device group from the certificate database 118.

Thus, each of the components of the content processing apparatus 10 has been described. It should be noted that, depending on the type of content processing apparatus 10, the content processing apparatus 10 need not have all the above-mentioned components. For example, the content processing apparatus 10B such as a recording device may not always have the group registration request block 120, the distribution service use block 125, and the certificate issuing block 190, for example. The content processing apparatus 10C such as a PD may not always have the group registration request block 120, the distribution service use block 125, the content creation block 130, the recorder ID attachment block 140, the content recording block 150, and the certificate issuing block 190, for example.

The group registration request block 120, the distribution service use block 125, the content creation block 130, the recorder ID attachment block 140, the content recording block 150, the content provision block 160, the content acquisition block 165, the content reproduction block 170, the list management block 180, the certificate issuing block 190, and the certificate management block 192 may each be configured as a hardware device having the above-mentioned corresponding capabilities or by installing a software program having the above-mentioned corresponding capabilities on the content processing apparatus 10.

Figure 8:
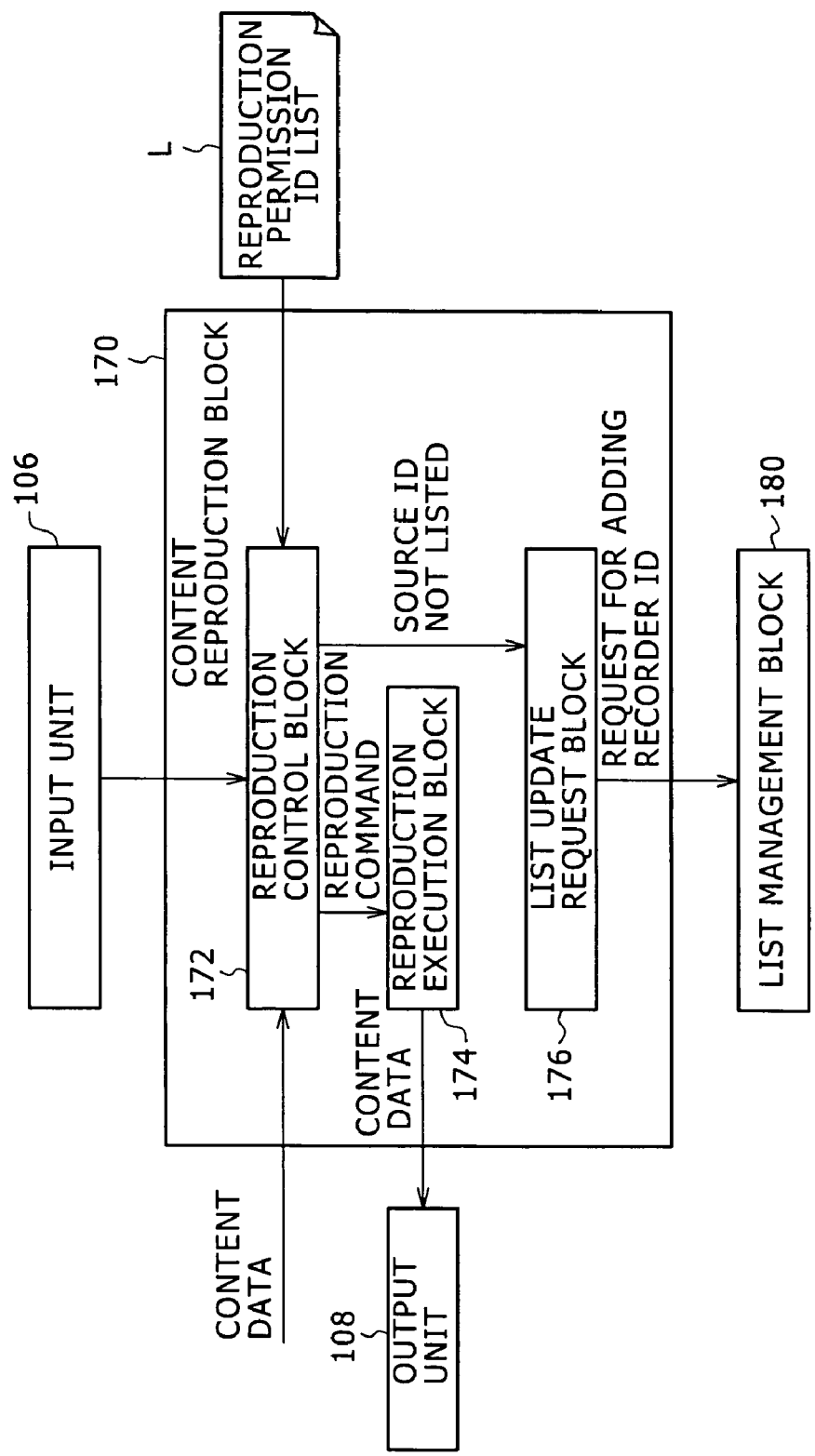
FIG. 8 is a block diagram approximately illustrating a configuration of a content reproduction block associated with the first embodiment.

The following describes the details of the content reproduction block 170 associated with the first embodiment with reference to FIG. 8. FIG. 8 is a block diagram approximately illustrating an exemplary configuration of the content reproduction block 170 associated with the first embodiment.

As shown in FIG. 8, the content reproduction block 170 has a reproduction control block 172, a reproduction execution block 174, and a list update request block 176, for example.

The reproduction control block 172 controls content data on the basis of the source ID (recorder ID or group ID) attached to the content data requested for reproduction and reproduction permission ID list L.

To be more specific, receiving a request for the reproduction of content data specified through the input unit 106, the reproduction control block 172 reads the specified content data from the storage unit 114 or the recording medium 7 for example and determines whether a source ID is attached to the content data. If no source ID is found attached to the content data, then the reproduction control block 172 determines that the content data requires no copyright management, permits the reproduction of the content data, and outputs a signal directing the reproduction of the content data to the reproduction execution block 174. On the other hand, if a source ID (recorder ID or group ID) is found attached to the content data, then the reproduction control block 172 determines that the content data requires copyright management, executing the following processing.

First, the reproduction control block 172 reads (or extracts) the source ID from the content data and reads reproduction permission ID list L from the storage unit 114 for example for interpretation. Next, the reproduction control block 172 compares the source ID read from the content data with the source ID included in reproduction permission ID list L to determine whether the source ID read from the content data is included in reproduction permission ID list L. If the source ID read from the content data is found included in reproduction permission ID list L, then the reproduction control block 172 permits the reproduction of the content data, outputting a signal directing the reproduction of the content data to the reproduction execution block 174. On the other hand, if the source ID read from the content data is found not included in reproduction permission ID list L, then the reproduction control block 172 does not permit the reproduction of the content data and therefore does not output the above-mentioned signal. Therefore, the reproduction execution block 174 cannot reproduce the content data.

Thus, the reproduction control block 172 executes reproduction control that the reproduction of the content data attached with a source data not included in reproduction permission ID list L is completed disabled. However, the restriction of content data reproduction is not limited to this example. For example, the reproduction control block 172 may also execute restriction control that the reproduction of content data is permitted on partially in time or contents, the reproduction of content data is permitted by lowering picture or sound quality, or the reproduction of content is permitted only for the first number of times (once for example), subsequently disabling the reproduction.

Further, if the source ID read from content data is not included in reproduction permission ID list L, then the reproduction control block 172 outputs the source ID to the list update request block 176.

In response to the reproduction directing signal received from the reproduction control block 172, the reproduction execution block 174 reproduces the specified content data. This reproduction execution block is configured by a reproduction device having content reproduction capabilities or a content reproduction software program, for example.

The list update request block 176 requests the list management block 180 for adding the recorder ID to reproduction permission ID list L. This addition request processing is effected by outputting an ID addition request signal indicative of the recorder ID to be added to the list management block 180, for example.

To be more specific, if a source ID not included in reproduction permission ID list L has been inputted from the reproduction control block 172, the list update request block 176 determines whether the source ID is a recorder ID or a group ID. If the source ID is found to be a recorder ID, then the list update request block 176 requests the list management block 180 to add the recorder ID to reproduction permission ID list L. The list update request block 176 may automatically execute this processing or by asking the user whether to add the recorder or not. On the other hand, if the source ID is found to be a group ID, then the list update request block 176 does not execute the addition request processing. This is because the group ID that can be included in reproduction permission ID list L is only a single group ID notified in accordance with group registration.

Thus, the content reproduction block 170 is capable of reproducing the content data attached with reproduction-permitted source ID but is limited in the reproduction of the content data attached with reproduction-prohibited source ID.

Figure 9:
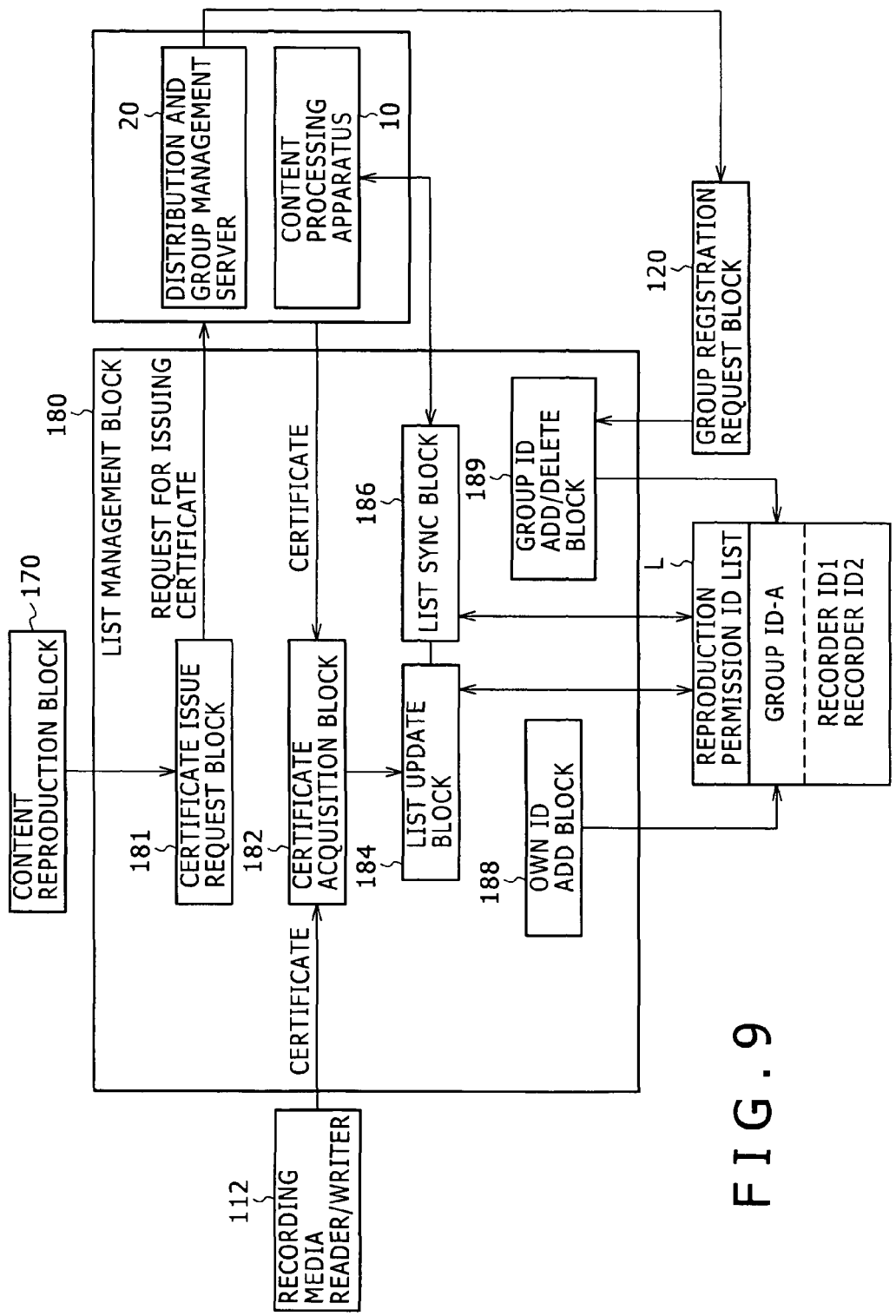
FIG. 9 is a block diagram approximately illustrating a configuration of a list management block associated with the first embodiment.

The following describes the details of the list management block 180 associated with the first embodiment with reference to FIG. 9. FIG. 9 is a block diagram approximately illustrating an exemplary configuration of the list management block 180.

As shown in FIG. 9, the list management block 180 has a certificate issue request block 181, a certificate acquisition block 182, a list update block 184, a list sync block 186, a own ID add block 188, and a group ID add/delete block 189, for example.

The certificate issue request block 181 transmits a certificate issue request to another content processing apparatus 10 or the distribution and group management server 20 to request the issuance of group certificate G. For example, the certificate issue request block 181 notifies a particular content processing apparatus 10 or the distribution and group management server 20 of the group ID requested to be added from the content reproduction block 170, thereby requesting group certificate G containing that recorder ID. In addition, the certificate issue request block 181 may transmit the group ID of content processing apparatuses 10 to a given content processing apparatus 10 or the distribution and group management server 20, thereby requesting group certificate G including one or more recorder IDs (namely, one or more recorder IDs of other content processing apparatuses 10 belonging to the same device group) related with that group ID.

The certificate acquisition block 182 acquires group certificate G from an external content processing apparatus 10 or the distribution and group management server 20. To be more specific, the certificate acquisition block 182 is capable of receiving and acquiring group certificate G through the communication unit 110 from an external content processing apparatus 10 or the distribution and group management server 20 via the network 5 or the local line 9. In addition, the certificate acquisition block 182 is capable of reading and acquiring, through the recording media reader/writer 112, group certificate G recorded to the recording medium 7 provided by an external content processing apparatus 10 or the distribution and group management server 20. The certificate acquisition block 182 outputs group certificate G thus acquired to the list update block 184.

On the basis of group certificate G received from the certificate acquisition block 182, the list update block 184 adds the recorder ID to reproduction permission ID list L. To be more specific, the list update block 184 reads the group ID assigned to another content processing apparatus 10 from group certificate G. This group ID is the group ID (the second group ID) corresponding to the user of another content processing apparatus 10. Also, the list update block 184 reads the group ID (the first group ID) corresponding to the user of the content processing apparatus 10 itself from the storage unit 114 (for example, inside reproduction permission ID list L) of the content processing apparatus 10 in which the list update block 184 is arranged. Next, the content processing apparatus 10 determines whether there is a match between these group IDs. If a match is found between the first group ID and the second group ID, the list update block 184 reads the recorder ID corresponding to another content processing apparatus 10 contained in the above-mentioned group certificate G, adding the recorder ID to reproduction permission ID list L. On the other hand, if a mismatch is found between these group IDs, the list update block 184 does not add the recorder ID contained in the above-mentioned group certificate G to reproduction permission ID list L.

Use of these recorder ID addition conditions allows the addition of only the recorder IDs corresponding to the content processing apparatuses 10 (PCs or recording devices) registered with the same device group to reproduction permission ID list L.

Further, in addition to the above-mentioned recorder ID addition conditions, the list update block 184 may restrict the addition of recorder IDs by setting the upper limit to the number of recorder IDs that can be contained in reproduction permission ID list L.

The list sync block 186 provides a capability of putting synchronization between a plurality of reproduction permission ID lists L. The synchronization between reproduction permission ID lists L herein denotes the merging of a plurality of different reproduction permission ID lists L. After the synchronization, each reproduction permission ID list L comes to contain all the recorder IDs contained in the plurality of original reproduction permission ID lists L.

The synchronization of reproduction permission ID lists L is practicable only between the content processing apparatuses 10 having the same group ID. To be more specific, the list sync block 186 accesses reproduction permission ID list L of another content processing apparatus 10 and, only if a match is found between the group ID contained in that reproduction permission ID list L and the group ID contained in reproduction permission ID list L of the own content processing apparatus 10, puts synchronization between both reproduction permission ID lists L.

This synchronization processing is able to make the same the recorder IDs contained in reproduction permission ID lists L of a plurality of content processing apparatuses 10 registered with the same device group. Consequently, created content data may be shared between these content processing apparatuses 10 for reproduction by each of these content processing apparatuses 10.

It should be noted that the synchronization processing may be executed by the list sync block 186 between the content processing apparatuses 10 in a private network for example at regular intervals or automatically at any time or between specified particular content processing apparatuses 10 as instructed by the user. Also, the synchronization processing may be executed between the content processing apparatuses 10 remotely interconnected via the network 5, in addition to the content processing apparatuses 10 interconnected by a private network or the content processing apparatuses 10 interconnected via the local line 9, for example.

The own ID add block 188 adds the recorder ID corresponding to the content processing apparatus 10 on which the own ID add block 188 is arranged to reproduction permission ID list L unconditionally. To be more specific, the own ID add block 188 reads the recorder ID corresponding to the content processing apparatus 10 from the own ID database 116 in the horizontal direction size 144 and writes this recorder ID to reproduction permission ID list L, for example. Consequently, the content processing apparatus 10 becomes able to reproduce the content created by itself regardless of group registration.

When a group registration notification and a group ID notified from the distribution and group management server 20 are entered from the group registration request block 120 for example, the group ID add/delete block 189 writes the received group ID to reproduction permission ID list L. Consequently, the content processing apparatus 10 becomes able to reproduce the distributed content data attached with that group ID.

In addition, when a group unregistration notification is entered from the above-mentioned group registration request block 120, the group ID add/delete block 189 deletes all source IDs (namely, recorder IDs and group IDs) contained in reproduction permission ID list L. However, the recorder ID corresponding to the content processing apparatus 10 itself is not deleted from reproduction permission ID list L. Consequently, the content processing apparatus 10 is restricted only to reproduce the content data created by itself and the content data that is not copyright managed.

It should be noted that the above-mentioned list management block 180 is able to update reproduction permission ID list L as interpreting reproduction permission ID list L encrypted against falsification and without altering the signature attached to reproduction permission ID list L.

Thus, the list management block 180 associated with the first embodiment has been described. As described, the list management block 180 determines whether the content processing apparatus 10 belongs to the same device group depending on whether the group ID is the same or not and adds only the recorder ID of another content processing apparatus 10 found registered with the same device group to reproduction permission ID list L. Consequently, distributed content and created content may be freely shared between the content processing apparatuses 10 registered with the same device group. On the other hand, between the content processing apparatuses 10 registered with different device groups or not registered at all, the reproduction of content data may be restricted, thereby preventing the content data from being illegally used.

In the above, the description has been made by use of an example in which reproduction permission ID list L of the content processing apparatus 10 in which reproduction permission ID list L is arranged is updated. It is also practicable to update reproduction permission ID list L that is installed another content processing apparatus 10. For example, reproduction permission ID list L of the content processing apparatus 10B or 10C such as a recording device or a PD may be updated by the list management block 180 of the content processing apparatus 10A such as PC. Alternatively, one list management block 180 may be arranged for a plurality of content processing apparatuses 10 inside a private network, thereby totally managing reproduction permission ID lists L of these content processing apparatuses 10. In this case, the list management block 180 is preferably arranged in a private network connection server apparatus for example.

4. Distribution and Group Management Server

Figure 10:
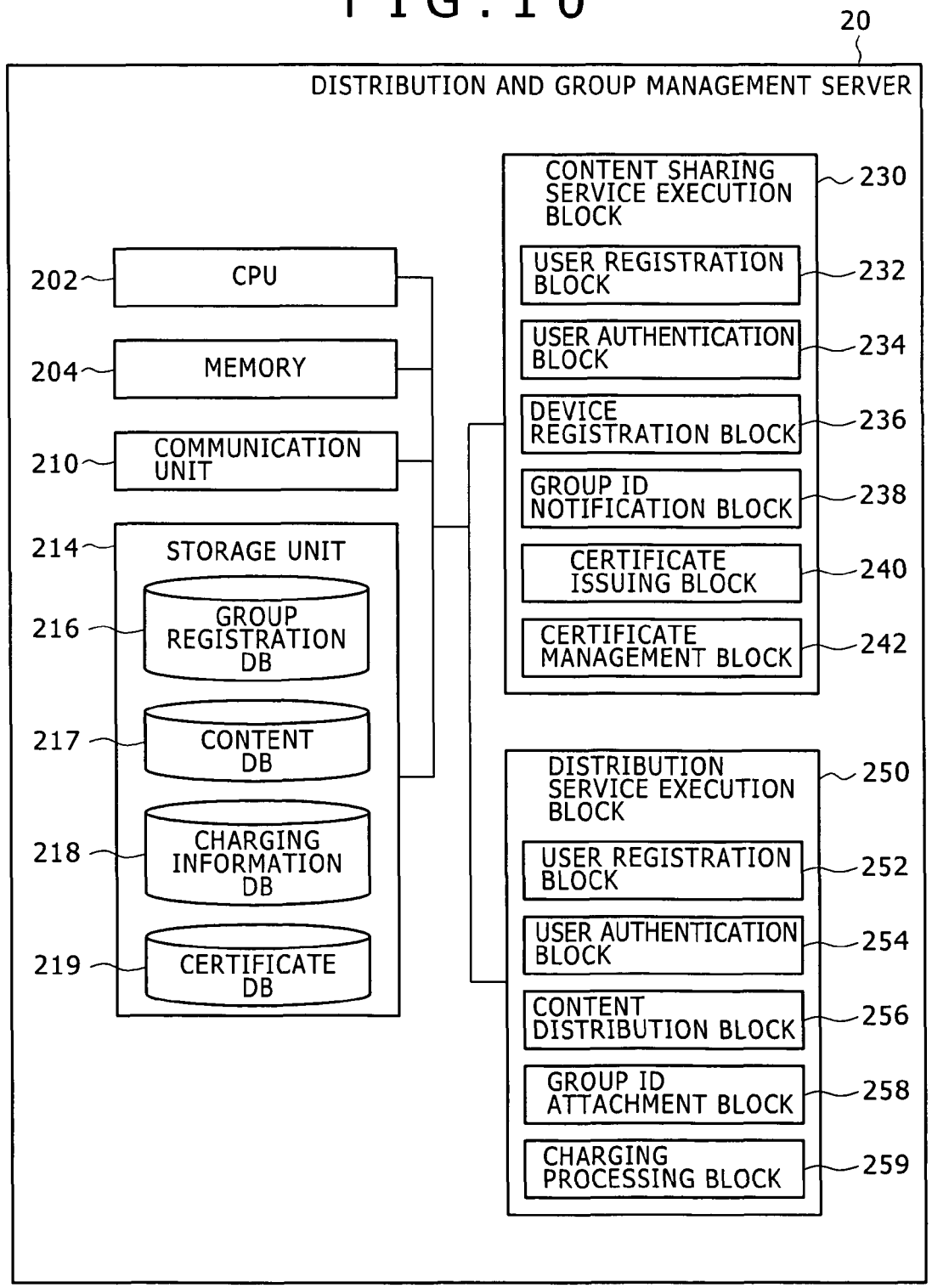
FIG. 10 is a block diagram approximately illustrating a distribution and group management server associated with the first embodiment.

The following describes in detail the distribution and group management server 20 associated with the first embodiment with reference to FIG. 10. FIG. 10 is a block diagram approximately illustrating an exemplary configuration of the distribution and group management server 20.

As shown in FIG. 10, distribution and group management server 20 has a CPU 202, a memory 204, a communication unit 210, a storage unit 214, a content sharing service execution block 230, and a distribution service execution block 250, for example. It should be noted that the CPU 202, the memory 204, and the communication unit 210 have each substantially the same functional configuration as the CPU 102, the memory 104, and the communication unit 110 of the above-mentioned content processing apparatus 10, so that the description of these components will be skipped.

The storage unit 214 is a data storage unit based on a hard disk drive for example and capable of storing various kinds of data such as programs. The storage unit 214 also stores a group registration database 216, a content database 217, a charging information database 218, and a certificate database 219.

The group registration database 216 stores user account information (namely, user ID 2161 and credit card number 2162) of the user who receives content sharing and content distribution services, group ID 2162 corresponding to the user, device ID 2164 of the group-registered content processing apparatus 10, and recorder ID of a device having a content recording capability among the group-registered content processing apparatuses 10 in a related manner, as shown in FIG. 11 for example. To one user ID (namely, one user account), one group ID 2163 is assigned, for example. Further, to group ID 2162 of each user, device ID 2164 (terminal ID or media ID) of one or more content processing apparatuses 10 registered with a device group represented by that group ID. In addition, to this group ID, the recorder ID of the content processing apparatus 10A or 10B (a PC or a recording device) having a recording capability is related.

The content database 217 stores a plurality of pieces of content data to be distributed by the content distribution service. The charging information database 218 stores charging information for each user. The certificate database 219 stores group certificate G issued by a certificate issuing block 240 to be described later and group certificate G acquired from other content processing apparatuses 10.

The content sharing service execution block 230 group-registers a plurality of content processing apparatuses 10 owned by the same user and executes the content sharing service for allowing these content processing apparatuses 10 to share content data. The content sharing service execution block 230 is configured by a content sharing service software program installed on the distribution and group management server 20, for example.

The content sharing service execution block 230 has a user registration block 232, a user authentication block 234, a device registration block 236, a group ID notification block 238, a certificate issuing block 240, and a certificate management block 242.

The user registration block 232 executes the registration of a new user desiring the use of the content sharing service, registration change processing, unregistration processing, and the management of user account information (namely, user ID, credit card number, etc.). To each user registered with the content sharing service, a unique group ID is assigned on a user basis (or a device group basis). Various kinds of user account information and group ID entered and determined by the registration processing by the user registration block 232 are stored in the group registration database 216.

In response to a request for connection (namely, registration request, unregistration request, user account information change request for example) from the content processing apparatus 10-1 owned by the user registered with the content sharing service as described above for example, the user authentication block 234 executes user authentication processing for authenticating the user owning the requesting content processing apparatus 10. This user authentication processing is executed on the basis of the user account information entered by the user and the user account information stored in the group registration database 216, for example. The successfully authenticated user is permitted to log in on the device registration block 236, for example.

The device registration block 236 registers the above-mentioned content processing apparatus 10 requesting registration with the device group owned by the above-mentioned authenticated user. This group registration processing is executed if group registration request information (for example, group registration request notification, user ID, credit card number, device ID, etc.) is received from the group registration request block 120 of the content processing apparatus 10 and the above-mentioned user authentication processing is executed, for example. For group-registering the registration requesting content processing apparatus 10, the device ID (terminal ID and media ID) of the above-mentioned registration requesting content processing apparatus 10 is stored at a location corresponding to the above-mentioned authenticated user in the column of device ID 2164 in the above-mentioned group registration database 216. Consequently, the group-registered device ID is related with the group ID (namely, device group) assigned to the above-mentioned authenticated user.

In addition, the device registration block 236 prohibits the registration of the same content processing apparatus 10 with different device groups. To do this, the device registration block 236 searches the group registration database 216 for the device ID of the registration requesting content processing apparatus 10. If this device ID is found, the device registration block 236 rejects the registration of that content processing apparatus 10 and prevents that device Id from being newly written to the group registration database 216. Consequently, one content processing apparatus 10 belongs to one device group.

In addition, the device registration block 236 is capable of setting the upper limit to the number of content processing apparatuses 10 that may be registered with the same device group; to be specific, the upper limit of the number of content processing apparatuses 10 that can be related with the same group ID. For example, the device registration block 236 may set the upper limit (three for example) to the number of terminal IDs that can be related with the same group ID in advance. In this case, if a request for registering the number of content processing apparatuses 10 in excess of the upper limit comes from the content processing apparatus 10A (an information processing apparatus such as a PC) having a terminal ID as the device ID, the device registration block 236 rejects the registration. Consequently, the number of content processing apparatuses 10A that can be registered with the same device group may be restricted to three or less, thereby restricting the number of content processing apparatuses 10A that can receive distributed content data within the same device group.

For another upper limit, the device registration block 236 may set the upper limit (10 for example) of the number of recorder IDs that can be related with the same group ID in advance, for example. In this case, if a request of registration in excess of the upper limit comes from the content processing apparatuses 10A an 10B (a PC and a recording device for example) that can record content attached with the recorder ID, the device registration block 236 rejects the registration. Consequently, the number of content processing apparatuses 10A and 10B (a PC and a recording device for example) that can be registered with the same device group and have a recording capability may be restricted, thereby limiting the number of content processing apparatuses 10A that can create content data within the same device group.

The device registration block 236 also receives group certificate G from the content processing apparatus 10 group-registered as described above and acquires the recorder ID of that content processing apparatus 10. This group certificate G has been issued and transmitted by the content processing apparatus 10 in accordance with the notification of the group ID by the group ID notification block 238 to be described later. The device registration block 236 writes the received recorder ID to the column of recorder ID 2165 in the group registration database 216 as related with the group ID included in group certificate G.

Further, the device registration block 236 unregisters the content processing apparatus 10 group-registered as described above from the device group owned by the user authenticated as described above. This group unregistration processing is executed when a group unregistration request information (group unregistration request notification, user ID, credit card number, and device ID, for example) is received from the group registration request block 120 of the content processing apparatus 10 and the above-mentioned user authentication processing is executed. To group-unregister the unregistration requesting content processing apparatus 10, the device ID (terminal ID and media ID) and group ID of the above-mentioned unregistration requesting content processing apparatus 10 are deleted from the columns of device ID 2164 and group ID in the above-mentioned group registration database 216.

When the content processing apparatus 10 has been registered with a predetermined device group by the above-mentioned device registration block 236, the group ID notification block 238 notifies the registered content processing apparatus 10 of the group ID corresponding to the above-mentioned authenticated user (or the registered user group). This group ID notification processing may be effected by transmitting only that group ID to the registered content processing apparatus 10 or request the certificate issuing block 240 to be described later for issuing group certificate G containing that group ID, for example.

The certificate issuing block 240 issues and distribute group certificate G for certifying a device group to which the registered content processing apparatus 10 belongs. When a requests comes from the certificate issue request block 181 of the content processing apparatus 10 for issuing group certificate G for example, the certificate issuing block 240 reads the group ID and recorder ID corresponding to the issuance request from the group registration database 216, generates group certificate G as shown in FIG. 7, and transmits the generated group certificate G to the issuance requesting content processing apparatus 10 via the network 5, for example. Also, without being requested for issuance, the certificate issuing block 240 may issue and distribute most recent group certificate G at regular time intervals or when the content processing apparatus 10 accesses the distribution and group management server 20, for example. Further, when notifying the group-registered content processing apparatus 10 of the group ID, the certificate issuing block 240 may issue group certificate G.

In addition, the certificate issuing block 240 may attach valid period information to group certificate G to be issued. Consequently, the content processing apparatus 10 that has acquired that group certificate G becomes able to add the recorder ID contained in that group G to reproduction permission ID list L within the valid period indicated by the valid period information contained in that group certificate G. Hence, only within the valid period set to group certificate G, the content processing apparatus 10 is capable of reproducing content data.

Also, the certificate issuing block 240 may include a plurality of recorder IDs related with the same group ID into one group certificate G. Consequently, the recorder IDs of all content processing apparatus 10 having recording capabilities belonging to the same device group may be distributed at the same time by one group certificate G, thereby enhancing the efficiency of processing.

It should be noted that the certificate issuing block 240 may be arranged only on the certificate issuing block 240 rather than on arranging the certificate issuing block 190 on the content processing apparatus 10. Consequently, all group certificates G may be managed by the distribution and group management server 20.

The certificate management block 242 stores group certificate G issued by the above-mentioned certificate issuing block 240 and group certificate G acquired from the content processing apparatus 10 into the above-mentioned certificate database 219 for management. Storing group certificates G in the certificate database 219 allows the certificate management block 242 to read past group certificates G from the certificate database 219 and distribute these group certificates G to the content processing apparatus 10 for example. It should be noted that the certificate database 219 may be configured integrally with the above-mentioned group registration database 216, in which the certificate management block 242 manages the group certificates G in the certificate database 219.

Also, the certificate management block 242 is capable of managing a group certificate issuance log (for example, time of issue, destination of distribution, and the number of certificates issued), for example. Consequently, the certificate management block 242 may restrict the number of group certificates that can be issued by a certain user, thereby setting the upper limit of the number of content processing apparatus 10 that can be registered by that user.

As described above, the arrangement of the certificate issuing block 240 and the certificate management block 242 allows the distribution and group management server 20 to manage group certificates G. Consequently, group certificate G may be acquired without interconnecting content processing apparatuses 10. Further, the unified management of group certificates G by the distribution and group management server 20 allows the content processing apparatus 10 to always acquire the most recent group certificate G. For example, the content processing apparatus 10 becomes able to acquire all most recent group certificates G associated with the group ID of the same user to acquire all most recent recorder IDs belonging to that group ID, thereby adding the acquired most recent recorder IDs to reproduction permission ID list L.

Next, the distribution service execution block 250 will be described. The distribution service execution block 250 executes a content distribution service for the user of the content processing apparatus 10 for distributing content data at cost for example. The distribution service execution block 250 is configured by a content distribution service software installed on the distribution and group management server 20 for example. The distribution service execution block 250 has a user registration block 252, a user authentication block 254, a content distribution block 256, a group ID attachment block 258, and a charging processing block 259, for example.

The user registration block 252 executes processing of registering new users desiring the use of the content distribution service, registration change processing, unregistration processing, and management of user account information (user ID, credit card number, etc.), for example. For each user registered with the content distribution service, a unique distribution service user ID is assigned on a user basis. In the first embodiment, this distribution service user ID is the same as the group ID for use in the above-mentioned content distribution service. Various kinds of user information thus entered and determined by the registration processing by the user registration block 252 are stored in a distribution service user information database. In the first embodiment, this distribution service user information database is the same as the group registration database 216.

The user authentication block 254 executes user authentication processing in response to a connection request from each user registered with the content distribution service as described above, for example. The user authentication processing is executed on the basis of the user account information entered by the user and the user account information stored in the group registration database 216, for example. The authenticated user is permitted to log in on the content distribution block 256.

It should be noted that the user registration block 252 and the user authentication block 254 each may be configured integrally with the certificate management block 242 and the user authentication block 234 of the content sharing service execution block 230. In this case, the distribution service execution block 250 may have neither the user registration block 252 nor the user authentication block 254.

The content distribution block 256 allows the authenticated user to browse a list of distributable content data to select desired distributed content data. Further, the content distribution block 256 distributes the selected distributed content data to the content processing apparatus 10 used by the user via the network 5. It should be noted that this distribution processing is executed on the basis of a charging processing condition which will be described later.

The group ID attachment block 258 is a component corresponding to the source ID attachment block 1 shown in FIG. 2. The group ID attachment block 258 attaches a group ID corresponding to the above-mentioned authenticated user to the content to be distributed to the content processing apparatus 10 by the content distribution block 256, for example. The group ID thus attached functions as the source ID for the distributed content data. Thus, attaching a group ID to distributed content data on the side of the distribution and group management server 20 and distributing the distributed content data attached with the group ID allow the sure attachment of a group ID to distributed content data as the source ID, thereby strengthening the copyright management capability.

It should be noted that the group ID attachment block 258 may be arranged inside the content processing apparatus 10 that receives distributed content data. In this case, the content processing apparatus 10 may attach a group ID to distributed content data when receiving it from the distribution and group management server 20, for example.

The charging processing block 259 executes charging processing for each user who has received distributed content data, requesting the payment of the fee corresponding to the received distributed content data, for example. Charging information, such as amount to be billed, settlement method, and settlement date for example, is stored in the charging information database 218, for example.

5. Data Format

Figure 12:
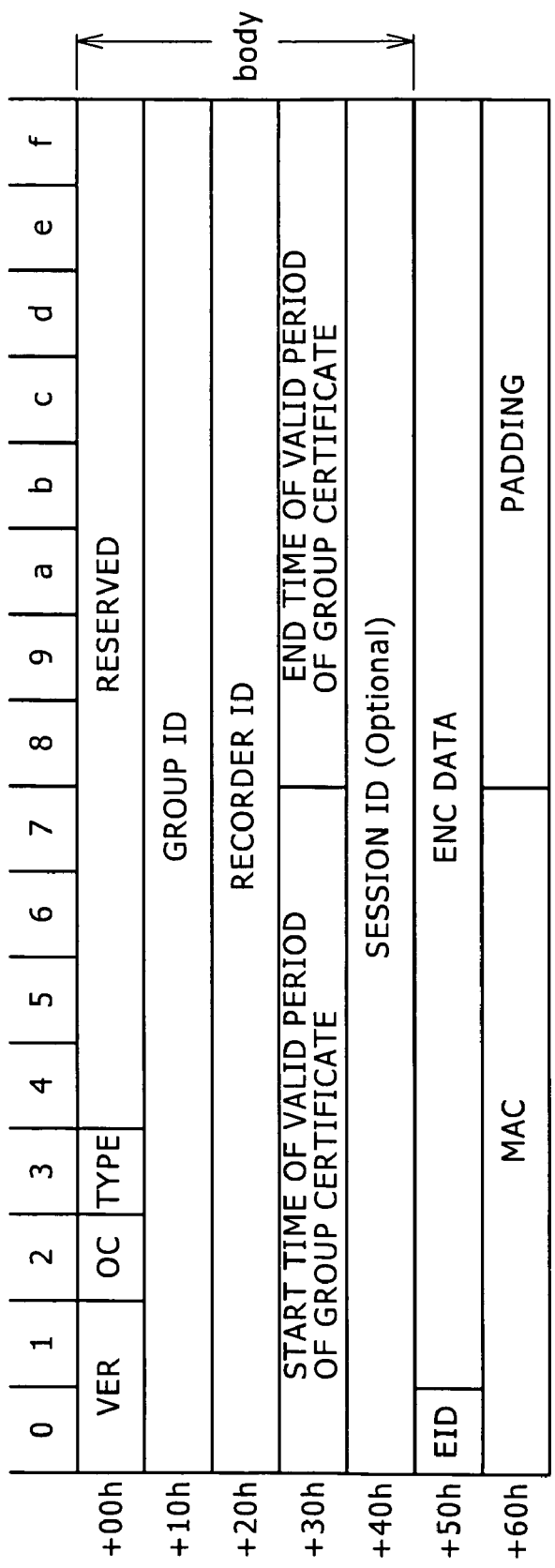
FIG. 12 is a diagram illustrating a data structure of a group certificate associated with the first embodiment.

The following describes a data structure of group certificate G associated with the first embodiment on the basis of FIG. 12. FIG. 12 shows a data structure of group certificate G associated with the first embodiment.

As shown in FIG. 12, group certificate G includes "VER", "OC", "TYPE", "Group ID", "Recorder ID", "Group certificate valid period start time", "Group certificate valid period end time", "Session ID", "EID", "ENC DATA", "MAC", and "PADDING".

"VER" denotes the format version of group certificate G. "OC" denotes the operation code for specifying an operation to be executed when group certificate G is applied to reproduction permission ID list L. "TYPE" denotes the type of source ID (for distributed content or created content). "EID" denotes an algorithm ID to be used when MAC is created. "ENC DATA" denotes the version of EKB to be used when MAC is created. "MAC" denotes a code for falsification detection as described above.

Thus, group certificate G has a structure in which group ID and recorder ID are related with each other. In order to prevent falsification of group certificate G, a hash value of group certificate G may be used for falsification detection.

6. Content Sharing Method

Figure 13:
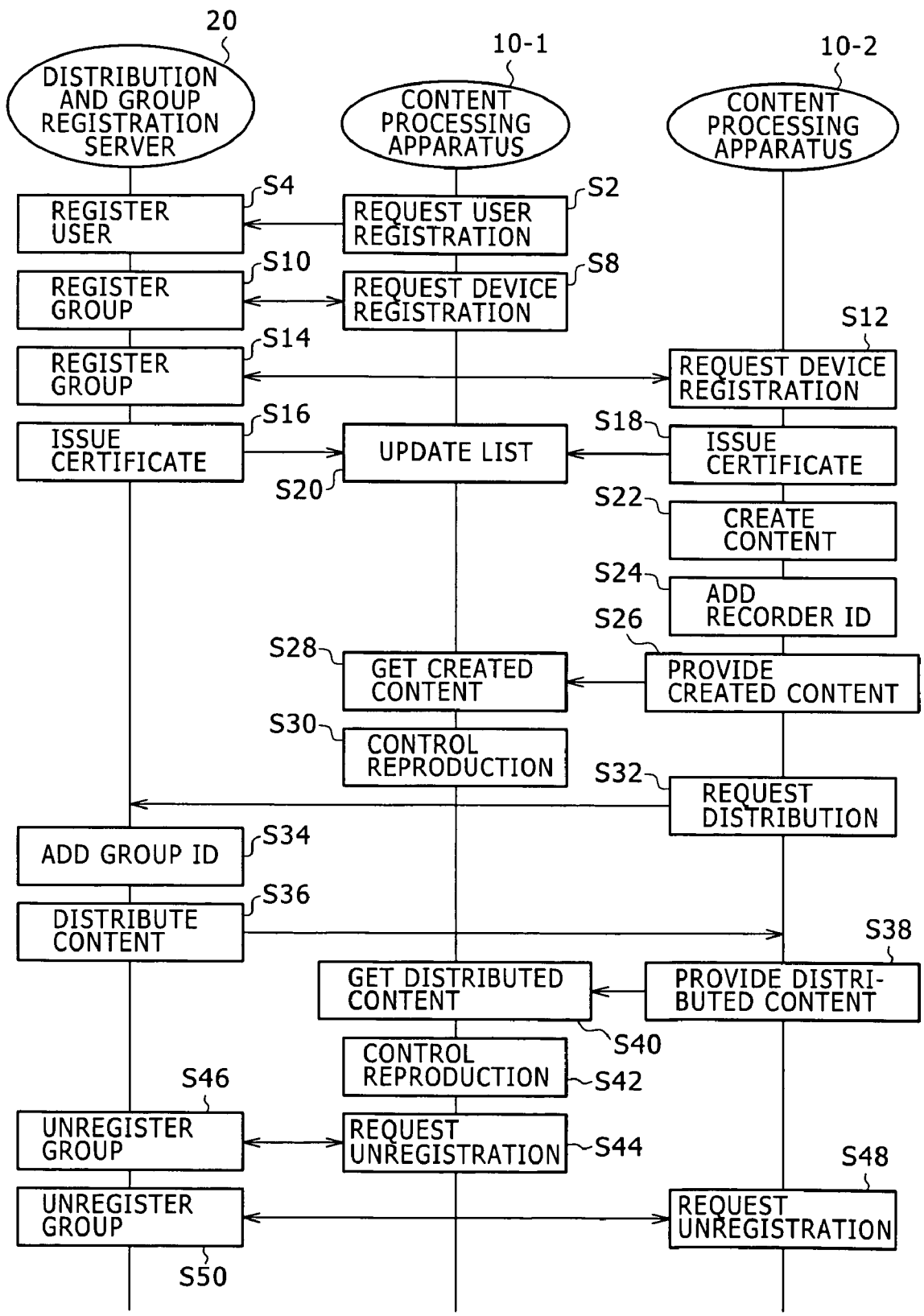
FIG. 13 is a timing chart indicative of basic flows of a content sharing method associated with the first embodiment.

The following describes a basic flow of a content sharing method based on the above-mentioned content sharing system 100 with reference to FIG. 13. FIG. 13 is a timing chart indicative of a basic flow of a content sharing method associated with the first embodiment.

As shown in FIG. 13, a new user first uses the content processing apparatus 10-1 of his own and requests the distribution and group management server 20 for user registration of content sharing service (S2). Then, the distribution and group management server 20 executes user authentication processing for that user, assigns a new group ID to that user, and executes the user registration (S4). It should be noted that this user registration of content sharing service may include the user registration of content distribution service.

Next, using the content processing apparatuses 10-1 and 10-2, the user requests the registrations of these apparatuses (S8, S12). In response to this device registration request, the distribution and group management server 20 registers the content processing apparatuses 10-1 and 10-2 with one of device groups and transmits the group ID corresponding to the registered device group to the content processing apparatuses 10-1 and 10-2 (S10, S14). It should be noted that the device group registrations of the content processing apparatuses 10-1 and 10-2 may not be made at the same time; these registrations may be made at different times.

Further, the distribution and group management server 20 issues group certificate G in which the group ID and the recorder ID corresponding to the content processing apparatus 10-2 are related with each other and distributes the issued group certificate G to the content processing apparatus 10-1 (S16). Alternatively, the content processing apparatus 10-2 may issue group certificate G in which the group ID and the recorder ID corresponding to the content processing apparatus 10-2 itself are related with each other and distribute the issued group certificate G to the content processing apparatus 10-1 (S18).

Having acquired group certificate G thus issued, the content processing apparatus 10-1 updates reproduction permission ID list L owned by itself (S20). In this list update processing, if the content processing apparatuses 10-1 and 10-2 have been registered at the same device group, the content processing apparatus 10-1 adds the recorder ID of the content processing apparatus 10-2 contained in group certificate G to its own reproduction permission ID list L. On the other hand, if these content processing apparatuses 10-1 and 10-2 have been registered with different device groups, the content processing apparatus 10-1 is unable to add the recorder ID contained in group certificate G to its own reproduction permission ID list L.

The following describes an example in which the content processing apparatus 10-1 acquires content data provided by the content processing apparatus 10-2 in the above-mentioned state, thereby sharing the acquired content data therebetween.

First, in sharing created content data, the content processing apparatus 10-2 creates content data by ripping or self recording (S22) and attaches a recorder ID corresponding to the content processing apparatus 10-2 to the created content data (S24). Next, the content processing apparatus 10-2 provides the created content data attached with the recorder ID to the content processing apparatus 10-1 via the network 5, local line 9, or the recording medium 7 (S26).

Next, the content processing apparatus 10-1 acquires the above-mentioned created content data (S28) and executes reproduction control processing on the acquired created content data in accordance with a user request for reproduction for example (S30). In this case, if the recorder ID attached to the created content data is included in reproduction permission ID list L of the content processing apparatus 10-1, then the content processing apparatus 10-1 is able to reproduce the created content data; on the other hand, if that recorder ID is not included in reproduction permission ID list L, then the content processing apparatus 10-1 is unable to reproduce the created content data.

In sharing distributed content data, the content processing apparatus 10-2 first requests the distribution and group management server 20 for distribution (S32). Then, the distribution and group management server 20 attaches a group ID corresponding to the content processing apparatus 10-1 to the requested distributed content data (S34) and distributes the distributed content data attached with the group ID to the content processing apparatus 10-2 (S36). Next, the content processing apparatus 10-2 provides the distributed content data attached with the group ID to the content processing apparatus 10-1 in the same manner as above (S38) and the content processing apparatus 10-1 acquires the provided distributed content data (S40). Next, the content processing apparatus 10-1 executes reproduction control processing on the distributed content data in accordance with a user request for reproduction for example (S30). In this case, if the group ID attached to the distributed content data is included in reproduction permission ID list L of the content processing apparatus 10-1, then the content processing apparatus 10-1 is able to reproduce the distributed content data; on the other hand, if the group ID is not included in reproduction permission ID list L, then the content processing apparatus 10-1 is unable to reproduce the distributed content data.

Further, when the content processing apparatuses 10-1 and 10-2 make unregistration requests (S44, S48), then the distribution and group management server 20 clears the group registrations of the content processing apparatuses 10-1 and 10-2 in accordance with the requests (S46, S50).

In the above-mentioned content sharing method based on the content sharing system 100, registering a plurality of content processing apparatuses 10 owned by the same user with the same device group allows these content processing apparatuses 10 to share created content data and distributed content data comparatively freely. The following describes the states before and after group registration with reference to FIGS. 14 and 15.

Figure 14:
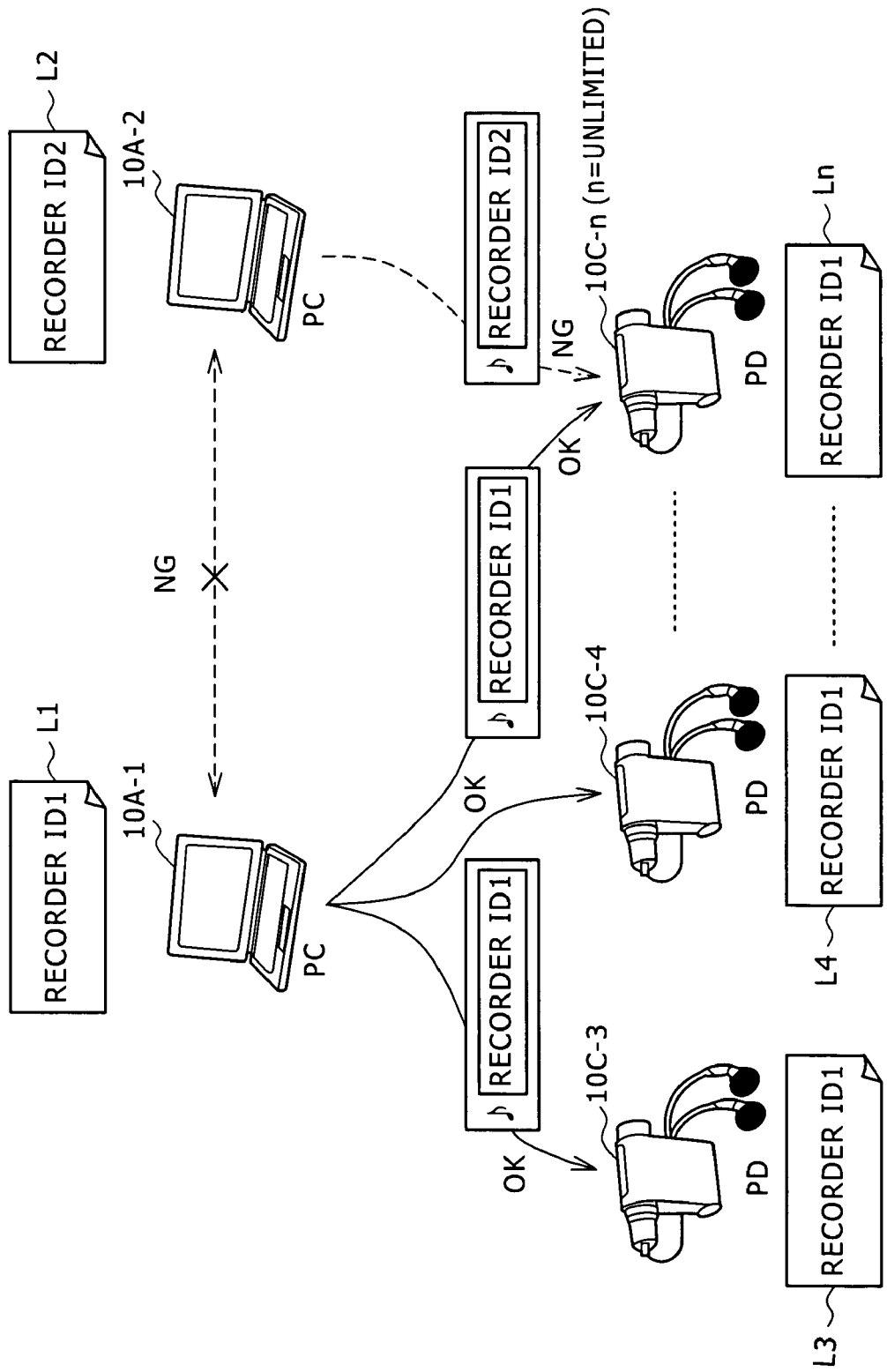
FIG. 14 is a schematic diagram illustrating a content sharing state before group registration in the content sharing system associated with the first embodiment.

As shown in FIG. 14, in the state before group registration, the content processing apparatuses 10A-1 and 10A-2 such as PCs include only recorder ID1 and recorder ID2 thereof in reproduction permission ID list L1 and reproduction permission ID list L2 thereof. Therefore, created content data cannot be shared between the content processing apparatuses 10A-1 and 10A-2. Namely, the content processing apparatuses 10A-1 and 10A-2 are capable of reproducing only the content data created thereby.

The content processing apparatus 10C such as a PD is capable of reproducing the created content data acquired from any one of content processing apparatuses 10A (such as PCs). This is because the content processing apparatus 10A is capable of adding only one recorder ID of its own to reproduction permission ID list L of the content processing apparatus 10C. In the example shown in FIG. 14, recorder ID1 of the content processing apparatus 10A-1 is added to reproduction permission ID lists L3 to Ln of a plurality (limitless number) of content processing apparatuses 10C-3 to 10C-n. Consequently, the content processing apparatus 10C-3-to-n are capable of reproducing the created content (attached with recorder ID1) of the content processing apparatus 10A-1. However, the content processing apparatuses 10C-3-to-n cannot reproduce the created content (attached with recorder ID2) of the content processing apparatus 10A-2. Thus, in the state before group registration, the content processing apparatus 10C such as a PD cannot share the content data of two or more content processing apparatuses 10A such as PCs at the same time.

Figure 15:
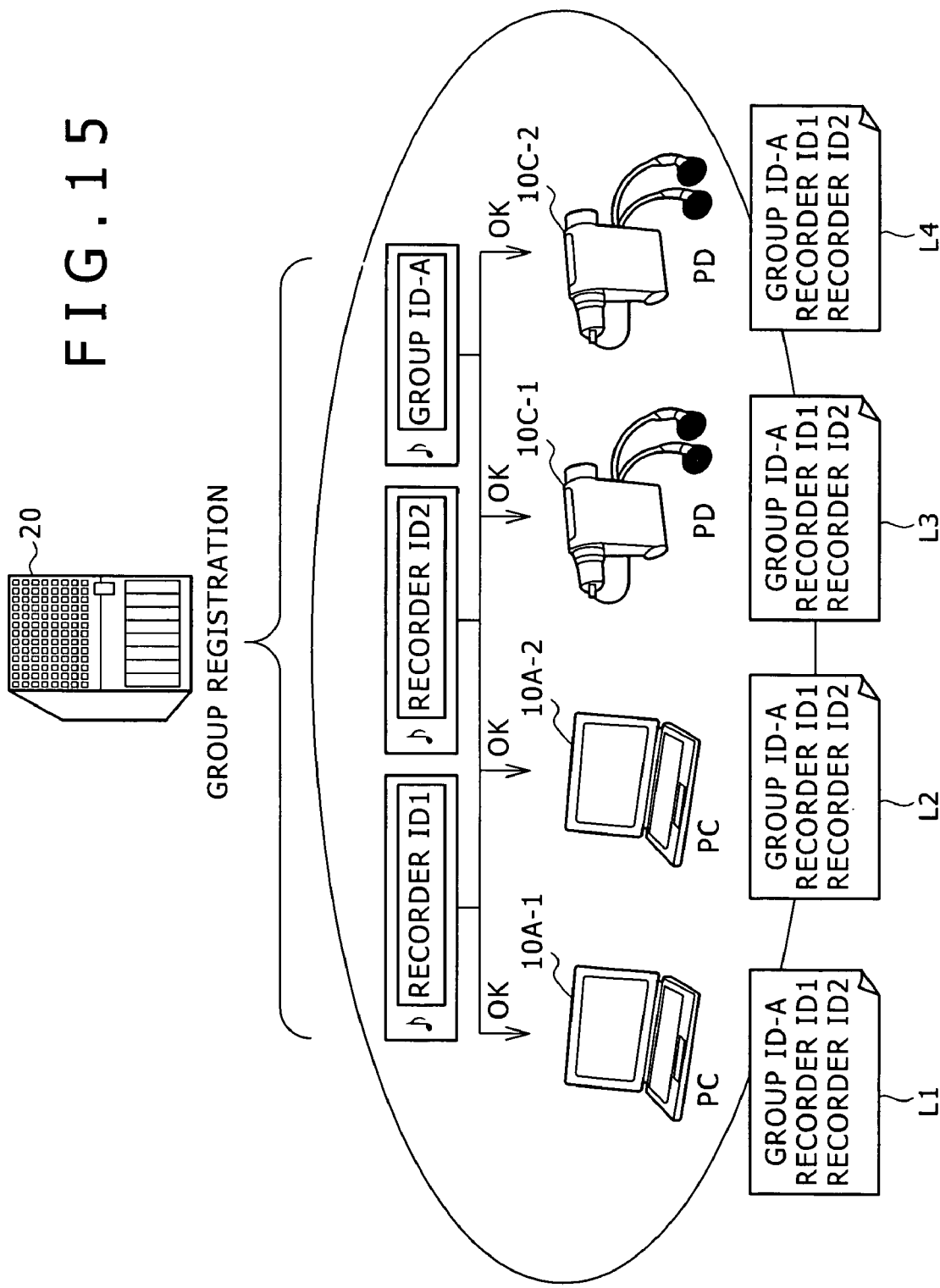
FIG. 15 is a schematic diagram illustrating a content sharing system after group registration in the content sharing system associated with the first embodiment.

On the other hand, as shown in FIG. 15, in the state after group registration, all created content data can be reproduced between the content processing apparatuses 10 registered with the same group regardless whether these apparatuses are PCs or PDs. This is because registration with the same device group corresponding to group ID-A allows recorders ID1 and ID2 and group ID-A to be included in reproduction permission ID lists L1 through L4 of all content processing apparatuses 10. Consequently, all of the distributed content data attached with group ID-A and the created content data attached with recorder ID1 and recorder ID2 can be shared between the content processing apparatuses 10A-1, 10A-2, 10C-1, and 10C-2 that are group registered. The created content data of any content processing apparatus 10 that has once been group registered may be adapted, even after the unregistration of that content processing apparatus 10, to be reproducible by other content processing apparatuses 10.

Although not shown, after the unregistration of all content processing apparatuses 10 registered with a certain device group, each of these content processing apparatuses 10 gets in the state as it is before registration as shown in FIG. 14.

7. Group Registration and Unregistration Processing

Figure 16:
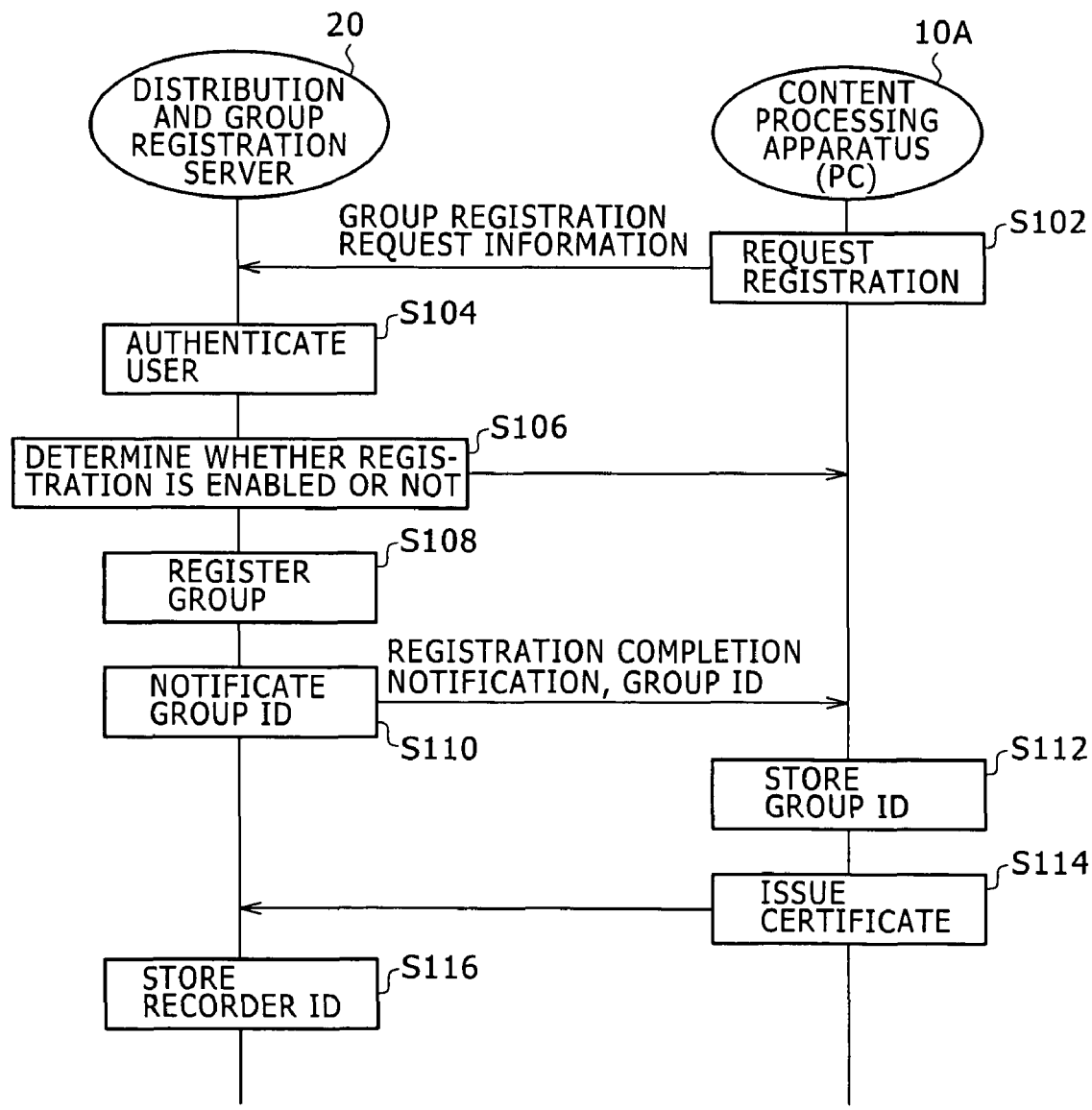
FIG. 16 is a timing chart indicative of group registration processing in the content sharing system associated with the first embodiment.

The following describes the processing of registering the content processing apparatus 10 with a user's own device group in the content sharing system 100 associated with the first embodiment (group registration processing). FIG. 16 is a timing chart indicative of the group registration processing in the content sharing system 100 associated with the first embodiment.

It should be noted that, in the processing flow shown below, the processing starts when the user registration of the content sharing service with the distribution and group management server 20 has been completed and the group ID has been assigned to the user owning the content processing apparatus 10. The following processing denotes the group registration of the content processing apparatus 10A that is a PC for example connectable to the distribution and group management server 20.

As shown in FIG. 16, the group registration request block 120 of the content processing apparatus 10A first requests the distribution and group management server 20 for group registration (step S102). To be more specific, the group registration request block 120 generates group registration request information (group registration request notification, user ID, credit card number, and device ID, for example) in accordance with user specification and transmits the generated information to the distribution and group management server 20 through the network 5.

Next, in step S104, the user authentication block 234 of the distribution and group management server 20 authenticates the user owning the requesting content processing apparatus 10A (step S104). This user authentication processing is executed by determining whether there is a match between the user account information contained in the received group registration request information mentioned above and the user account information stored in the group registration database 216. If the user authentication fails, the registration processing ends. If the user authentication is successful, then the procedure goes to step S106.

Further, in step S106, the device registration block 236 of the distribution and group management server 20 determines whether to register the requesting content processing apparatus 10A with the device group of the authenticated user under predetermined conditions (step S106). The predetermined conditions include the upper limit of the number of content processing apparatuses 10A that may be registered with the device group of the user, of example. If the registration is not permitted, the device registration block 236 generates a registration rejection notification and transmits the notification to the content processing apparatus 10A, thereby ending the registration processing. If the registration is permitted, the procedure goes to step S108.

Then, in step S108, the device registration block 236 of the distribution and group management server 20 registers the requesting content processing apparatus 10A with the device group of the authenticated user (step S108). To be more specific, the device registration block 236 records the device ID (terminal ID or media ID) of the requesting content processing apparatus 10A to the group registration database 216 by relating this device ID with the group ID of the authenticated user.

In step S110, the group ID notification block 238 of the distribution and group management server 20 notifies the registered content processing apparatus 10A of the group ID corresponding to the authenticated user (or the registered device group) (step S110). In this process, the group ID notification block 238 may also generate a registration completion notification and transmit the notification to the content processing apparatus 10A along with the group ID.

In step S112, the group ID add/delete block 189 of the content processing apparatus 10A securely stores the group ID received from the distribution and group management server 20 into the content processing apparatus 10 (step S112). The received group ID is then written to reproduction permission ID list L stored in the storage unit 114 for example.

In step S114, the certificate issuing block 190 of the content processing apparatus 10A issues group certificate G with the recorder ID of the own content processing apparatus 10A related with the group ID received above and transmits the issued certificate to the distribution and group management server 20 (step S114).

In step S116, the device registration block 236 of the distribution and group management server 20 writes the recorder ID contained in the group certificate G received from the registered content processing apparatus 10A to the group registration database 216 by relating the recorder ID with the group ID of the authenticated user (step S116). Consequently, the relation of the group ID with the recorder ID is achieved for the registered content processing apparatus 10A in the distribution and group management server 20.

Thus, the group registration processing for the content processing apparatus 10A such as a PC has been completed. It should be noted that the registered content processing apparatus 10 must be unregistered before re-registration.

Figure 17:
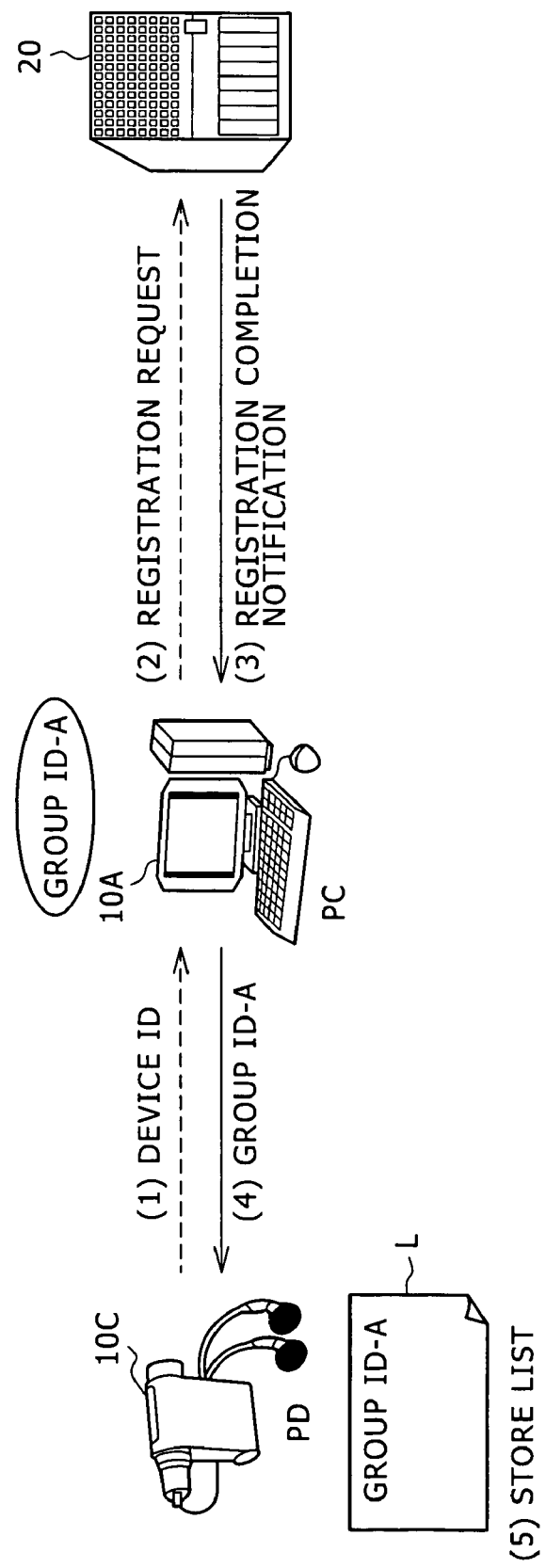
FIG. 17 is a schematic diagram illustrating a specific example of group registration in the content sharing system associated with the first embodiment.

In group-registering the content processing apparatus 10B such as a recording device or the content processing apparatus 10C such as a PD, the content processing apparatus 10B or 10C to be registered may be locally connected to the already registered content processing apparatus 10A owned by the same user as shown in FIG. 17.

To be more specific, the content processing apparatus 10A acquires the device ID of the content processing apparatus 10C and transmits group registration request information containing this device ID to the distribution and group management server 20, thereby requesting registration. Next, the content processing apparatus 10C is registered with the same device group as that of the content processing apparatus 10A by the distribution and group management server 20. Then, having received the registration completion notification from the distribution and group management server 20, the content processing apparatus 10A notifies the content processing apparatus 10C of group ID-A owned by itself for example. Further, the content processing apparatus 10C securely stores the received group ID-A into reproduction permission ID list L of its own. Thus, the registration processing for the content processing apparatus 10C has been completed.

It should be noted that, in registration of the content processing apparatus 10B such as a recording device, the content processing apparatus 10A issues, by proxy, group certificate G containing the recorder ID of the content processing apparatus 10B to transmit the issued group certificate G to the distribution and group management server 20, and the distribution and group management server 20 stores the received recorder ID into the group registration database 216, in addition to the above-mentioned registration processing for the content processing apparatus 10A.

The following describes the restriction on the number of content processing apparatuses 10 that may be registered with the same device group as described with reference to step S106 above. In the following example, the restriction on the number of content processing apparatuses 10A such as PCs capable of receiving distributed content data (refer to FIG. 18) and the restriction on the number of content processing apparatuses 10A such as PCs having content recording capabilities (refer to FIG. 19) are used.

Figure 18:
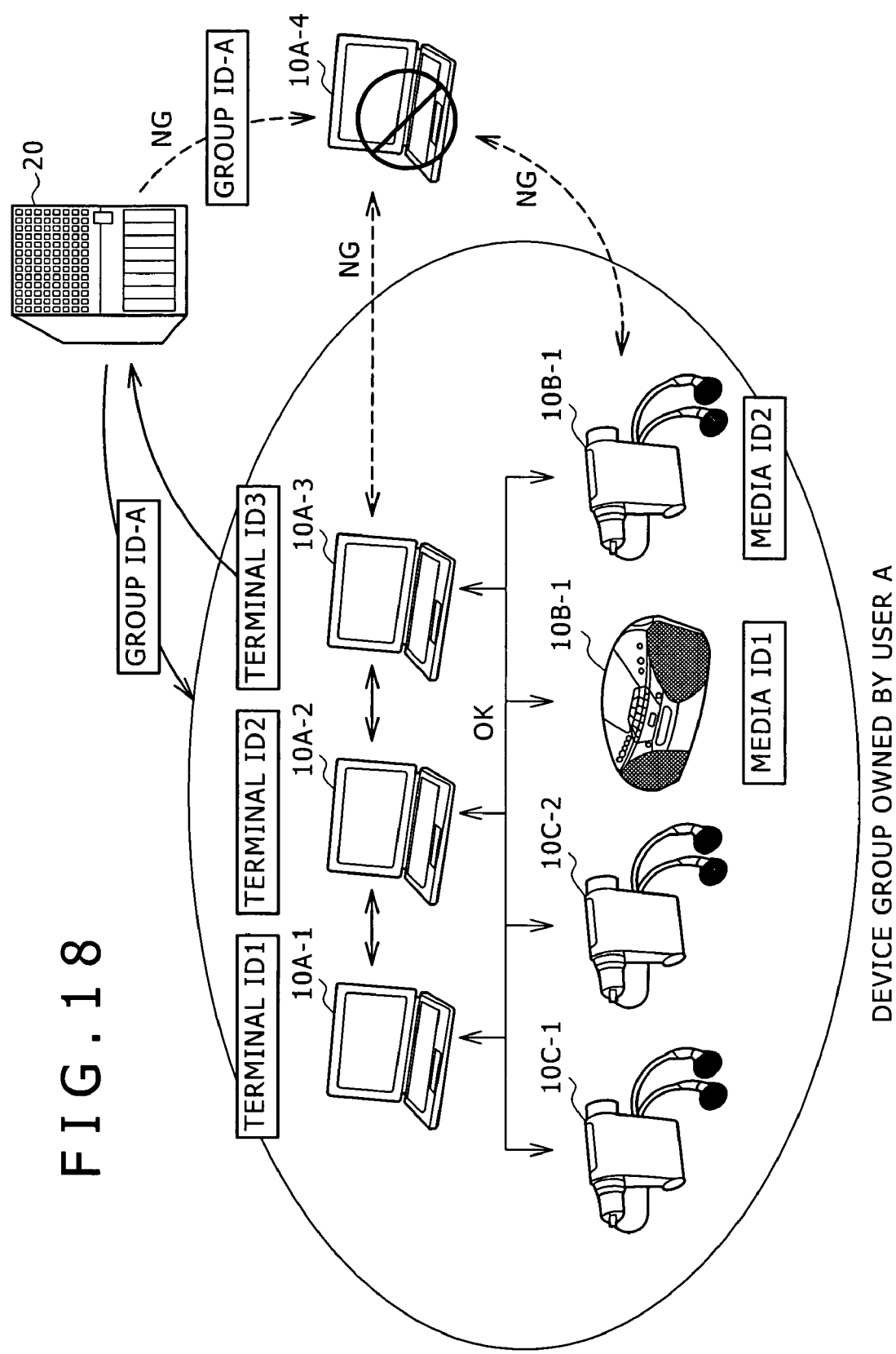
FIG. 18 is a schematic diagram illustrating a specific example of limiting the number of registered units in the content sharing system associated with the first embodiment.

As shown in FIG. 18, the number of content processing apparatuses 10A (such as PCs) capable of receiving distributed content data may be restricted for registration with the same device group up to a predetermined number (three units for example).

This restriction on the number of content processing apparatuses 10A is imposed by the device registration block 236 of the distribution and group management server 20. The device registration block 236 is counting the number of terminal IDs associated with the same group ID in the group registration database 216 for example and, when the number of terminal IDs has reached a predetermined upper limit, rejects the registration of the subsequent content processing apparatuses 10A. This restricts the number of the content processing apparatuses 10A capable of receiving distributed content that may be registered with the same device group to a number below a predetermined upper limit. It should be noted that, in the case of this restriction, there is no such restriction on the number of content processing apparatuses 10B (such as recording devices) and the number of content processing apparatuses 10C (such as PDs) having media IDs.

Figure 19:
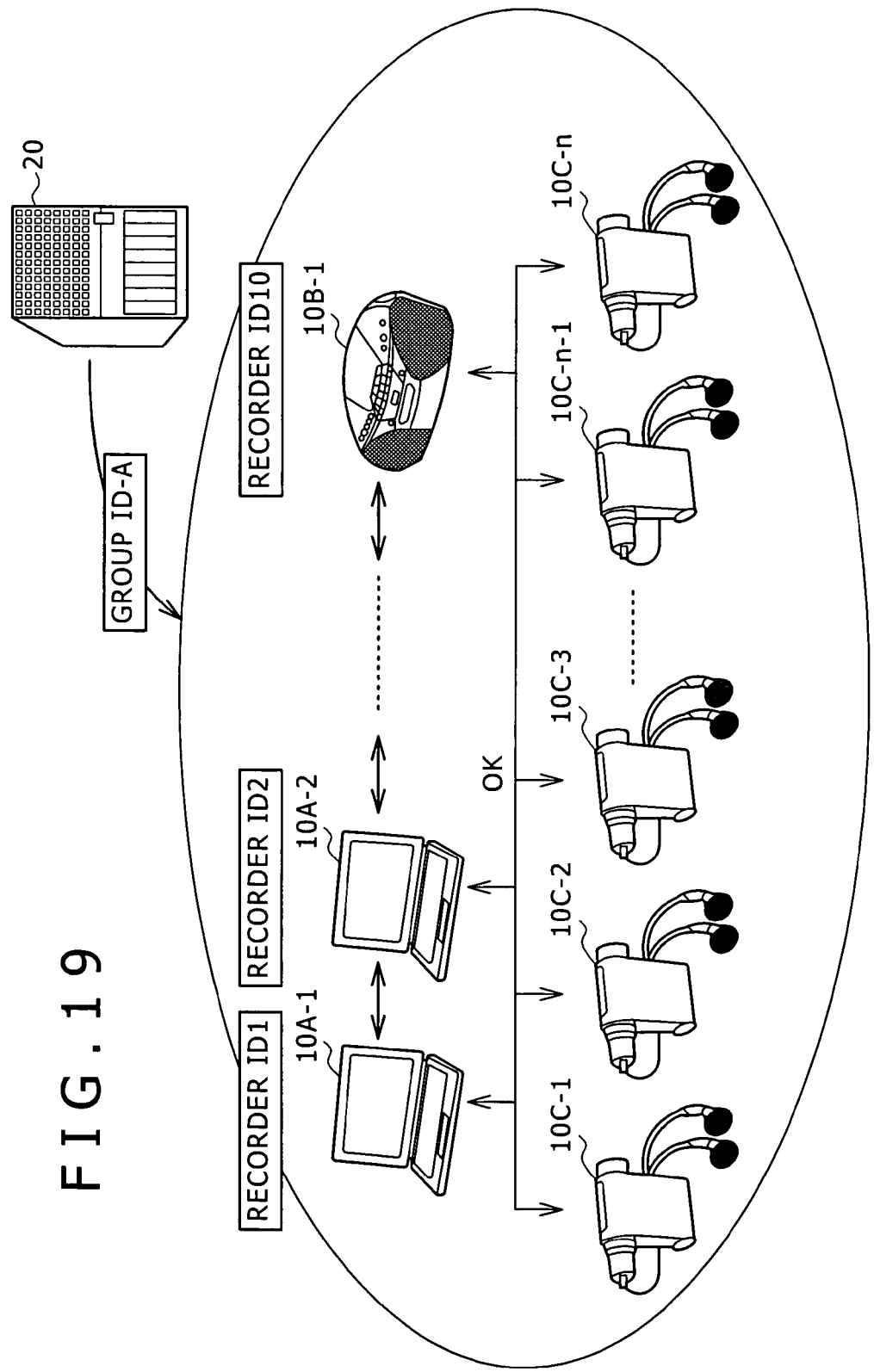
FIG. 19 is a schematic diagram illustrating a specific example of limiting the number of units in the content sharing system associated with the first embodiment.

As shown in FIG. 19, the number of content processing apparatuses 10A (such as PCs) capable of recording content data and the number of content processing apparatuses 10B (such as recording devices) may be restricted such that these apparatuses can be registered with the same device groups only up to a predetermined upper limit (10 units for example).

This restriction on the number of content processing apparatuses 10 is also imposed by the device registration block 236 of the distribution and group management server 20. The device registration block 236 is counting the number of recorder IDs associated with the same group ID in the group registration database 216 for example and, when the number of recorder IDs has reached a predetermined upper limit, rejects the registration of the subsequent content processing apparatuses 10A and 10B. This restricts the number of content processing apparatuses 10 having content recording capabilities to be registered with the same device group to a number below a predetermined upper limit. It should be noted that, in the case of this restriction, there is no such restriction on the number of content processing apparatuses 10C (such as PDs) having no recorder ID.

Figure 20:
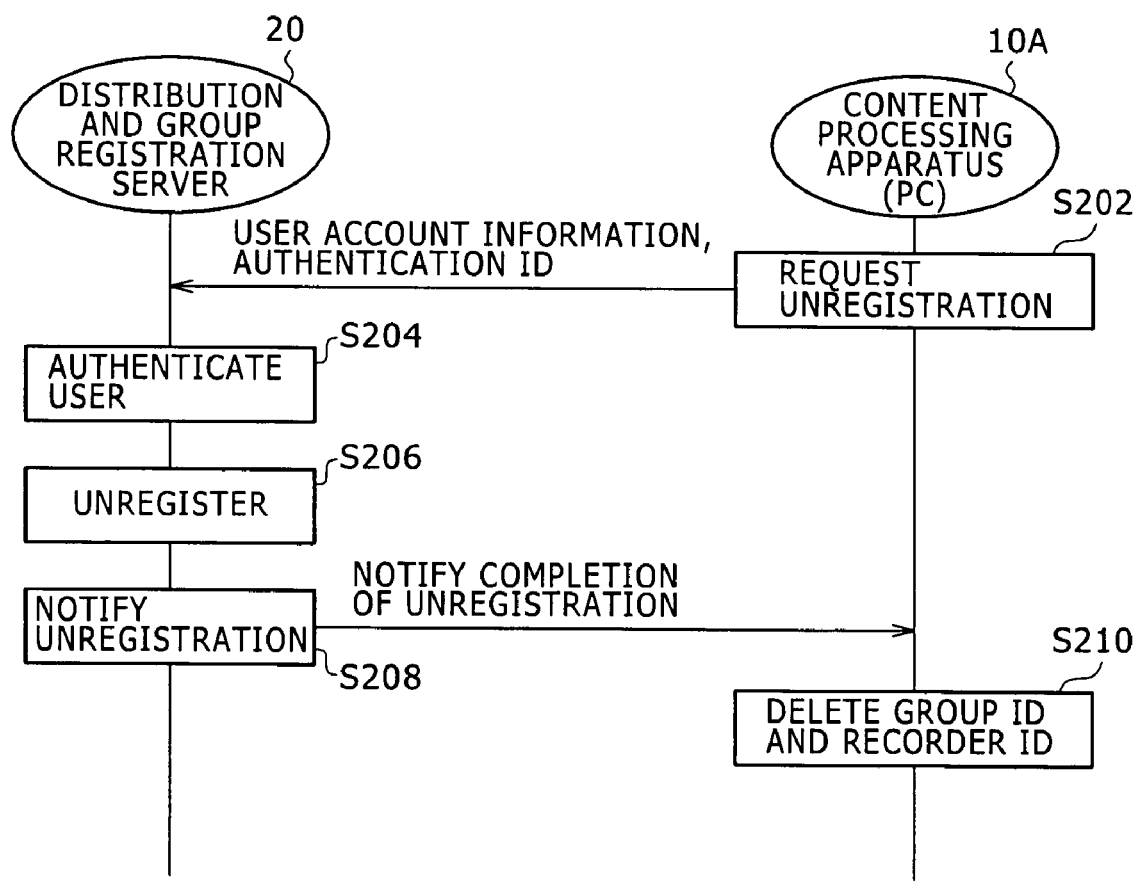
FIG. 20 is a timing chart indicative of group unregistration processing in the content sharing system associated with the first embodiment.

The following describes the processing (namely, group unregistration processing) of unregistering the group registration of the content processing apparatus 10 in the content sharing system 100 associated with the first embodiment with reference to FIG. 20. FIG. 20 shows a timing chart indicative of the group unregistration processing in the content sharing system 100.

As shown in FIG. 20, the group registration request block 120 of the content processing apparatus 10A first requests the distribution and group management server 20 for group unregistration (step S202). To be more specific, the group registration request block 120 generates group unregistration request information (for example, group unregistration request notification, user ID, credit card number, and device ID) and transmits the generated information to the distribution and group management server 20 via the network 5.

Next, in step S204, the user authentication block 234 of the distribution and group management server 20 authenticates the user owning the requesting content processing apparatus 10A (step S204). This user authentication processing is executed by determining whether there is a match between the user account information contained in the received group unregistration request information and the user account information stored in the group registration database 216. If the user authentication fails, the unregistration processing ends. If the user authentication is successful, the procedure goes to step S206.

Further, in step S206, the device registration block 236 of the distribution and group management server 20 unregisters the requesting content processing apparatus 10A from the device group of the authenticated user (step S206). To be more specific, the device registration block 236 deletes the device ID (terminal ID or media ID) of the requesting content processing apparatus 10 and the group ID from the columns of device ID 2164 and group ID of the group registration database 216.

Next, in step S208, the distribution and group management server 20 generates an unregistration completion notification and transmits the generated notification to the unregistered content processing apparatus 10A (step S208).

In step S210, the group ID add/delete block 189 of the content processing apparatus 10A deletes or invalidates all recorder IDs other than the recorder ID of the content processing apparatus 10A itself contained in reproduction permission ID list L and group IDs (step S210). Consequently, the content processing apparatus 10A becomes able to reproduce only the created content data created by itself and the content data that is not copyright-managed.

In order to group-unregister the content processing apparatus 10B such as a recording device or the content processing apparatus 10C such as a PD, the content processing apparatus 10B or 10C to be unregister is connected to the already group-registered content processing apparatus 10A of the same user.

Thus, the group registration and group unregistration of the content processing apparatus 10 have been described. Executing unregistration and re-registration allows the changing of groups to which the content processing apparatus 10 belongs if the owner of the same content processing apparatus 10 has changed to another user.

Figure 21:
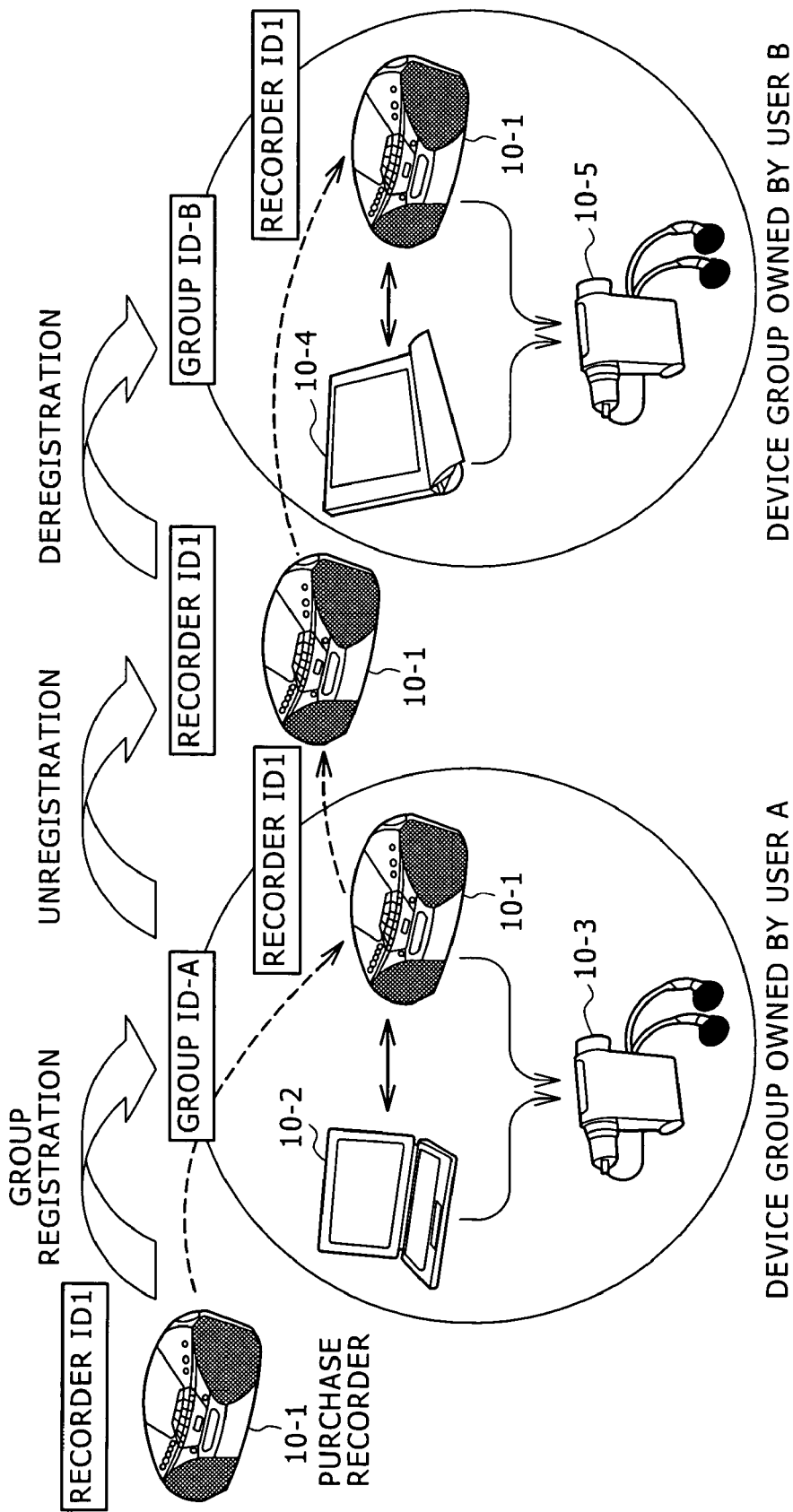
FIG. 21 is a schematic diagram illustrating a specific example of group registration/unregistration processing in the content sharing system associated with the first embodiment.

As shown in FIG. 21, user A who has newly purchased the content processing apparatus 10-1 having a content recording capability group-registers the content processing apparatus 10 with the device group of his own. Next, if the user of the content processing apparatus 10-1 has changed from user A to user B, the content processing apparatus 10 is unregistered from the device group of user A and the unregistered content processing apparatus 10 is initialized. Then, the initialized content processing apparatus 10 is registered with the device group of user B. Thus, if a change takes place among owning users, group registration and unregistration allow the content processing apparatus 10-1 to be related with a plurality of group IDs with recorder ID1 of the content processing apparatus 10-1 having a content recording capability left unchanged.

In addition, the created content data recorded by the content processing apparatus 10-1 itself to be group-registered may be shared including the created content data created before the group registration. To be more specific, in the example shown in FIG. 21, with the content processing apparatuses 10-4 and 10-5 included in the device group of user B with which the content processing apparatus 10-1 is registered, even the created content data recorded by the content processing apparatus 10-1 before the registration with the device group of user B may be reproduced without restriction. This leads to the enhanced convenience for the user of the content processing apparatus 10B such as a recording device, which in turn enhances purchase merits.

8. Certificate Distribution Processing

<Certificate Distribution Processing 1>

Figure 22:
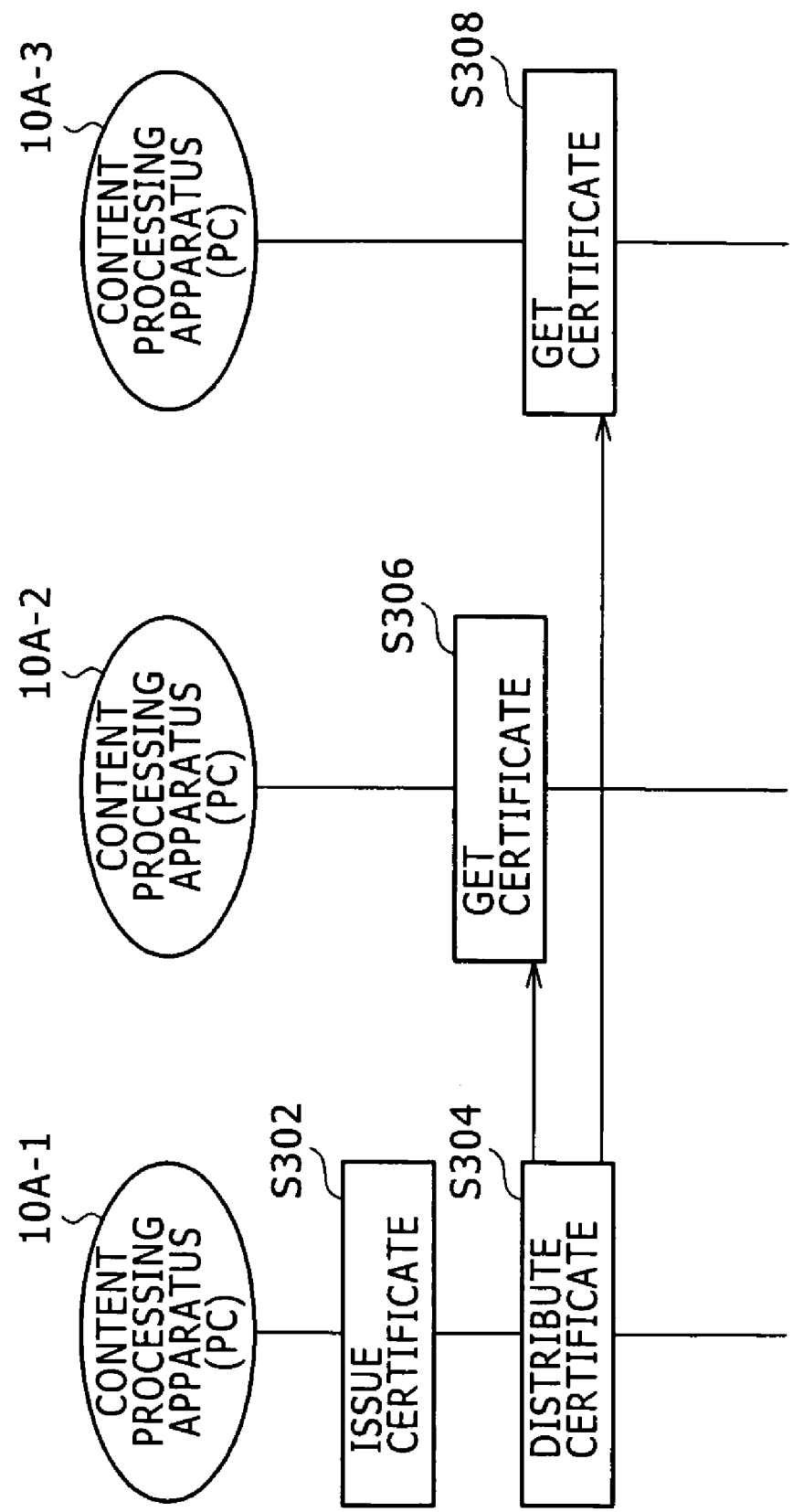
FIG. 22 is a timing chart indicative of certificate distribution processing associated with the first embodiment.

The following describes certificate distribution processing 1 to be executed in the content sharing system 100 associated with the first embodiment with reference to FIG. 22. FIG. 22 shows a timing chart indicative of certificate distribution processing 1 associated with the first embodiment.

As shown in FIG. 22, certificate distribution processing 1 distributes group certificate G issued by the content processing apparatus 10A-1 itself such as a PC capable of issuing certificates directly to the content processing apparatuses 10A-2 and 10A-3.

First, in step S302, the certificate issuing block 190 of the content processing apparatus 10A-1 such as a PC issues a group certificate G (step S302). Group certificate G issued here has the recorder ID corresponding to the content processing apparatus 10A-1 itself and the group ID of the device group to which the content processing apparatus 10A-1 belongs (namely, the group ID assigned to the user who owns the content processing apparatus 10A-1), both related with each other.

Next, in step S304, the content processing apparatus 10A-1 directly distributes the certificate to the content processing apparatuses 10A-2 and 10A-3 (step S304). The distribution of group certificate G in this case is executed by transmitting the certificate via the network 5 or the local line 9 or by providing the certificate via the recording medium 7, for example.

In steps S306 and S308, the content processing apparatuses 10A-2 and 10A-3 receive group certificate G distributed from the content processing apparatus 10A-1 (step S306, S308).

Thus, in certificate distribution processing 1, the content processing apparatus 10-1 (such as a PC) capable of issuing certificates issues group certificate G corresponding to its recorder ID and group ID and directly distributes the issued certificate to the content processing apparatuses 10A-2 and 10A-3. Consequently, the content processing apparatuses 10A-2 and 10A-3 become able to update reproduction permission ID list L on the basis of the received group certificate G.

It should be noted that the distribution and group management server 20 may relay group certificate G issued by the content processing apparatus 10A-1 to the content processing apparatuses 10A-2 and 10A-3. This configuration allows the distribution of group certificate G without interconnecting with the content processing apparatus 10-1 (via the local connection or the network 5), thereby allowing the remotely located content processing apparatuses 10 of the same user to add the group IDs thereof to reproduction permission ID list L thereof.

<Certificate Distribution Processing 2>

Figure 23:
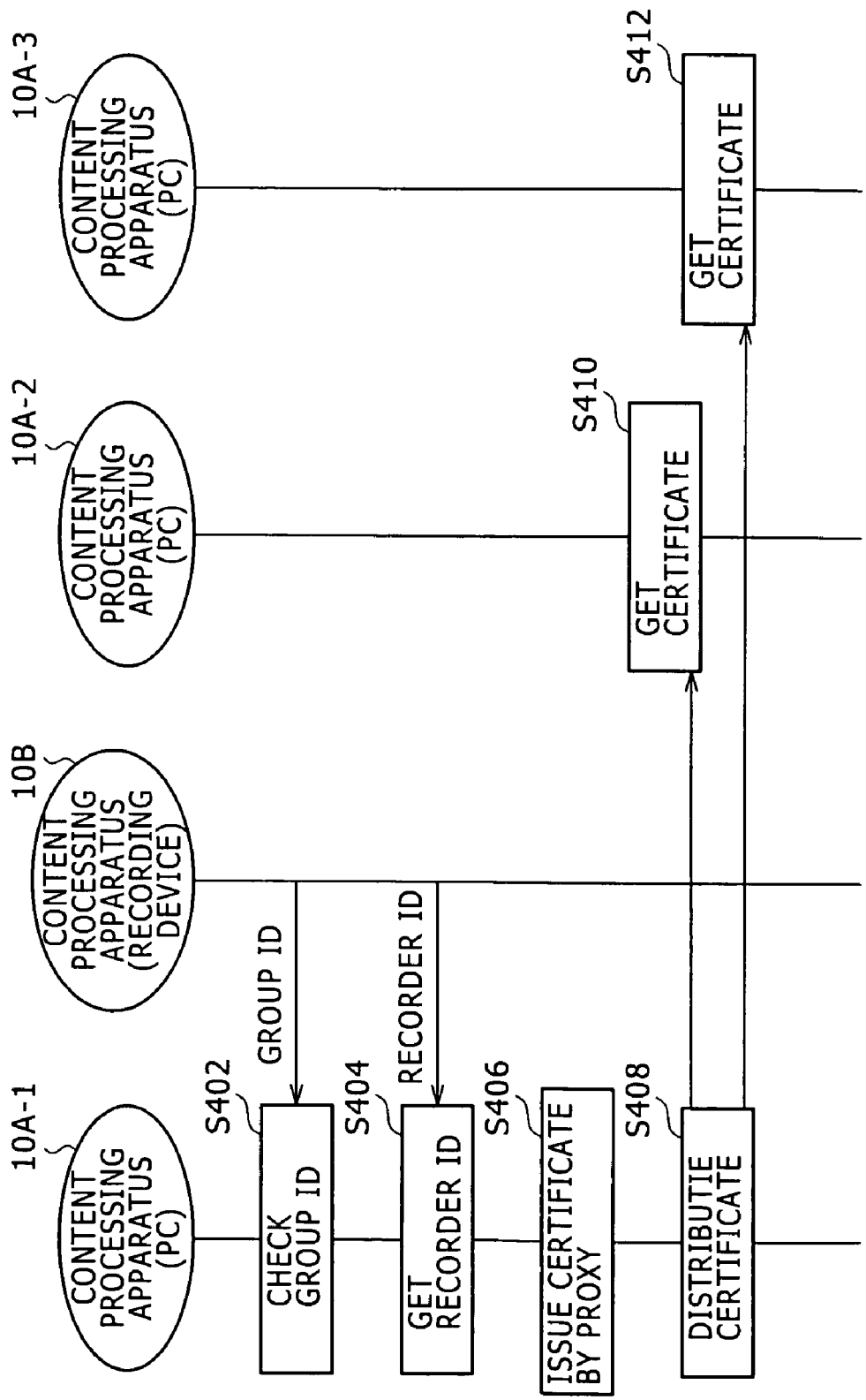
FIG. 23 is a timing chart indicative of certificate distribution processing associated with the first embodiment.

The following describes certificate distribution processing 2 to be executed in the content sharing system 100 associated with the first embodiment with reference to FIG. 23. FIG. 23 is a timing chart indicative of certificate distribution processing 2 associated with the first embodiment.

As shown in FIG. 23, in this certificate distribution processing 2, the content processing apparatus 10A-1 such as a PC capable of issuing certificates issues, by proxy, group certificate G associated with the content processing apparatus 10B such as a recording device incapable of issuing certificates and distributes the issued certificate to other content processing apparatuses 10A-2 and 10A-3.

First, in step S402, the content processing apparatus 10A-1 connected to the content processing apparatus 10B checks the group ID thereof. Then, the content processing apparatus 10A-1 acquires the recorder ID of the content processing apparatus 10B and directly distributes the recorder ID to the content processing apparatuses 10A-2 and 10A-3 (step S402). To be more specific, the content processing apparatus 10-1 is first connected to the content processing apparatus 10B via the local line 9 for example, the group ID of the content processing apparatus 10B is read, and this group ID is matched against the group ID of the content processing apparatus 10A-1. If a match is found, the procedure goes to step S404; if a mismatch is found, the certificate issue processing ends.

Next, in step S404, the content processing apparatus 10A-1 acquires the recorder ID of the content processing apparatus 10B (step S404). To be more specific, the content processing apparatus 10A-1 reads the recorder ID corresponding to the content processing apparatus 10B from reproduction permission ID list L thereof.

In step S406, the content processing apparatus 10A-1 issues, by proxy, group certificate G associated with the content processing apparatus 10B (step S406). To be more specific, the certificate issuing block 190 of the content processing apparatus 10A-1 issues group certificate G with the group ID related with the recorder ID acquired from the content processing apparatus 10B in steps S402 and S404. This group certificate G is not a certificate corresponding to the content processing apparatus 10A-1 but a certificate corresponding to the content processing apparatus 10B.

Then, in step S408, the content processing apparatus 10-1 directly distributes the certificate to the content processing apparatuses 10A-2 and 10A-3 (step S408).

In steps S410 and S412, the content processing apparatuses 10A-2 and 10A-3 acquire group certificate G distributed from the content processing apparatus 10A-1 (steps S410, S412).

Thus, in certificate distribution processing 2, the content processing apparatus 10-1 (such as a PC for example) capable of issuing certificates issues, by proxy, group certificate G corresponding to the recorder ID and the group ID of the content processing apparatus 10B belonging to the same device group and distributes the issued certificate to other content processing apparatuses 10A-2 and 10A-3. This configuration allows the secure notification of the recorder ID of the content processing apparatus 10B incapable of issuing group certificate G to the content processing apparatuses 10 within the content sharing system 100.

<Certificate Distribution Processing 3>

Figure 24:
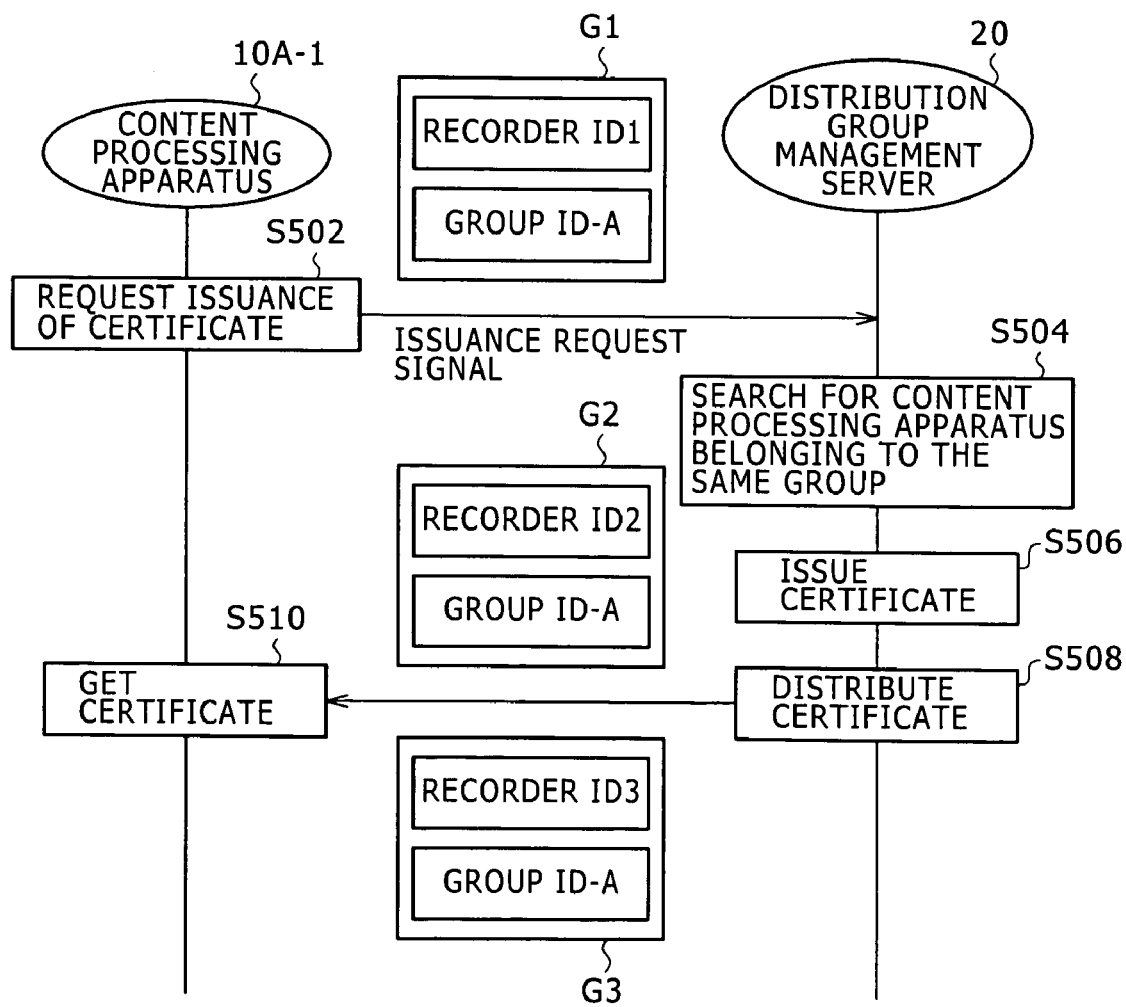
FIG. 24 is a timing chart indicative of certificate distribution processing associated with the first embodiment.

The following describes certificate distribution processing 3 to be executed in the content sharing system 100 associated with the first embodiment with reference to FIG. 24. FIG. 24 shows a timing chart indicative of certificate distribution processing 3 associated with the first embodiment.

As shown in FIG. 24, in certificate distribution processing 3, the content processing apparatus 10A-1 registered with a certain device group receives, from the distribution and group management server 20, group certificate G associated with another content processing apparatus 10 registered with the same device group.

First, in step S502, the content processing apparatus 10A-1 requests the distribution and group management server 20 for issuing group certificate G associated with another content processing apparatus 10-1 registered with the same device group for example (step S502). To be more specific, the certificate issue request block 181 of the content processing apparatus 10A-1 transmits group certificate G1 containing group ID-A and recorder ID1 of the content processing apparatus 10-1 itself and a certificate issue request signal for example to the distribution and group management server 20. It should be noted that in this step, at least a certificate issue request signal and group ID-A may only be transmitted; therefore, group certificate G1 need not always been transmitted.

In step S504, the distribution and group management server 20 searches for the recorder ID of the content processing apparatuses 10A and 10B having the recording capability registered with the same device group as that of the requesting content processing apparatus 10A-1 (step S504). To be more specific, the certificate management block 242 of the content processing apparatus 10-1 receives the above-mentioned group certificate G and the above-mentioned certificate issue request signal from the content processing apparatus 10A-1 and then reads group ID-A and recorder ID1 from the received group certificate G. Next, the certificate management block 242 searches the group registration database 216 or the certificate database 219 for the recorder ID associated with the same group ID-A by use of the group ID-A as a search condition. It is assumed here that recorder ID2 and recorder ID3 be retrieved as a result of this search. Then, the certificate management block 242 notifies the certificate issue block 240 of the search results, namely, recorder ID2 and recorder ID3.

In step S506, the distribution and group management server 20 issues one or more group certificates G corresponding to the above-mentioned certificate issue request (step S506). To be more specific, the certificate issue block 240 of the distribution and group management server 20 issues group certificates G1 and G2 including respectively recorders ID2 and ID3 received from the certificate management block 242. In this issue processing, group certificate G may be newly issued or past group certificate G may be read from the certificate database 219.

Then, in step S508, the distribution and group management server 20 distributes the above-issued one or more (for example, two) group certificates G to the content processing apparatus 10A-1 (step S508). To be more specific, the certificate issue block 240 of the distribution and group management server 20 transmits the above-issued group certificates G1 and G2 to the content processing apparatus 10A-1 via the network 5 for example.

In step S510, the content processing apparatus 10A-1 acquires group certificate G from the distribution and group management server 20 (step S510).

Thus, in certificate distribution processing 3, the content processing apparatus 10A-1 is able to securely acquire recorder ID2 and recorder ID3 of the content processing apparatus 10-1 registered with the same device group as that of the content processing apparatus 10A-1 and add the acquired recorder IDs to reproduction permission ID list L of the content processing apparatus 10A-1. Because group certificates G are managed by the distribution and group management server 20 in a unified manner, the content processing apparatus 10A-1 is able to quickly and easily acquire all recorder IDs that reflect the most recent group registration status inside the device group of the content processing apparatus 10-1.

It should be noted that it is also practicable to apply the above-mentioned certificate distribution processing 3 such that, if the created content data requested for reproduction is not reproducible in the content processing apparatus 10A-1, the content processing apparatus 10A-1 may be connected to the distribution and group management server 20 to acquire group certificate G and update reproduction permission ID list L, thereby trying to reproduce that created content data again.

9. List Update Processing

<List Update Processing 1>

Figure 25:
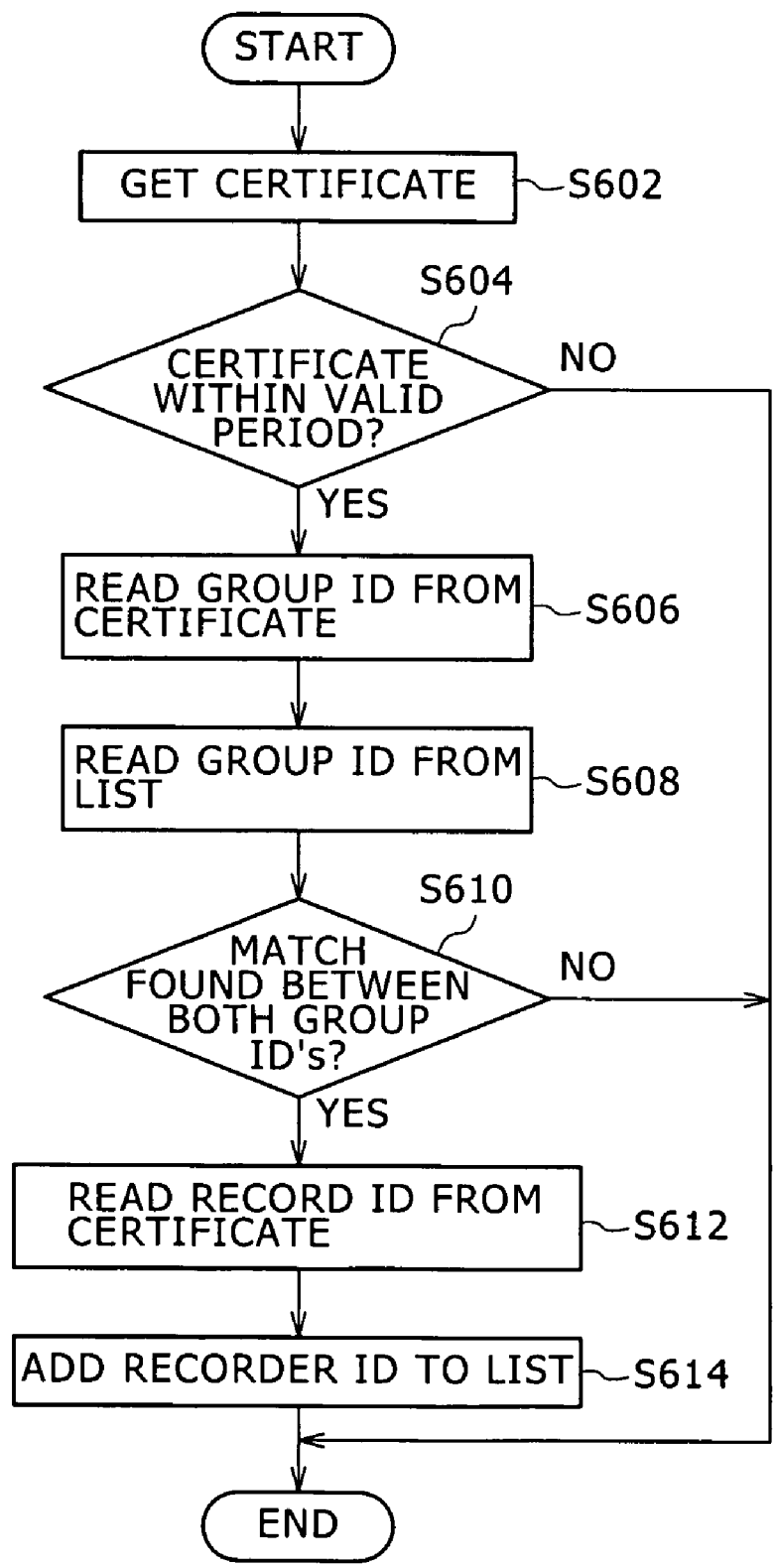
FIG. 25 is a flowchart indicative of list update processing associated with the first embodiment.

The following describes list update processing 1 to be executed in the content processing apparatus 10 (or a content reproducing apparatus) of the content sharing system 100 associated with the first embodiment with reference to FIG. 25. FIG. 25 is a flowchart indicative of list update processing 1 associated with the first embodiment. In list update processing 1, the content processing apparatus 10 acquires distributed group certificate G and, on the basis of the acquired group certificate G, updates reproduction permission ID list L of the content processing apparatus 10 itself of reproduction permission ID list L of another content processing apparatus 10.

As shown in FIG. 25, in step S602, the content processing apparatus 10 acquires group certificate G distributed from another content processing apparatus 10 or the distribution and group management server 20 (step S602). The content processing apparatus 10 may receive group certificate G via the network 5 or the local line 9 or read group certificate G from the recording medium 7 or read group certificate G embedded in content data.

In step S604, the above-mentioned acquired group certificate G is determined whether within its valid period (step S604). To be more specific, the list update block 184 of the content processing apparatus 10 first reads valid period information from group certificate G and acquires current time information from an incorporated timer. Next, the list update block 184 determines whether the current time is within the valid period of group certificate G, namely, whether group certificate G is valid or not. If group certificate G is found to be within its valid period, then the procedure goes to step S606. On the other hand, if the group certificate G is found to be outside its valid period, then list update is rejected, upon which this list update processing comes to an end.

In step S606, the list update block 184 reads the group ID (or a second group ID) included in the above-acquired group certificate G (step S606).

Then, in step S608, the list update block 184 reads the group ID (or a first group ID) from the content processing apparatus 10 itself (step S608). In the first embodiment, the group ID is stored in reproduction permission ID list L stored in the storage unit 114 of each content processing apparatus 10, so that the list update block 184 reads the group ID corresponding to the content processing apparatus 10 from reproduction permission ID list L.

Next, in step S610, the list update block 184 determines whether there is a match between the second group ID read from the acquired group certificate G and the first group ID corresponding to the content processing apparatus 10 itself (step S610). If there is a match, then list update is permitted and the procedure goes to step S612. In this case, the content processing apparatus 10 corresponding to the recorder ID included in group certificate G and the content processing apparatus 10 itself have the same group ID, so that these content processing apparatuses 10 are determined belonging to the same device group, thereby permitting list update. On the other hand, if a mismatch is found between the first group ID and the second group ID, then list update is rejected, upon which the list update processing comes to an end.

In step S612, the list update block 184 adds the recorder ID included in group certificate G to reproduction permission ID list L (step S612). To be more specific, the list update block 184 reads the recorder ID from the acquired group certificate G and writes this recorder ID to reproduction permission ID list L. Consequently, the content processing apparatus 10 becomes able to reproduce the content data attached with this recorder ID.

Figure 26:
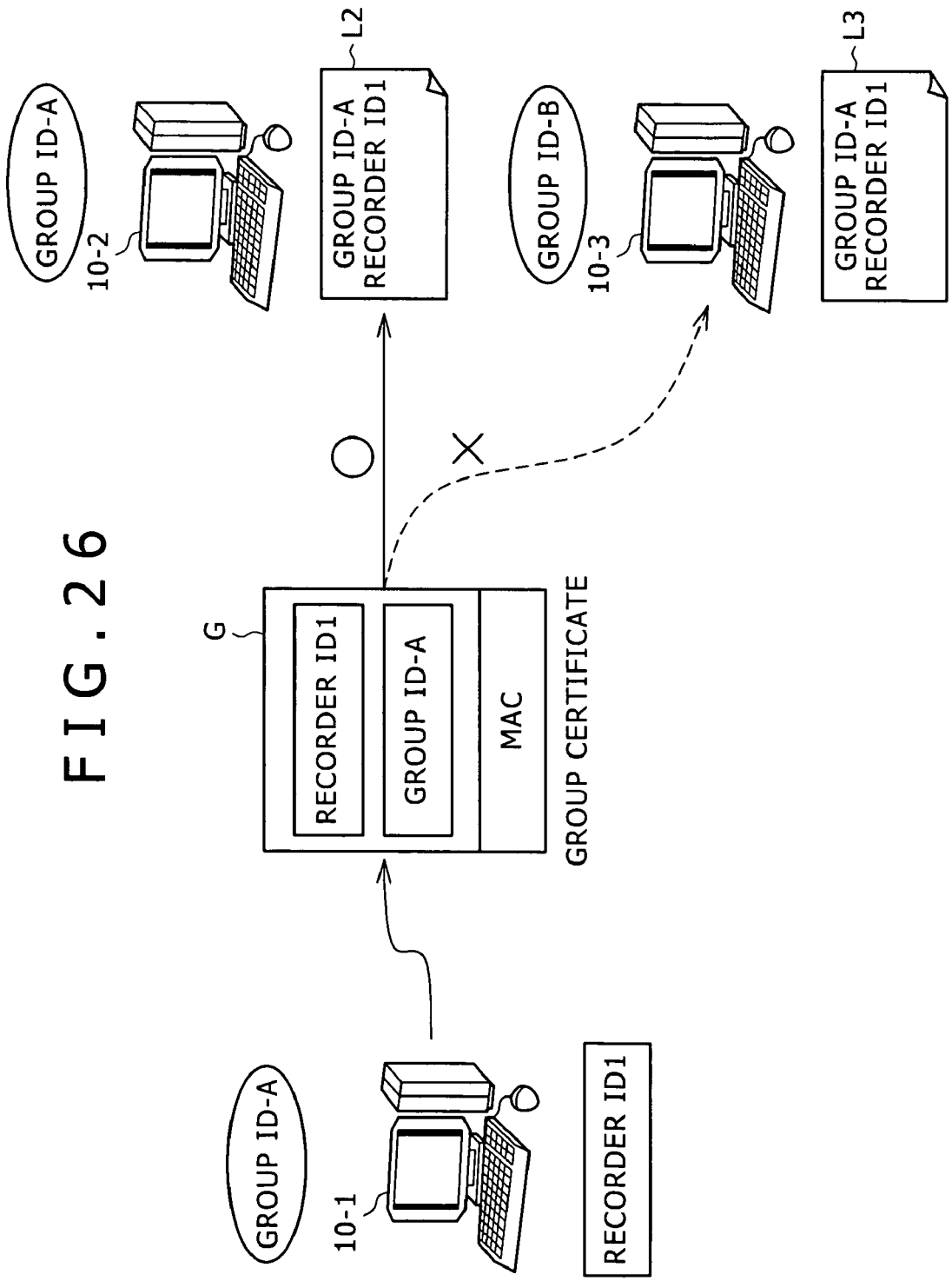
FIG. 26 is a schematic diagram illustrating a specific example of list update processing associated with the first embodiment.

The following describes a specific example obtained by applying the above-mentioned list update processing 1, with reference to FIG. 26. It should be noted that, in the example shown in FIG. 26, it is assumed that no valid period be set to group certificate G.

As shown in FIG. 26, the content processing apparatus 10-1 and the content processing apparatus 10-2 are registered with the same device group and have the same group ID-A. On the other hand, the content processing apparatus 10-3 is registered with a device group different from that of the content processing apparatuses 10-1 and 10-2 and has different group ID-B.

In this case, group certificate G issued by the content processing apparatus 10-1 includes recorder ID1 and group ID-A of the content processing apparatus 10-1. Acquiring the above-mentioned group certificate G, the content processing apparatus 10-2 is able to add recorder ID1 included in the group certificate G to reproduction permission ID list L2 of the content processing apparatus 10-2 because there is a match between group ID-A included in the group certificate G and group ID-A of the content processing apparatus 10-2. On the other hand, the content processing apparatus 10-3 that has acquired the above-mentioned group certificate G is unable to add recorder ID1 included in the group certificate G to reproduction permission ID list L3 of content processing apparatus 10-3 because there is a mismatch between group ID-A included in the group certificate G and group ID-A of the content processing apparatus 10-3.

Thus, in list update processing 1 associated with the first embodiment, if there is a match between the device group to which the content processing apparatus 10 belongs and the device group indicated by group certificate G, the recorder ID included in group certificate G is added to reproduction permission ID list L, thereby allowing the sharing of created content data of the content processing apparatus 10 having that recorder ID.

It should be noted that an example in which the content processing apparatus 10A updates its own reproduction permission ID list L is used in the above description. It is also practicable reproduction permission ID lists L of the content processing apparatuses 10B and 10C such as a recording device and a PD may be updated by the content processing apparatus 10A such as a PC connected via the recording medium 7, for example.

<List Update Processing 2>

Figure 27:
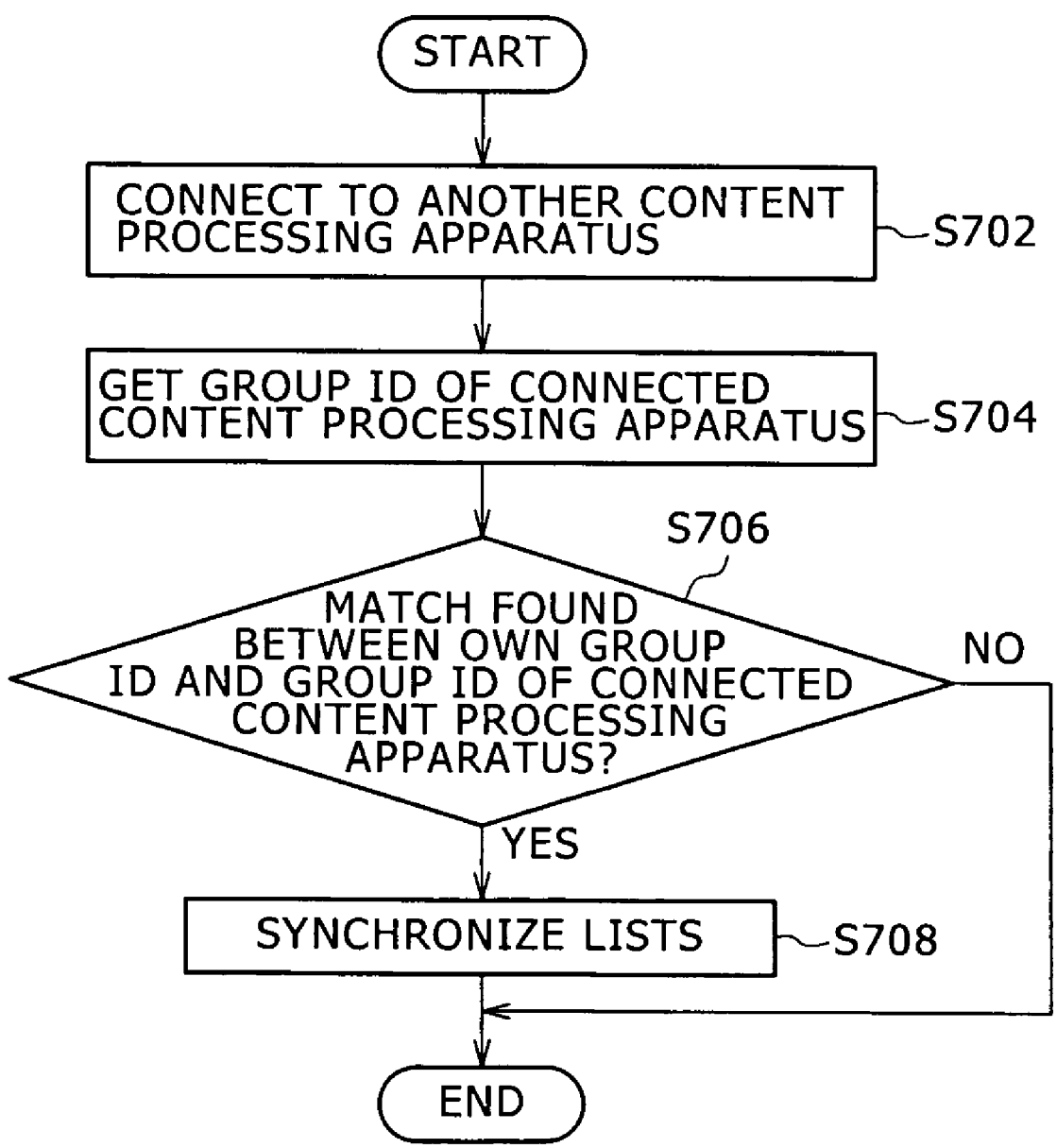
FIG. 27 is a flowchart indicative of list update processing associated with the first embodiment.

The following describes list update processing 2 to be executed in the content processing apparatus 10 (or a content reproducing apparatus) of the content sharing system 100 associated with the first embodiment with reference to FIG. 27. FIG. 27 is a flowchart indicative of list update processing 2 associated with the first embodiment. In list update processing 2, the content processing apparatus 10 puts synchronization between reproduction permission ID list L of its own and reproduction permission ID list L of another content processing apparatus 10, thereby updating reproduction permission ID lists L.

As shown in FIG. 27, in step S702, the content processing apparatus 10-1 and the content processing apparatus 10-2 are interconnected by the network 5 or the local line 9 for example (step S702). Consequently, the content processing apparatus 10-1 and the content processing apparatus 10-2 become mutually accessible.

Next, in step S704, the list sync block 186 of the content processing apparatus 10-1 acquires group ID2 of the content processing apparatus 10-2 (step S704). To be more specific, the content processing apparatus 10-1 requests the content processing apparatus 10-2 for reading the group ID from reproduction permission ID list L thereof and transmitting this group ID to the content processing apparatus 10-1.

In step S706, the list sync block 186 of the content processing apparatus 10-1 determines whether there is a match between the group ID of the content processing apparatus 10-1 (the first group ID) and the group ID of the content processing apparatus 10-2 (the second group ID) (step S706). If a match is found, the list update is executed and the procedure goes to step S706. On the other hand, if a mismatch is found, list update is rejected, upon which the list update processing comes to an end.

Then, in step S708, the list sync block 186 puts synchronization between reproduction permission ID list L1 of the content processing apparatus 10-1 and reproduction permission ID list L2 of the content processing apparatus 10-2 (step S708). To be more specific, the list sync block 186 combines the recorder ID included in reproduction permission ID list L1 and the recorder ID included in reproduction permission ID list L2 to write the combined recorder IDs to both reproduction permission ID lists L1 and L2. Consequently, the recorder IDs included in reproduction permission ID lists L of both the content processing apparatuses 10-1 and 10-2 become the same.

List update processing 2 described above is useful in updating reproduction permission ID lists L of the content processing apparatuses 10B and 10C such as a recording device and a PD from the side of the content processing apparatus 10A by connecting the content processing apparatus 10A with the content processing apparatuses 10B and 10C.

10. Reproduction Control Processing

<Created Content Reproduction Control Processing>

Figure 28:
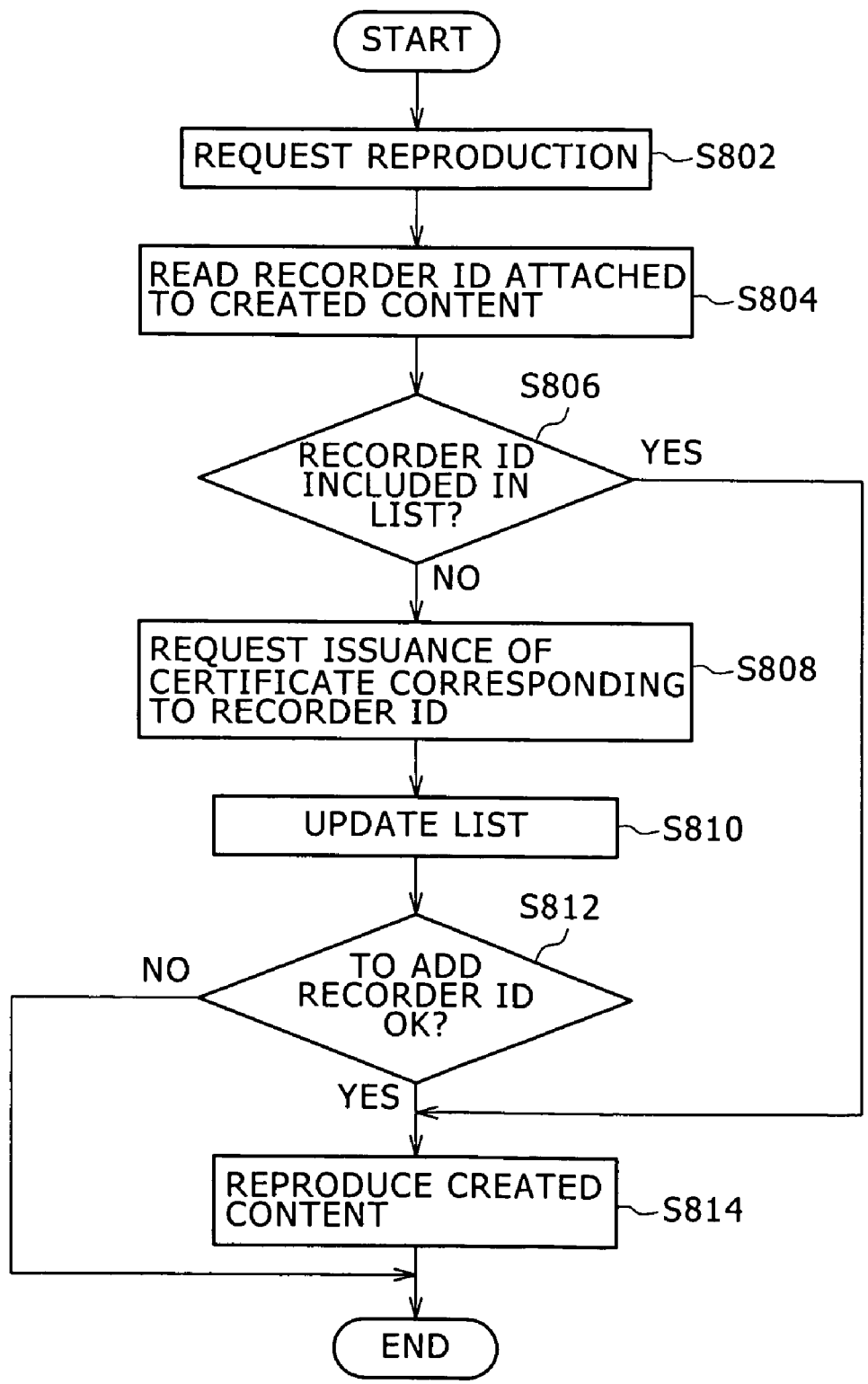
FIG. 28 is a flowchart indicative of created content reproduction control processing associated with the first embodiment.

The following describes created content reproduction control processing to be executed in the content processing apparatus 10 (or a content reproducing apparatus) of the content sharing system 100 associated with the first embodiment with reference to FIG. 28. FIG. 28 is a flowchart indicative of the created content reproduction control processing associated with the first embodiment.

As shown in FIG. 28, in step S802, the user requests reproduction, for example (step S802). This reproduction request is made by the user by selecting desired created content data through the input unit 106 and directing the content processing apparatus 10 for the reproduction of the selected created content data.

Next, in step S804, the recorder ID attached to the created content data is read (step S804). The content reproduction block 170 of the content processing apparatus 10-1 reads the created content data requested for reproduction from the storage unit 114 or the recording medium 7 for example and extracts and interprets the recorder ID attached to the created content data.

In step S806, it is determined whether this recorder ID is included in reproduction permission ID list L of the content processing apparatus 10 (step S806). To be more specific, the reproduction control block 172 of the content reproduction block 170 determines whether the recorder ID read from the above-mentioned created content data is included in reproduction permission ID list L read from the storage unit 114. If the recorder ID is found included in reproduction permission ID list L, then the reproduction control block 172 permits the reproduction of the created content data and the procedure goes to step S814. If the recorder ID is found not included in reproduction permission ID list L, then the reproduction control block 172 does not permit the reproduction of the created content data and the procedure goes to step S808.

Then, in step S808, the issuance of group certificate G corresponding to the above-mentioned recorder ID read from the created content data is requested (step S808). To be more specific, if the reproduction has been rejected as described above, the certificate issue request block 181 of the reproduction control block 172 requests the issuance of group certificate G that contains the above-mentioned recorder ID. The destination of this request is such a device capable of issuing group certificate G containing that recorder ID as the distribution and group management server 20, another content processing apparatus 10 corresponding to the recorder ID, or a home network server, for example.

In step S810, reproduction permission ID list L is updated (step S810). In response to the above-mentioned certificate issue request of step S808, the distribution and group management server 20 or another content processing apparatus 10 for example issues group certificate G that contains the above-mentioned recorder ID. When the requesting content processing apparatus 10-1 acquires the requested group certificate G, list update processing 1 described above with reference to FIG. 25 will start.

If the recorder ID read from the created content data has been added to reproduction permission ID list L as a result of the list update processing of step S810, then the procedure goes to step S814. On the other hand, if that recorder ID has not been added to reproduction permission ID list L, then the reproduction of the created content data is rejected, upon which the reproduction control processing ends (step S812).

Next, in step S814, the created content data is reproduced (step S814). If the recorder ID attached to the created content data is found included in reproduction permission ID list L as a result of the above-mentioned processing (step S806) or if that recorder ID is found added to reproduction permission ID list L by the list update processing (step S812), then the content reproduction block 170 reproduces the created content data.

Thus, the created content data reproduction control processing is executed on the basis of the recorder ID attached to created content data, reproduction permission ID list L, and the group ID owned by the content processing apparatus 10.

<Distributed Content Reproduction Control Processing>

Figure 29:
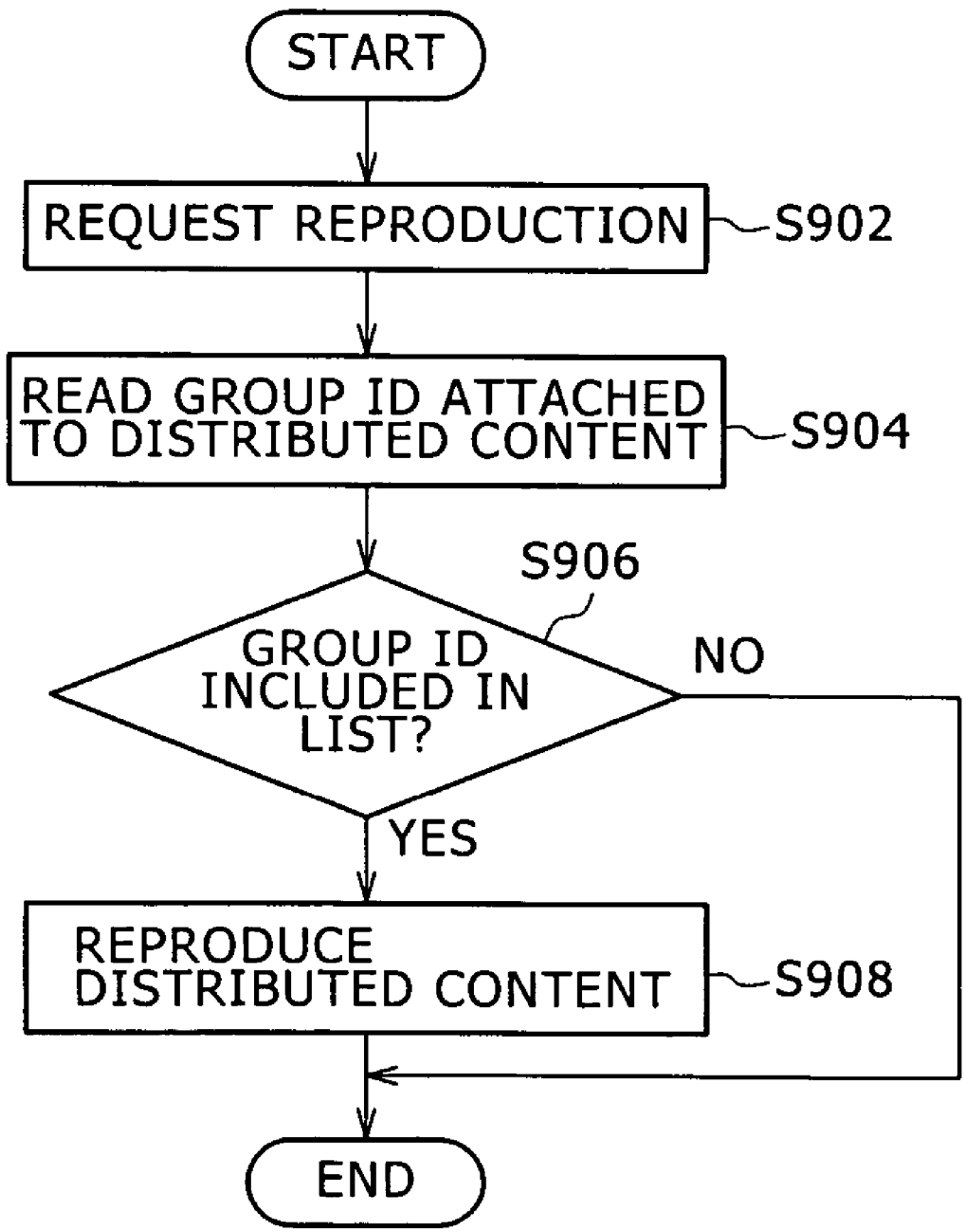
FIG. 29 is a flowchart indicative of distributed content reproduction control processing associated with the first embodiment.

The following describes the distributed content reproduction control processing to be executed in the content processing apparatus 10 (or a content reproducing device) of the content sharing system 100 associated with the first embodiment with reference to FIG. 29. FIG. 29 is a flowchart indicative of the distributed content reproduction control processing associated with the first embodiment.

As shown in FIG. 29, in step S902, a reproduction request is made by the user for example (step S902). The user makes this reproduction request by selecting desired distributed content through the input unit 106 and directing the content processing apparatus 10 to reproduce the selected distributed content data.

Next, in step S904, the group ID attached to the distributed content data is read (step S904). The content reproduction block 170 of the content processing apparatus 10-1 reads the distributed content data requested for reproduction from the storage unit 114 or the recording medium 7 for example and extracts and interprets the group ID attached to the created content data.

In step S906, it is determined whether this group ID is included in reproduction permission ID list L of the content processing apparatus 10 (step S906). To be more specific, the reproduction control block 172 of the content reproduction block 170 determines whether the group ID read from the above-mentioned distributed content data is included in reproduction permission ID list L read from the storage unit 114. If the group ID is found included in reproduction permission ID list L, then the reproduction control block 172 permits the reproduction of the distributed content data and the procedure goes to step S908. If the group ID is found not included in reproduction permission ID list L, then the reproduction control block 172 does not permit the reproduction of the distributed content data, upon which the reproduction control processing ends.

Then, in step S908, the distributed content data is reproduced (step S908). If the group ID attached to the distributed content data is found contained in reproduction permission ID list L, then the content reproduction block 170 reproduces the distributed content data.

As described above, the distributed content data reproduction control processing is executed on the basis of the group ID attached to the distributed content data and reproduction permission ID list L. This group ID identifies a device group to which the content processing apparatus 10-1 belongs as described above (namely, the ID for content sharing service). In this first embodiment, this group ID is also used for the reproduction control of distributed content data. Consequently, distributed content becomes reproducible among all the content processing apparatuses 10 registered with the same group. In addition, the group ID that is the ID for content sharing service and the user ID for distribution service that is the ID for content distribution service may be used separately. In this case, the user ID for distribution service is added to distributed content data and the reproduction control of the distributed content data may be executed on this user ID for distribution service in the same manner as described above.

Figure 30:
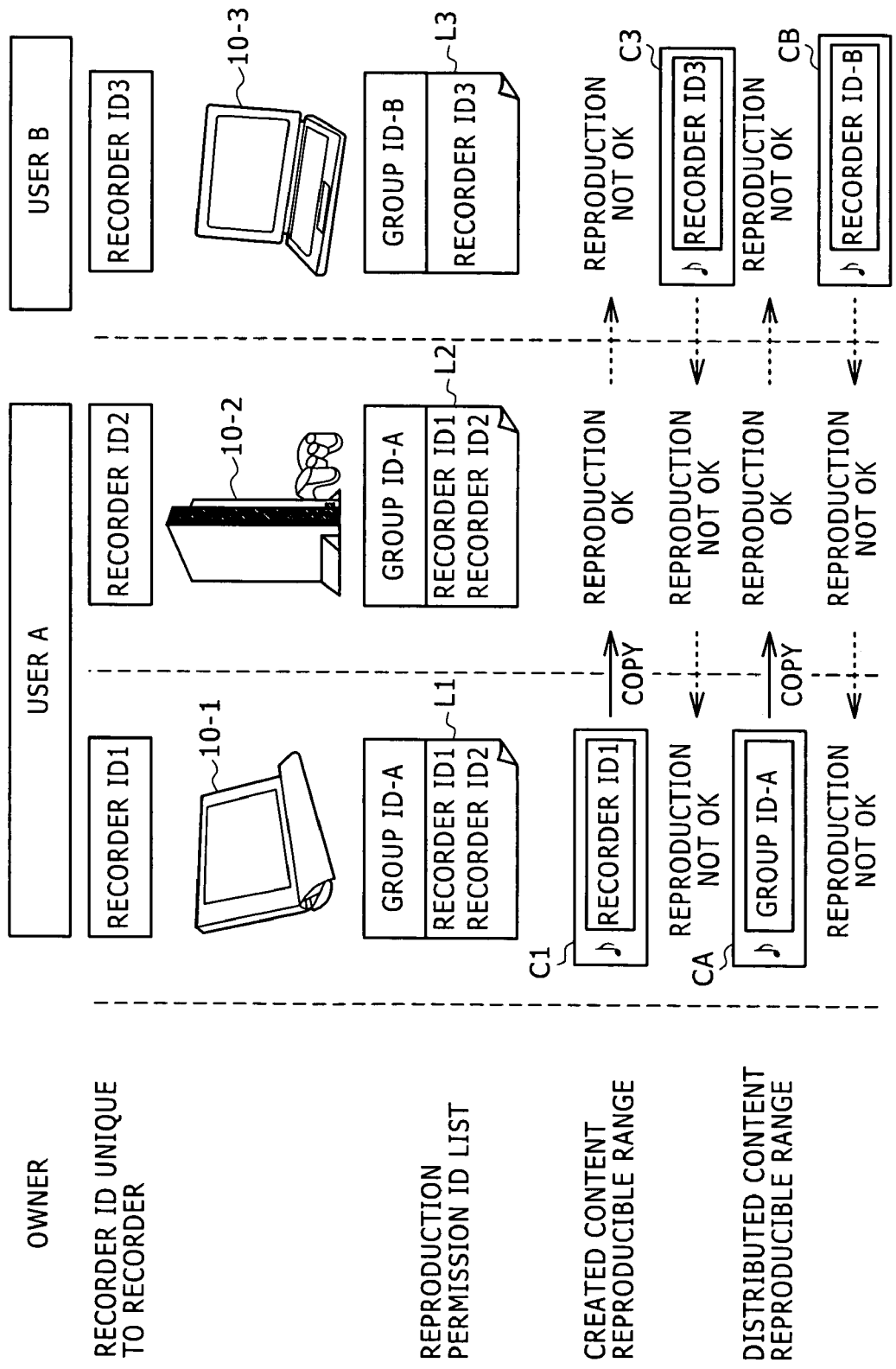
FIG. 30 is a schematic diagram illustrating a specific example of content reproduction control processing associated with the first embodiment.

Thus, the processing of controlling the reproduction of created content data and distributed content data has been described. The following describes a specific example with the above-mentioned reproduction control processing applied with reference to FIG. 30.

As shown in FIG. 2, the content processing apparatuses 10-1, 10-2, and 10-3 are assigned with recorder ID1, recorder ID2, and recorder ID3 respectively. Therefore, the content processing apparatuses 10-1, 10-2, and 10-3 attaches the recorder IDs thereof to the content data created thereby and record the created content data.

The content processing apparatuses 10-1 and 10-2 are registered with the device group of user A and the content processing apparatus 10-3 is registered with the device group of user B. Therefore, group ID-A is assigned to distributed content data CA provided to the content processing apparatuses 10-1 and 10-2 and group ID-B is assigned to distributed content data CB provided to the content processing apparatus 10-3.

The content processing apparatuses 10-1, 10-2, and 10-3 have reproduction permission ID list L1, L2, and L3 respectively. Reproduction permission ID list L1 and L2 for the content processing apparatuses 10-1 and 10-2 belonging to the same device group A contain group ID-A, recorder ID1 and recorder ID2, thereby sharing recorder ID1 and recorder ID2. On the other hand, reproduction permission ID list L3 of the content processing apparatus 10-3 belonging to device group B contains group ID-B and recorder ID3 but not group ID-A, recorder ID1 and recorder ID2.

In this case, distributed content data C1 recorded by the content processing apparatus 10-1 and attached with recorder ID1 is reproducible with the content processing apparatus 10-2 because recorder ID1 is contained in reproduction permission ID list L2, but not reproducible with the content processing apparatus 10-3 because recorder ID1 is not contained in reproduction permission ID list L3. On the other hand, created content data C3 recorded by the content processing apparatus 10-3 and attached with recorder ID3 is not reproducible with the content processing apparatuses 10-1 and 10-2 because reproduction permission ID lists L1 and L2 do not contain recorder ID3.

Distributed content data CA attached with group ID-A is reproducible with the content processing apparatuses 10-1 and 10-2 because group ID-A is contained in reproduction permission ID lists L1 and L2 but not reproducible with the content processing apparatus 10-3 because group ID-A is not contained in reproduction permission ID list L3. Distributed content data attached with group ID-B is reproducible with the content processing apparatus 10-3 because group ID-B is contained in reproduction permission ID list L3 but not reproducible with the content processing apparatuses 10-1 and 10-2 because group ID-B is not contained in reproduction permission ID lists L1 and L2.

As described above, by sharing a source ID between the content processing apparatuses 10-1 and 10-2 that are registered with the same device group, the content processing apparatuses 10-1 and 10-2 are able to mutually reproduce the content data created thereby and the content data distributed thereto, thereby sharing content without restriction. On the other hand, no source ID is shared between the content processing apparatuses 10-1 and 10-3 that are registered with different device groups, so that the created content data and the distributed content data cannot be mutually reproduced, thereby restricting the sharing of content.

Thus, the content sharing system 100 associated with the first embodiment and the content sharing method thereof have been described in detail. The content sharing system 100 manages the data content shared between a plurality of content processing apparatuses 10 on a content providing source basis (namely, on a providing source user basis or on a providing source device basis) and restricts the reproduction of content data by each content processing apparatus 10 in accordance with the content providing source, thereby executing content copyright management. Namely, the content sharing system 100 is able to permit or reject the sharing of content data on a content providing source unit.

Consequently, if a content providing source is unauthorized one, then the reproduction of all content data acquired from an unauthorized providing source can be prohibited collectively on the content processing apparatuses 10 that have acquired the content data. Therefore, the content sharing system 100 and the content sharing method described above are able to effectively prevent any illegal attempts for mass-distributing content data to the unspecified number of users and presenting distributed content data in a downloadable form on the Internet, for example.

On the other hand, if a content providing source is authorized one, then the sharing of the content data acquired from this content providing source may be permitted once to subsequently permit, without restriction, the reproduction of other content data acquired from the permitted content providing source. Consequently, within the scope of private uses, content data may be copied without restriction between a plurality of content processing apparatuses 10. This realizes the copyright management that is close to the conventional analog content distribution system that allows the unconditional copy of content data within the scope of private uses.

Consequently, the content sharing system 100 associated with the first embodiment is able to satisfy both of (1) the copyright management capability of restricting the illegal use of content data without paying the due price to content distribution services and so on and (2) the capability of not preventing the use of content within the scope of duly paid private uses.

Further, the copyright management processing for permitting the sharing of content data on a content providing source basis may be executed only once at the time of registering or initial distribution of content distribution service or at the time of the use of content data acquired from a new content providing source, in principle. Therefore, as compared with the related-art systems in which copyright management processing must be executed every time content is copied, the novel configuration enhances the efficiency of copyright management processing.

In the case where list management is executed in each content processing apparatus 10 as with the above-mentioned first embodiment of the invention, a system for centrally managing the number of times content is copied need not be arranged, so that the degree of freedom in designing the user interface and the content processing apparatus 10 may be increased. To be more specific, (1) there is no need for using special means for the copy or the backup of content data; (2) because no dedicated user interface is required, no such interfaces need be arranged as applications for copying and backing up copyright-managed content data; (3) there is no need for considering the system service interruption or crash of a management server or a PC that centrally manages copy count; (4) there is no need for considering the connection between each content processing apparatus 10 that uses content and the server that centrally manages copyright; and (5) the processing may be executed only in the content processing apparatus 10 without use of a management server, thereby increasing the speed of the processing.

Therefore, in sharing content data by use of a plurality of content processing apparatuses within the scope of private use of content data, the form of connection between apparatuses and the performance of each device are not restricted, thereby enhancing the degree of freedom of design.

Further, the content sharing system 100 associated with the first embodiment allows the addition copyright management corresponding capabilities (namely, capabilities of granting the use of content data in the sole distribution of removable media) to normal recording media (or removable media) simply by adding reproduction permission ID list L to the normal recording media along with content data. This novel configuration facilitates the design of recording media having copyright management corresponding capabilities. In addition, recording the content attached with a source ID allows copyright management also on recording media on a content providing source basis.

Moreover, grouping the content processing apparatuses 10 by device-registering content processing apparatuses 10 in unit of users of content processing apparatuses 10 allows the content processing apparatuses 10 registered with the same device group to copy and use content data without restriction. Consequently, each authorized user who uses content only for private purposes may copy content files between the devices owned by the user without restriction and may not be aware of the content copy source and copy count for example, thereby making the copyright management system almost transparent to the user. Therefore, within the private use of content, the degree of freedom in use of content by the user may be further enhanced, which in turn enhances the convenience of content use.

Further, the first embodiment allows the holding of the most recent group registration information and content sharing registration information in the distribution and group management server 20 for the collective management of these kinds of information. Also, the first embodiment allows the mutual authentication of those content processing apparatuses 10 which are unconnectable directly with each other and the sharing registration of content via the distribution and group management server 20 and the network 5. Consequently, all content processing apparatuses 10 are equal in relation to each other.

Second Embodiment

The following describes a content distribution system practiced as a second embodiment of the invention. The content distribution system associated with the second embodiment is generally the same in configuration as the content sharing system 100 (or the copyright management system) associated with except for the following differences; therefore, the content sharing system 100 and the components and processing methods thereof will be cited from time to time in the following description of the second embodiment.

Figure 31:
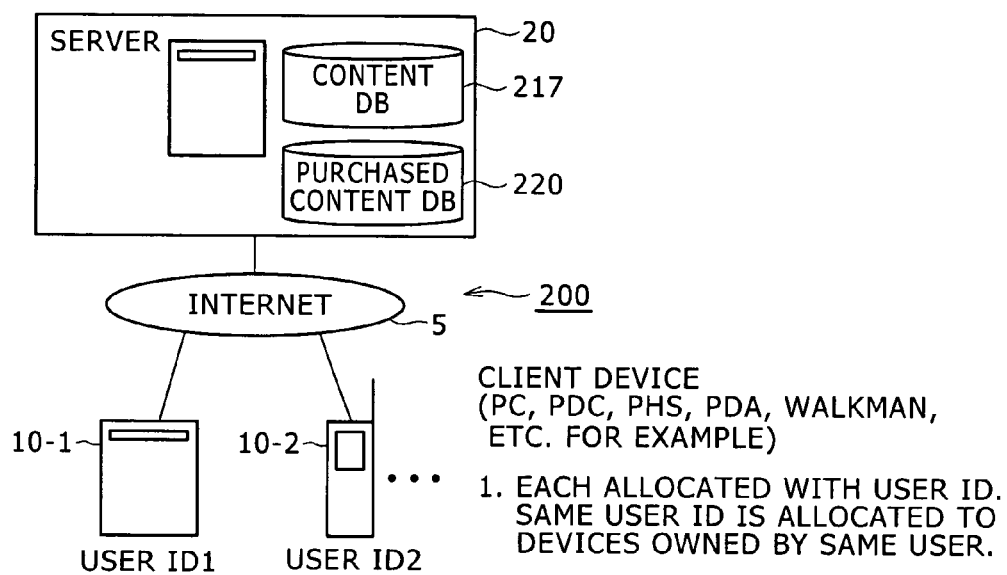
FIG. 31 is a schematic diagram approximately illustrating an overall configuration of a content distribution system associated with a second embodiment.

First, referring to FIG. 31, a configuration of a content distribution system 200 associated with the second embodiment will be described. FIG. 31 is a schematic diagram approximately illustrating an overall configuration of the content distribution system 200.

As shown in FIG. 31, the content distribution system 200 associated with the second embodiment has a plurality of client devices 10-1, 10-2, and so on (hereafter sometimes generically referred to as a client device 10), a server 20, and a network 5 interconnecting these client device 10 and server 20, for example.

The following defines the terminology associated with the second embodiment.

"Client device 10" generically denotes terminals (or devices) capable of reproducing content on the content distribution system 200 associated with the second embodiment, being equivalent to the content processing apparatus 10 associated with the first embodiment. The client device 10 is configured as one example of a first terminal and a second terminal. Specific examples of this client device 10 include a personal computer (PC), a portable information terminal (PDA), a mobile phone, a PHS, a game machine, a home information appliance, and various content reproducing equipment.

"Server 20" denotes a server apparatus for distributing content to a plurality of client devices 10 in the content distribution system 200 associated with the second embodiment, being equivalent to the distribution and group management server 20 associated with the first embodiment. The server 20 is configured as one example of a content distribution server.

"User ID" denotes an identifier for uniquely identifying a user who accepts a content distribution service. The client device 10 is securely written with a user ID indicative of the owner of that client device 10. This user ID is tamper proof such that the user cannot rewrite it.

"Group ID (or GID)" denotes an identifier associated with the above-mentioned user ID and an ID (namely a service ID) for uniquely identifying a content distribution service provided by the server 20. This group ID is different with different users and with different content distribution services. The group ID allows the identification of each user and each content distribution service. The group ID may be realized by linking the above-mentioned user ID with the above-mentioned service ID, for example.

"Content ID (CID)" denotes an identifier for uniquely identifying content. In the second embodiment, content is stored in the server 20 in various attributes (for example, high bit rate to low bit rate (high sound quality to low sound quality), music bridge alone, music alone, chorus alone, music with video, different format, different codec, full song, ringing song, or ringing tone). Pieces of content having different attributes are all assigned with a same content ID.

"Content" herein denotes music content and video content for example, each piece of content being managed by file on an attribute basis. A content file is arranged with fields in which group ID and group ID value falsification detection value are written.

In the content distribution system 200 shown in FIG. 31, each client device 10 is assigned with the user ID of the owning user. Therefore, the same user ID is given to a plurality of client devices 10 owned by the same user.

The server 20 stores a content database 271 and a purchased content database 220 in a storage unit 214 based on a HDD for example. The purchased content database 220 is configured as one example of a user database in which the content ID of the content purchased by the user is stored.

Figure 32:
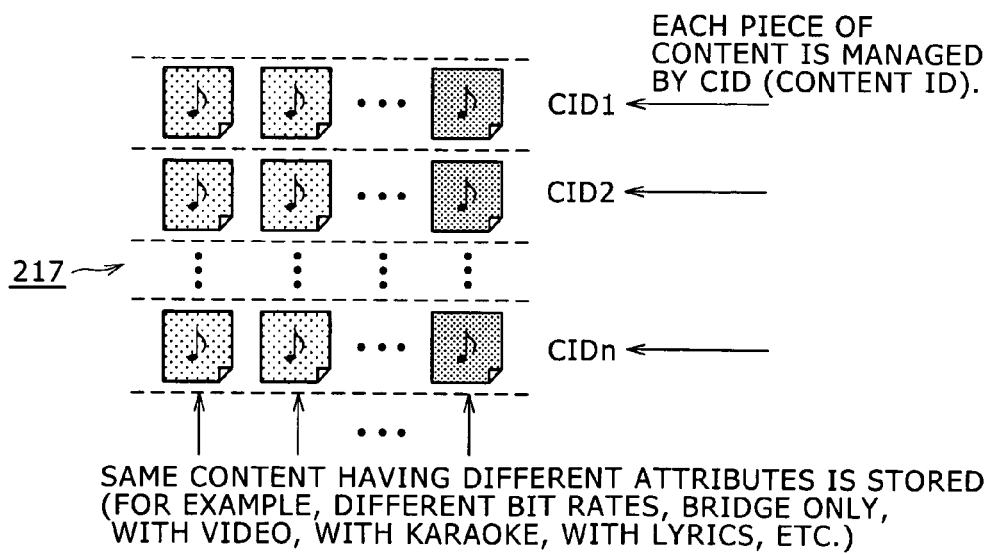
FIG. 32 is a schematic diagram illustrating an exemplary configuration of a content database associated with the second embodiment.
Figure 33:
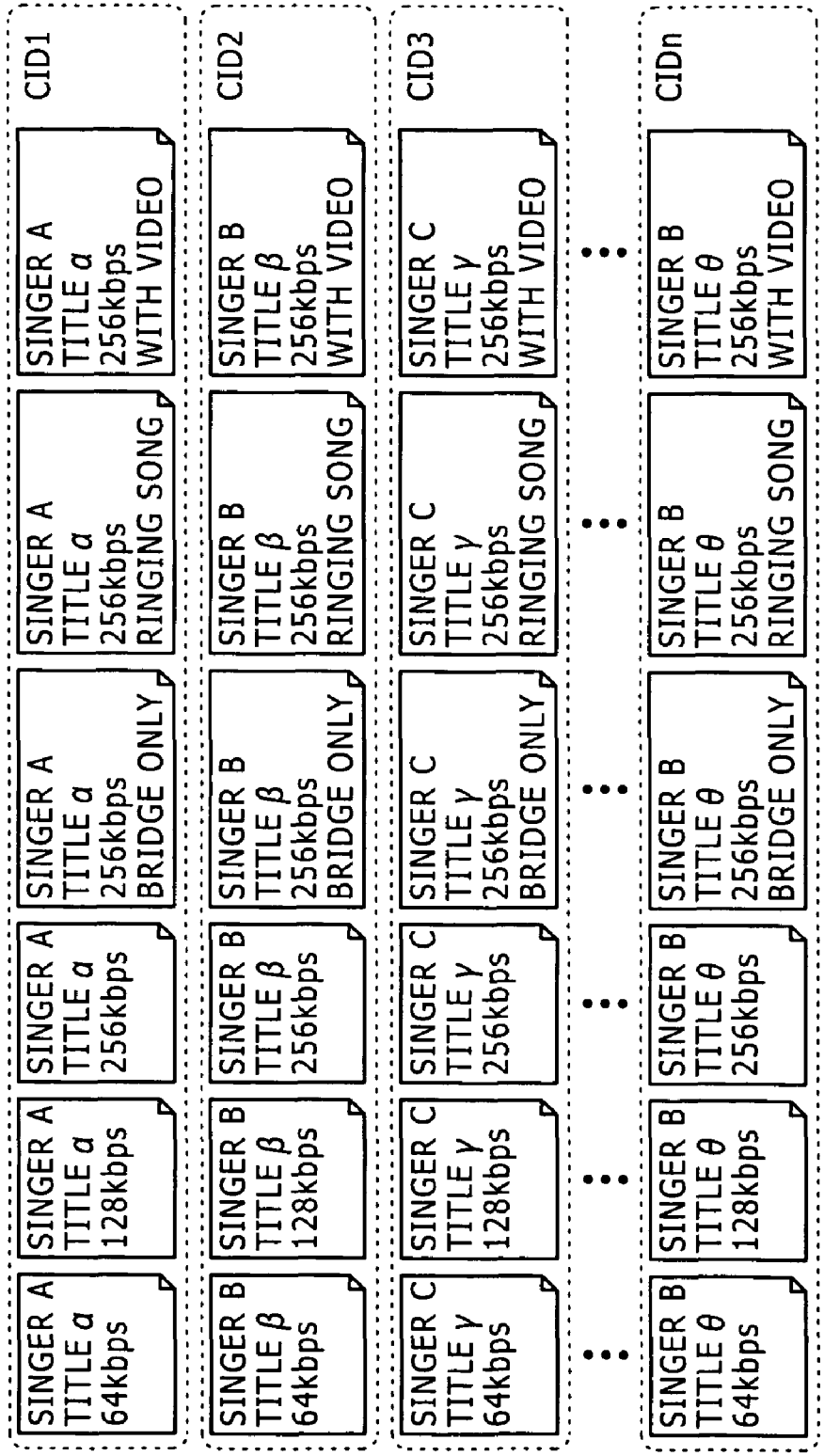
FIG. 33 is a schematic diagram illustrating in more detail the exemplary configuration of the content database associated with the second embodiment.

The following describes a content management status in the content database 217 associated with the second embodiment with reference to FIGS. 32 and 33. FIG. 32 shows an exemplary configuration of the content database 217 associated with the second embodiment. FIG. 33 more specifically shows the exemplary configuration of the content database 217.

As shown in FIGS. 32 and 33, the content database 217 stores a plurality of kinds of content (content ID1 to n) for example and stores a plurality pieces of the same content having different attributes with respect to each piece of content (ID1 to n).

To be more specific, with respect to music content for example, content attributes include (1) high and low bit rates (high sound quality to low sound quality), (2) music bridge alone or total music, (3) music alone (namely, karaoke for example) or song alone, (4) music with video, (5) format type, (6) codec type, (7) full song or not, (8) ringing song or not, and (9) ringing tone or not, for example.

Consequently, with respect to the same content (for example, the content that is a same song by a same singer) the content database 217 stores different kinds of files of different attributes, such as high and low bit rates (high sound quality to low sound quality), music bridge alone or total music, music alone or song alone, music with video, format type, codec type, full song or not, ringing song or not, and ringing tone or not, for example. In the case where attributes are different, a same content ID is assigned to a same piece of content.

Figure 34:
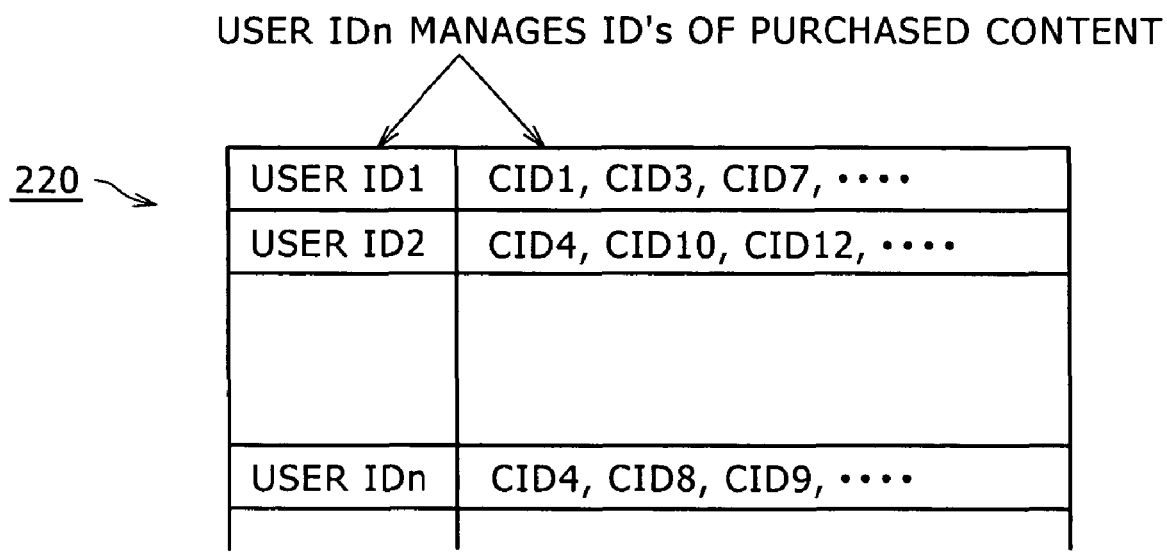
FIG. 34 is a diagram illustrating an exemplary configuration of a purchased content database associated with the second embodiment.

The following describes the purchased content database 220 associated with the second embodiment with reference to FIG. 34. FIG. 34 shows an exemplary configuration of the purchased content database 220.

As shown in FIG. 34, the purchased content database 220 (or a user database) stores the content ID of each piece of content purchased by each user identified by a user ID. To be more specific, the purchased content database 220 stores content ID1, ID3, and ID7 for the pieces of content purchased by the user having user ID1 by relating content ID1, ID3, and ID7 with user ID1. Consequently, the server 20 may reference the purchased content database 220 to find the piece of content already purchased by the user having that user ID.

With the content distribution system 200 configured as described above, any client devices 10 owned by a same user may purchase and download content by use of one client device 10 and then download the purchased content again by another client device 10 by specifying the attribute of that content. The following will detail this feature.

In distributing (or providing) content to the client device 10 owned by a user, the server 20 adds a group ID for identifying this user and this content distribution service and the value of detecting falsification of this group ID to this distributed content. This configuration allows the server 20 to relate the group ID for identifying the user and the content distribution service with the content and distribute the resultant content to the client device 10.

On the other hand, the client device 10 securely stores the user ID corresponding to the owning user as described above. In other words, the client device 10 of content securely stores the user ID of the owning user.

In reproducing content on the client device 10, the integrity of the group ID attached to the content is checked on the basis of the above-mentioned falsification detection value to determine whether there is a match between the group ID owned by the client device 10 and the user ID represented by that group ID. If a match is found, the reproduction of the content is enabled.

Although not shown, it is assumed that a charging and settlement system be also arranged for each content distribution service provider to bill each user for the fee of the provided content distribution service through the communication processing between the server 20 and the client device 10.

Figure 35:
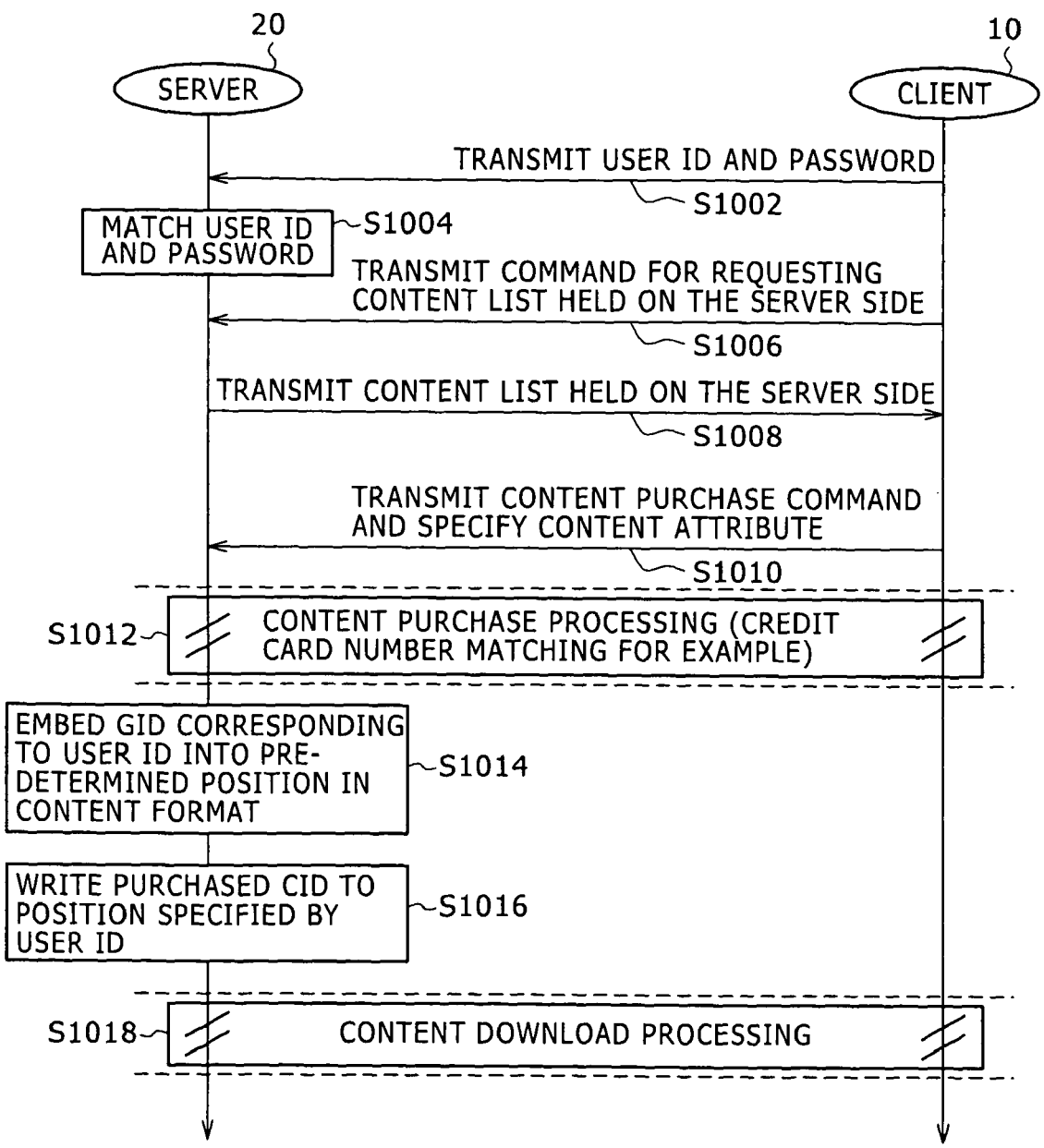
FIG. 35 is a timing chart indicative of a content distribution method for newly purchasing content between server and client in the content distribution system associated with the second embodiment.

The following describes a processing method of newly purchasing content in the content distribution system 200 associated with the second embodiment with reference to FIG. 35. FIG. 35 is a timing chart indicative of a content distribution method for use in newly purchasing content between the server 20 and the client device 10 in the content distribution system 200.

First, a user desiring to purchase content requests the server 20 for the purchase of content through the client device 10 of his own (a first terminal).

To be more specific, as shown in FIG. 35, in step S1002, the client device 10 transmits, in accordance with a purchase command given by the user, the user ID stored in the client device 10 and the password entered by the user to the server 20 (S1002).

Next, in step S1004, the server 20 matches the user ID against the password, thereby authenticating the purchasing client device 10 (step S1004). In this authentication processing, the user ID and password received from the client device 10 are matched against the user ID and password registered with a group registration database 216 of the server 20. If the received user ID and password are found correct (if the authentication is successful), the purchase of the content is permitted and the following processing becomes executable. On the other hand, if the received user ID and password are found incorrect (if the authentication failed), then the purchase of the content is rejected, upon which the processing is all ended.

In step S1006, the client device 10 transmits a request command to the server 20 for requesting a list of purchasable content owned by the server 20 (step S1006).

Then, in step S1008, in response the above-mentioned request command, the server 20 transmits the list of purchasable content (step S1008). Consequently, the client device 10 displays the received content list on an output unit 108. The user selects desired content from the displayed content list and enters the selection.

Next, in step S1010, the client device 10 transmits a purchase command for purchasing user-desired content and the attribute specification information for that content to the server 20 (step S1010). It should be noted that a content attribute (bit rate for example) may be selected by the user as desired or automatically specified by the client device 10 from among the content attributes available to the client device 10.

Then, in step S1012, the matching of a credit card number and the like is executed between the server 20 and the client device 10, thereby executing content purchase processing (including charging processing) (step S1012).

In step S1014, the server 20 attaches the group ID corresponding to the user ID to the content requested for purchase (step S1014). To be more specific, for the content requested for purchase (namely, the purchased content), the server 20 reads the content having the attribute specified in above step S1010 (namely, the content having an attribute available for the requesting client device 10) from the content database 217 and writes the group ID corresponding to the user ID of the user of the requesting client device 10 and the falsification detection value (MAC for example) of this group ID to predetermined fields of the format of the read content. It should be noted that the group ID corresponding to the user ID is the information capable of identifying the above-mentioned user ID and functions as "user ID representative information" associated with the second embodiment. Also, it should be noted that, rather than the above-mentioned group ID, the user ID itself may be attached to the content requested for purchase.

Further, in step S1016, the server 20 stores the content ID of the content requested for purchase into the above-mentioned purchased content database 220 by relating with the user ID of the user owning the requesting client device 10 (step S1016). To be more specific, the server 20 writes the content ID of the content requested for purchase to a position corresponding to the user ID of the user owning the requesting client device 10, in the purchased content database 220. Consequently, the server 20 may register that the content that is identified by the content ID by the user having that user ID has already been purchased. It should be noted that this step S1016 may be executed before above-mentioned step S1014.

Then, in step S1018, the content requested for purchase is downloaded from the server 20 to the client device 10 (step S1018). To be more specific, the server 20 distributes the content with the group ID attached in step S1016 to the requesting client device 10. The client device 10 receives the content distributed from the server 20 and stores in the storage unit 114 for example.

These content newly purchasing and distribution processing operations allow the client device 10 to acquire content having an attribute available to itself, thereby executing the reproduction and checkout for example of the acquired content.

Figure 36:
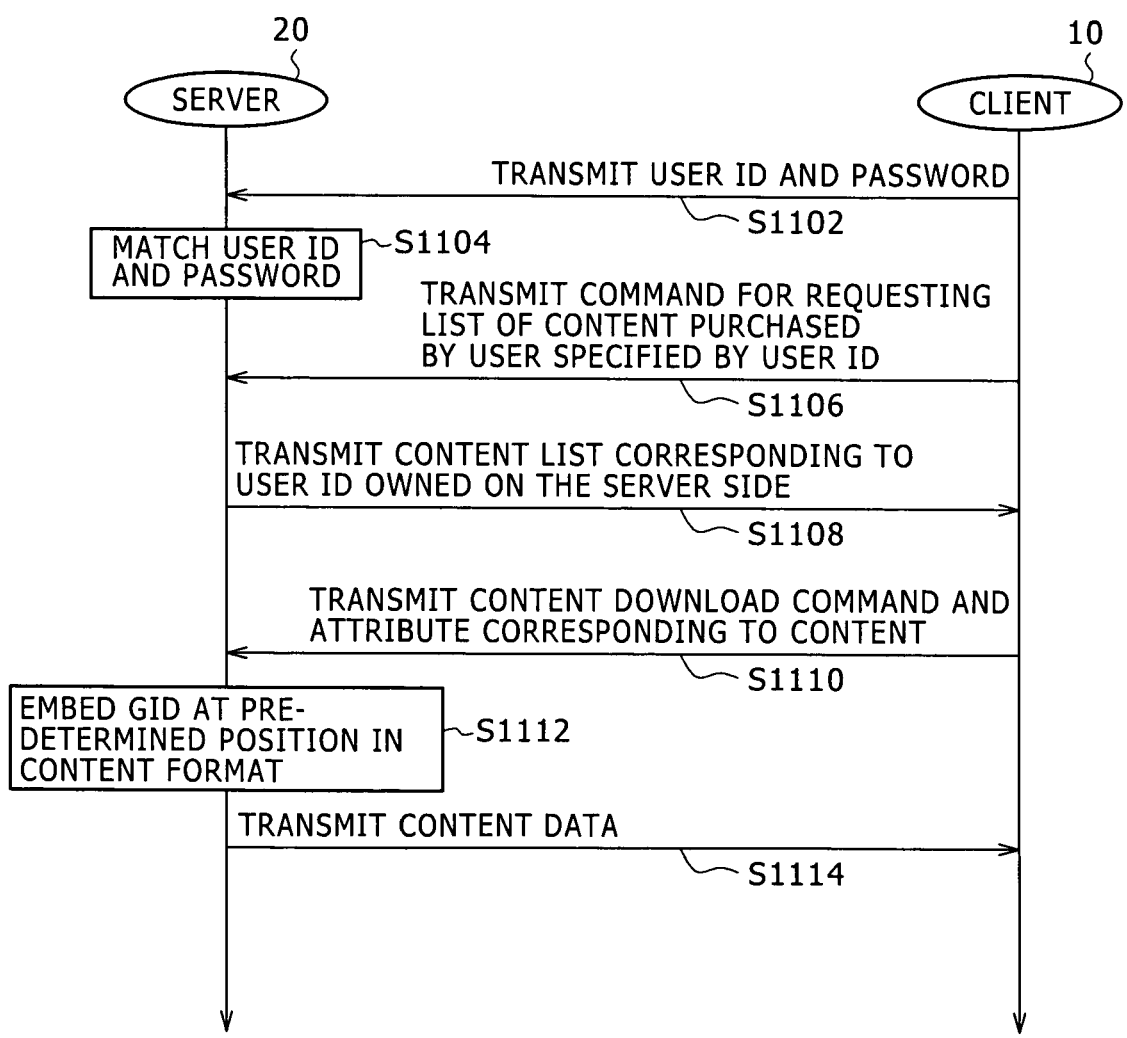
FIG. 36 is a timing chart indicative of a content distribution method for redownloading purchased content between server and client in the content distribution system associated with the second embodiment.

The following describes a processing method of downloading already purchased content again in the content distribution system 200 associated with the second embodiment with reference to FIG. 36. FIG. 36 is a timing chart indicative of a content distribution method of downloading already purchased content again between the server 20 and the client device 10 in the content distribution system 200.

A user desiring re-distribution of purchased content requests the server 20 for the distribution of content by use of the client device 10 of his own (a second terminal). It should be noted that the client device 10 (a second terminal) may be either the same device as the client device 10 (a first terminal) through which the above-mentioned content has been newly purchased or a different device. The following describes an example in which both client devices 10 are different from each other (for example, the first terminal is a PC and the second terminal is a mobile phone).

As shown in FIG. 36, in step S1102, in accordance with a purchase command given by the user, the client device 10 (the second terminal) transmits the user ID of the client device 10 and the password entered by the user to the server 20 (step S1102).

Next, in step S1104, the server 20 executes the matching of the user ID and the password, thereby authenticating the client device 10 (step S1104). This authentication processing is executed by matching the user ID and password received from the client device 10 against the user ID and password registered in the group registration database 216 for example of the server 20. If the user ID and password received from the client device 10 are found correct (if the authentication is successful), the distribution of the content is permitted. On the other hand, if the user ID and password received from the client device 10 are found incorrect (if the authentication failed), then the distribution of the content is rejected, upon which the processing is all ended.

In step S1106, the client device 10 transmits a command for requesting a list of content already purchased by the use identified by the above-mentioned user ID (namely, a purchased content list) to the server 20 (step S1106).

Then, in step S1108, in response to the above-mentioned request command, the server 20 transmits the list of purchased content corresponding to the above-mentioned user ID to the client device 10 (step S1108). To be more specific, the server 20 checks the purchased content database 220 for one or more content IDs corresponding to the user ID received from the above-mentioned client device 10. If one or more such content IDs are found, the server 20 reads the content IDs corresponding to that user ID. In addition, on the basis of the content IDs thus read, the server 20 creates a purchased content list associated with the user ID and transmits the created list to the client device 10. Consequently, the client device 10 displays the received purchased content list on the output unit 108. The user selects the content to be distributed again from the displayed list and enters the selection.

It should be noted that the server 20 may attach the attribute information of each piece of purchased content to this purchased content list and transmit this list. Consequently, the user is able to select an attribute of the content to be distributed again and enter the selection.

In step S1110, the client device 10 transmits a command for downloading user-desired content (namely, a redistribution command) and the information for specifying the attribute of that content to the server 20 (step S1110). It should be noted that a content attribute (bit rate for example) may be selected by the user as desired or automatically specified by the client device 10 from among the content attributes available to the client device 10.

Further, in step S1112, the server 20 attaches the group ID corresponding to the user ID to the content requested for distribution (step S1112). To be more specific, for the content requested for distribution, the server 20 reads the content having the attribute specified in step S1110 (namely, the content having any of attributes available to the requesting client device 10) from the content database 217 and writes the group ID corresponding to the user ID of the user owning the requesting client device 10 and the falsification detection value (MAC for example) of this group ID to predetermined fields on the format of the read content. Also, it should be noted that, rather than the above-mentioned group ID, the user ID itself may be attached to the content requested for distribution.

Then, in step S1114, the content requested for distribution is downloaded from the server 20 to the client device 10 (step S1114). To be more specific, the server 20 distributes the content with the group ID attached in step S1112 to the requesting client device 10. The client device 10 receives the distributed content from the server 20 and stores the received content in the storage unit 114 for example.

As described above, in response to a content redistribution request by the client device 10 (or the second terminal), the content having the attribute specified by that client device 10 can be distributed. Consequently, the client device 10 is able to acquire the content (for example, low sound quality content) having any of attributes available to itself (for example, reproducible) and the content having an attribute desired by the user (for example, ringing song), for example.

Thus, the content distribution methods (at the time of new purchase and at the time of redownloading) based on the content distribution system 200 associated with the second embodiment have been described with reference to FIGS. 35 and 36.

It should be noted that, in specifying an attribute of the content requested for distribution from the client device 10 to the server 20 in steps S1010 and S1110, another specification method that follows may be used instead of the above-mentioned method in which above-mentioned content attribute specification information is transmitted.

For example, the client device 10 transmits the device information about itself (for example, device ID, device type, and performance information) to the server 20. On the basis of the received device attribute information, the server 20 may automatically discriminate the content attributes available to that client device 10 (for example, reproducible), thereby specifying the attribute of the content to be distributed. Further, in this case, the server 20 may distribute the same content having all attributes available to that client device 10 or the same content having one or more attributes selected under predetermined conditions to the client device 10.

Thus, the content distribution system 200 associated with the second embodiment the content distribution methods thereof have been described. It should be noted that the server 20 and the client device 10 may be configured by installing a computer program for making a computer execute the above-mentioned functions on computer equipment such as PC, PDA, mobile phone, game machine, or home information appliance or may be configured by hardware units for executing the above-mentioned functions.

Figure 37:
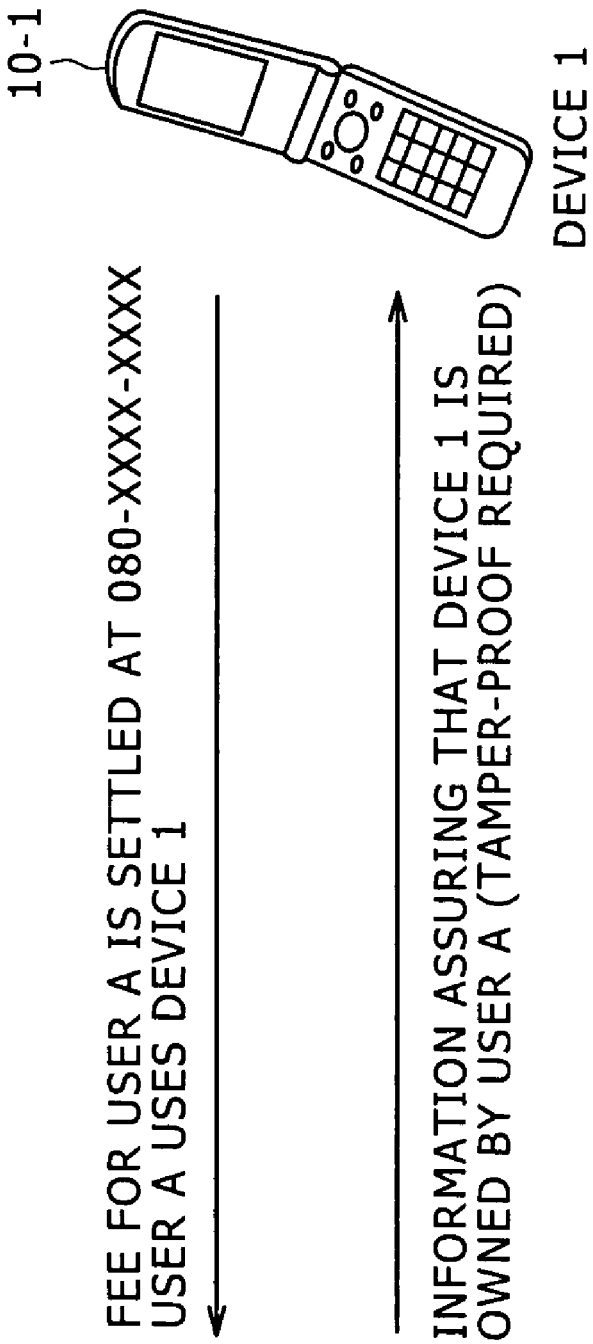
FIG. 37 is a schematic diagram illustrating an exemplary application of the content distribution system and the content distribution method associated with the second embodiment.

The following describes exemplary applications of the above-mentioned content distribution system 200 and content distribution methods with reference to FIGS. 37 through 39. FIGS. 37 through 39 are diagrams for describing the exemplary applications of the content distribution system 200 and content distribution methods thereof associated with the second embodiment.

FIGS. 37 through 39 show examples in which user A uses his own client device 10-1 based on a mobile phone, a game machine having a network communication capability, and client devices 10-2 and 10-3 based on PCs for example, thereby using content distribution services provided by the server 20.

As shown in FIG. 37, user A device-registers the client device 10-1 based on a mobile phone with the server 20 as a device of user A. In this device registration, a mobile phone number and a password for example are transmitted from the client device 10-1 to the server 20, which are registered in the group registration database 216 for example of the server 20. On the other hand, the server 20 generates a user ID related with the telephone number and transmits the generated user ID to the client device 10-1. The client device 10-1 stores the user ID received from the server 20 in a manner in which falsification thereof is disabled. Consequently, the client device 10-1 is guaranteed that the client device 10-1 is a device of user A.

It should be noted that, although not shown, the client devices 10-2 and 10-3 based on game machine or PC are also device-registered in the same manner as described above.

The device registration as described above allows user A to purchase new content by use of the client device 10-1 as shown in FIG. 38. To be more specific, by executing content ID1 purchase processing between the client device 10-1 and the server 20, the content of content ID1 becomes distributable from the server 20 to the client device 10-1. The content to be distributed is attached with the user ID corresponding to the number of the mobile phone of user A. The above-mentioned purchase processing done once, the user A may download the content any number of times by use of the client device 10-1 regardless of the attribute of the purchased content. The fee for this content distribution service is accounted along with the charge for mobile phone call via the mobile phone carrier.

Content purchase processing done once as described above allows user A to download the same content having different attributes in accordance with the performance of each device any number of times by use of the different client devices 10-1, 10-2, and 10-3 as shown in FIG. 39.

For example, the client device 10-1 based on a mobile phone having low reproduction performance is capable of downloading content having attribute "single-phrase ringing song of comparatively low sound quality (bit rate=64 Kbps) among the pieces of content having various attributes having content ID1. Thus, the charge settlement is executed by a device-registered mobile phone and a low sound quality ringing song version of already purchased music content may be downloaded by use of this mobile phone.

On the other hand, the client devices 10-2 and 10-3 based on a game machine or a PC for example having high reproduction performance are capable of downloading and reproducing content having "full song of comparatively high sound quality (bit rate=256 Kbps) among the pieces of content having various attributes having content ID1. Thus, a full song version of the music content already purchased by the above-mentioned mobile phone may be downloaded by use of a device-registered game machine or PC.

Thus, the content distribution system 200 and content distribution methods thereof associated with the second embodiment have been described. According to the second embodiment, with any client devices 10 owned by the same user, once content purchase processing has been executed on one of these client devices, the use may acquire content on any other client devices without repeating the same content purchase processing. This novel configuration enhances the convenience of the user in content distribution services (such as EMD service). In addition, the novel configuration allows the distribution of content having an attribute in accordance with the performance of the client device 10 and content having a user-desired attribute.

While preferred embodiments of the present invention have been described using specific terms, such description is for illustrative purpose only, and it is to be understood that changes and variations may be made without departing from the spirit or scope of the following claims.

For example, in each of the above-mentioned embodiments, a distribution server for providing content distribution services and a group management server for executing user authentication and device authentication for grouping devices to provide a content sharing service are integrated into one unit, namely the distribution and group management server 20. However, the present invention is not restricted to this configuration. For example, the distribution server and the group management server may be arranged separately to independently provide a content sharing service and a content distribution service. In this case, the user ID for use in providing a content distribution service and the above-mentioned group ID may be separate IDs.

Group certificate G may also be issued only by the server 20. In this case, each content processing apparatus 10 may transmit its own recorder ID to the group management server at the time of accessing the group management server.

As described, the present invention is applicable to content distribution systems having a copyright management capability.

What is claimed is:

1. A content distribution server for distributing content to a plurality of terminals owned by a user, comprising:
    a content database for storing content identified by a content ID as a plurality of files, the plurality of files including different types of the same content and having a field, the types based on different attributes of the same content and assigned the same content ID, wherein a falsification detection value is stored in the field of the plurality of files; and
    a user database for storing, for each user identified by a user ID, a content ID of content purchased by the user;
    wherein, the content distribution server is configured to:
        receive a content purchase request, including a specified attribute of the requested content, and the user ID from a first terminal owned by the user, the specified attribute indicating one of the types of the same content, wherein the user is requesting to purchase a specified type of the same content;
        authenticate the first terminal on the basis of the received user ID;
        acquire the requested content, the content ID, and the falsification detection value from the content database after the request is received by using the specified attribute to identify the specified type for the acquisition from the plurality of files;
        store the acquired content ID and the received user ID in the user database by relating the acquired content ID with the received user ID;
        provide the requested content to the first terminal with information indicative of the received user ID;
        receive a content distribution request, including a specified attribute of the content requested for distribution, and the user ID from a second terminal owned by the user;
        authenticate the second terminal on the basis of the user ID received from the second terminal;
        acquire the content requested for distribution, from the content database, by using the content ID stored in the user database when the user ID received from the second terminal matches the user ID related to the content ID in the user database; and
        provide the content requested for distribution to the second terminal according to the attribute specified in the content distribution request and attaching the falsification detection value in a predetermined field of the content before providing the content, the attached falsification detection value detecting whether a group ID is associated with the user ID and identifying a service provided by the content distribution server when the second terminal attempts to process the provided content, wherein information indicative of the user ID received from the second terminal is provided with the content requested for distribution, and a type of the content requested for distribution is based on the attribute specified by the second terminal.

2. A content distribution method being executed by a content distribution server, the method comprising:
    storing, in memory of the content distribution server, a content database having a plurality of files including content identified by a content ID, the plurality of files including different types of the same content and having a field, the types based on different attributes of the same content and assigned the same content ID, wherein a falsification detection value is stored in the field of the plurality of files;
    storing, in the memory a user database including a user ID and a content ID corresponding to content purchased by the user;
    receiving a content purchase request, including a specified attribute of the requested content, and the user ID from a first terminal owned by the user, the specified attribute indicating one of the types of the same content, wherein the user is requesting to purchase a specified type of the same content;
    authenticating, by using a processor in the content distribution server, the first terminal on the basis of the received user ID;
    acquiring the requested content, the content ID, and the falsification detection value after the request is received by using the specified attribute to identify the specified type for the acquisition from the plurality of files;

storing, in the memory device, the acquired content ID and the received user ID by relating the acquired content ID with the received user ID;

providing the requested content to the first terminal with information indicative of the received user ID;

receiving a content distribution request, including a specified attribute of the content requested for distribution, and the user ID from a second terminal owned by the user;

authenticating, by using the processor, the second terminal on the basis of the user ID received from the second terminal;

acquiring the content requested for distribution by using the stored content ID, when the user ID received from the second terminal matches the user ID related to the content ID; and providing the content requested for distribution to the second terminal according to the attribute specified in the content distribution request and attaching the falsification detection value in a predetermined field of the content before providing the content, the attached falsification detection value detecting whether a group ID is associated with the user ID and identifying a service provided by the content distribution server when the second terminal attempts to process the provided content, wherein information indicative of the user ID received from the second terminal is provided with the content requested for distribution, and a type of the content requested for distribution is based on the attribute specified by the second terminal.

3. A computer-readable storage medium, comprising a computer program, which when executed on a processor, causes the processor to perform a content distribution method, the method comprising:

storing a content database having a plurality of files including content identified by a content ID the plurality of files including different types of the same content and having a field, the types based on different attributes of the same content and assigned the same content ID, wherein a falsification detection value is stored in the field of the plurality of files; and storing a user database including a user ID and a content ID corresponding to content purchased by the user;

receiving a content purchase request, including a specified attribute of the requested content, and the user ID from a first terminal owned by the user, the specified attribute indicates one of the types of the same content, wherein the user is requesting to purchase a specified type of the same content;

authenticating the first terminal on the basis of the received user ID;

acquiring the requested content, the content ID, and the falsification detection value after the request is received by using the specified attribute to identify the specified type for the acquisition from the plurality of files;

storing the acquired content ID and the received user ID by relating the acquired content ID with the received user ID;

providing the requested content to the first terminal with information indicative of the received user ID;

receiving a content distribution request, including a specified attribute of the content requested for distribution, and the user ID from a second terminal owned by the user;

authenticating the second terminal on the basis of the user ID received from the second terminal;

acquiring the content requested for distribution by using the stored content ID, when the user ID received from the second terminal matches the user ID related to the content ID; and providing the content requested for distribution to the second terminal according to the attribute specified in the content distribution request and attaching the falsification detection value in a predetermined field of the content before providing the content, the attached falsification detection value detecting whether a group ID is associated with the user ID and identifying a service provided by a content distribution server when the second terminal attempts to process the provided content, wherein information indicative of the user ID received from the second terminal is provided with the content requested for distribution, and a type of the content requested for distribution is based on the attribute specified by the second terminal.

* * * * *